United States Patent
Nakagawa et al.

(10) Patent No.: US 9,232,095 B2
(45) Date of Patent: Jan. 5, 2016

(54) DISPLAY INPUT DEVICE, IMAGE FORMING APPARATUS, AND CONTROL METHOD OF DISPLAY INPUT DEVICE

(71) Applicant: KYOCERA Document Solutions Inc., Osaka (JP)

(72) Inventors: Hiroshi Nakagawa, Osaka (JP); Isao Koda, Osaka (JP); Akifumi Seto, Osaka (JP); Kenji Takai, Osaka (JP); Takeo Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/523,409

(22) Filed: Oct. 24, 2014

(65) Prior Publication Data

US 2015/0116769 A1 Apr. 30, 2015

(30) Foreign Application Priority Data

Oct. 30, 2013 (JP) .................................. 2013-225279
Oct. 30, 2013 (JP) .................................. 2013-225563
Nov. 27, 2013 (JP) .................................. 2013-245342
Nov. 27, 2013 (JP) .................................. 2013-245349

(51) Int. Cl.
*G06F 15/00* (2006.01)
*H04N 1/00* (2006.01)
*G06F 3/041* (2006.01)
*G06F 3/0484* (2013.01)
*G06F 3/0482* (2013.01)
*G06F 3/0488* (2013.01)

(52) U.S. Cl.
CPC .......... *H04N 1/00424* (2013.01); *G06F 3/0416* (2013.01); *G06F 3/0482* (2013.01); *G06F 3/0488* (2013.01); *G06F 3/04842* (2013.01); *G06F 3/04883* (2013.01); *H04N 1/00392* (2013.01); *G06F 2203/04808* (2013.01)

(58) Field of Classification Search
CPC ............................................. G06F 2203/04808
USPC ........................................................ 358/1.15
See application file for complete search history.

(56) References Cited

U.S. PATENT DOCUMENTS

| | | | |
|---|---|---|---|
| 2007/0226261 A1 | 9/2007 | Urita | 707/104.1 |
| 2008/0059902 A1 | 3/2008 | Nakashima | 715/783 |
| 2011/0131515 A1 | 6/2011 | Ono et al. | 715/764 |
| 2012/0069396 A1* | 3/2012 | Tomiyasu | G06F 3/04855 358/1.15 |
| 2013/0093727 A1 | 4/2013 | Eriksson et al. | 345/175 |
| 2013/0162575 A1 | 6/2013 | Kaigawa | 345/173 |
| 2015/0026636 A1 | 1/2015 | Kawano | 715/808 |

FOREIGN PATENT DOCUMENTS

| | | |
|---|---|---|
| JP | 2002-312105 A | 10/2002 |
| JP | 2008-204296 A | 9/2008 |
| WO | WO 2013/157322 A1 | 10/2013 |

* cited by examiner

*Primary Examiner* — Saeid Ebrahimi Dehkordy
(74) *Attorney, Agent, or Firm* — Stein IP, LLC

(57) ABSTRACT

A display input device includes a display unit and a touch panel unit. When the touch panel unit accepts a predetermined transmission start operation, the display unit starts a display in a transmission transition mode, performs a transmission transition display in which a transition source screen gradually disappears while a ratio of a display of a transition destination screen belonging to a next lower layer of the transition source screen as time passes, and repeats the transmission transition display toward a lower layer.

19 Claims, 27 Drawing Sheets

FIG.11

| Local User Register/Edit | | | |
|---|---|---|---|
| New Registration | Register > (B15) | Edit | Edit > (B16) |

B13 Cancel   B14 Return

Guest Permission

B17 Permit    B18 Not Permit

B13 Cancel   B12 OK   B14 Return

| | | TRANSITION TIME (SECONDS) — D4 |
|---|---|---|
| (1) ROTATION SPEED IN FORWARD DIRECTION | 0<V<V11 | T11 |
| | V11<V≦V12 | T12 |
| | ⋮ | ⋮ |
| | Vx1≦V | Tx |
| (2) ROTATION MOVEMENT AMOUNT IN FORWARD DIRECTION | 0<L<L11 | T11 |
| | L11<L≦L12 | T12 |
| | ⋮ | ⋮ |
| | Lx1≦L | Tx |
| (3) OPERATION SPEED IN FORWARD DIRECTION | 0<V<V13 | T11 |
| | V13<V≦V14 | T12 |
| | ⋮ | ⋮ |
| | Vx2≦V | Tx |
| (4) OPERATION AMOUNT IN FORWARD DIRECTION | 0<L<L13 | T11 |
| | L13<L≦L14 | T12 |
| | ⋮ | ⋮ |
| | Lx2≦L | Tx |

FIG.32

Transition Speed Operation Setting — 11, 12

Speed Setting Operation

[Rotation Operation] — B25   [One-Point Moving Operation] — B26

Standard To Determine Transition Speed

[Operation Speed] — B27   [Operation Amount (Moving Distance)] — B28

— 510

[Cancel] [OK] [Return]

| REVERSE DIRECTION (TOWARD UPPER LAYER) | | |
|---|---|---|
| | | TRANSITION TIME (SECONDS) — D4 |
| (1) ROTATION SPEED IN REVERSE DIRECTION | 0<V<V21 | T21 |
| | V21<V≦V22 | T22 |
| | ⋮ | ⋮ |
| | Vy1≦V | Ty |
| (2) ROTATION MOVEMENT AMOUNT IN REVERSE DIRECTION | 0<L<L21 | T21 |
| | L21<L≦L22 | T22 |
| | ⋮ | ⋮ |
| | Ly1≦L | Ty |
| (3) OPERATION SPEED IN REVERSE DIRECTION | 0<V<V23 | T21 |
| | V23<V≦V24 | T22 |
| | ⋮ | ⋮ |
| | Vy2≦V | Ty |
| (4) MOVEMENT AMOUNT IN REVERSE DIRECTION | 0<L<L23 | T21 |
| | L23<L≦L24 | T22 |
| | ⋮ | ⋮ |
| | Ly2≦L | Ty |

DISPLAY INPUT DEVICE, IMAGE FORMING APPARATUS, AND CONTROL METHOD OF DISPLAY INPUT DEVICE

This application is based upon and claims the benefit of priority from the corresponding Japanese Patent Applications (1) No. 2013-225279 filed Oct. 30, 2013, (2) No. 2013-225563 filed Oct. 30, 2013, (3) No. 2013-245342 filed Nov. 27, 2013, and (4) No. 2013-245349 filed Nov. 27, 2013, the entire contents of which are incorporated herein by reference.

BACKGROUND OF THE INVENTION

The present disclosure relates to a display input device including a display unit and a touch panel.

For instance, a display input device for inputting various settings via a screen may be attached to an apparatus or equipment. Further, as to a mobile phone terminal or the like, the number of hardware keys that can be disposed thereon is limited. Therefore, a plurality of roles (meanings) may be assigned to one key. Therefore, an input error may be caused because a user does not know a role (process) assigned to the current state of a key. In order to prevent such a decrease of operability, the following techniques are known.

Specifically, there is known an input device including an input unit for inputting a press of a key as an execution instruction of a process assigned to the key, a long press detection unit for detecting a long press state in which a key is continuously pressed, and an informing unit for informing a user of a process assigned to the key while inhibiting the input by the input unit when the long press state of the key is detected. With this structure, it is aimed to enable the user to easily check a process assigned to each key.

An image forming apparatus such as a copier, a multifunction peripheral, a printer, or a FAX apparatus may also be equipped with a display input device (which may referred to also as an "operation panel"). The operation panel of the image forming apparatus displays a screen for selecting a set item or for setting a set value. Because there are many selectable set items and settable set values, there are prepared many types of screens.

First, a highest layer screen in a hierarchical structure is displayed on the operation panel. Further, a button (key) for selecting a set item (classification or category) is operated on the screen (a display position thereof is touched). As a result, a next layer (one lower layer) screen is displayed. In the case of further necessity, a button is operated for selecting one of set items in a lower layer of the selected set item. Such button selection is repeated until reaching a desired screen. In other words, in order to reach a desired screen, operations on buttons are repeated so as to trace an appropriate path to a lower layer screen one by one. In this way, displays on the operation panel have a hierarchical structure (or a tree structure).

In order to switch a display screen, it is necessary to actually operate a button in a screen. In other words, a screen display cannot be switched unless a display position of a button is touched. Therefore, in order or check a lower screen by a plurality of layers, it is necessary to actually operate buttons a plurality of times (the number of layers to move), so as to switch screens. Therefore, there is a problem that it is difficult to easily check screens in lower layers. In particular, a screen in a lower layer of the current layer screen by two or more layers cannot be checked by one operation. In addition, an operation to return to the original screen is necessary unless the screen after switching is a desired screen. Therefore, a long time and operation may be necessary in many cases in order to reach a desired screen so as to set a set value.

In addition, in order to complete setting of one set value, it may be necessary to move down layers by two or more layers in many cases (e.g., in setting about the system). Therefore, transition of screens (switching of screens to a lower layer) is repeated. There may be a case where because a target screen is in a deep layer, the path to the desired screen cannot be found, and transition to an incorrect screen and operation for returning to the original screen are repeated. In this case, the number of operation times becomes very large, and the operation is complicated. In addition, because of repetition of screen switching and returning operation, the current position may become unknown.

Here, the known mobile phone terminal described above displays a function (process) assigned to a long-pressed key. However, though the function is displayed, the content of the screen cannot be checked unless the button is actually pressed. In addition, in order to move between layers of the display screen, it is necessary to operate the button every time. It is not able to check a screen by one operation when the screen is apart by a plurality of layers. In addition, the current layer may become unknown by repeating pressing of an incorrect key and the returning operation afterward.

SUMMARY OF THE INVENTION

The present disclosure is made in view of the problem of the conventional technique described above, and a display input device according to a first aspect of the present disclosure includes a display unit and a touch panel unit. The display unit displays a button in a screen, and switches a screen to be displayed from a screen that is currently displayed to one of a lower layer screen and an upper layer screen in accordance with the button that is operated in a normal mode. The touch panel unit accepts an operation on the screen of the display unit including an operation on the button displayed on the display unit. Further, when the touch panel unit accepts a predetermined transmission start operation, the display unit performs a transmission transition display in which a transition source screen that is currently displayed gradually disappears while a ratio of display of a transition destination screen that belongs to a next lower layer of the transition source screen is increased as time passes, so that the screen to be displayed is changed. While the transmission start operation is continued, the display unit repeats the transmission transition display toward a lower layer, in which the transition destination screen after the transition is completed with total transmission of the transition source screen is regarded as a new transition source screen, and a screen that belongs to a next lower layer of the new transition source screen is regarded as a new transition destination screen.

Further features and advantages of the present invention will become apparent from the description of embodiments given below.

BRIEF DESCRIPTION OF THE DRAWINGS

FIG. 9 is a diagram showing an example of a screen displayed on the operation panel according to the embodiment.

FIG. 10 is a diagram showing an example of a screen displayed on the operation panel according to the embodiment.

FIG. 11 is a diagram showing an example of a screen displayed on the operation panel according to the embodiment.

FIG. 12 is a diagram showing an example of a screen displayed on the operation panel according to the embodiment.

FIG. 31 is a diagram showing an example of speed setting data defining transition speed per layer in transmission transition to a lower layer according to the embodiment.

FIG. 32 is a diagram showing an example of a transition operation setting screen of the transmission transition display according to the embodiment.

FIG. 35 is a diagram showing an example of transition speed setting data defining transition time per one layer in the transmission transition to an upper layer according to the embodiment.

DETAILED DESCRIPTION OF THE EMBODIMENTS

An embodiment of the present disclosure is described with reference to FIGS. 1 to 35. Here, although the present disclosure can be applied to various types of display input devices, there is exemplified and described an operation panel 1 (corresponding to the display input device) included in a multifunction peripheral 100 (corresponding to the image forming apparatus). However, elements such as structures and layouts described in this embodiment do not limit the scope of the disclosure and are merely examples for description.

(Schematic Structure of Multifunction Peripheral 100)

Figure 1:
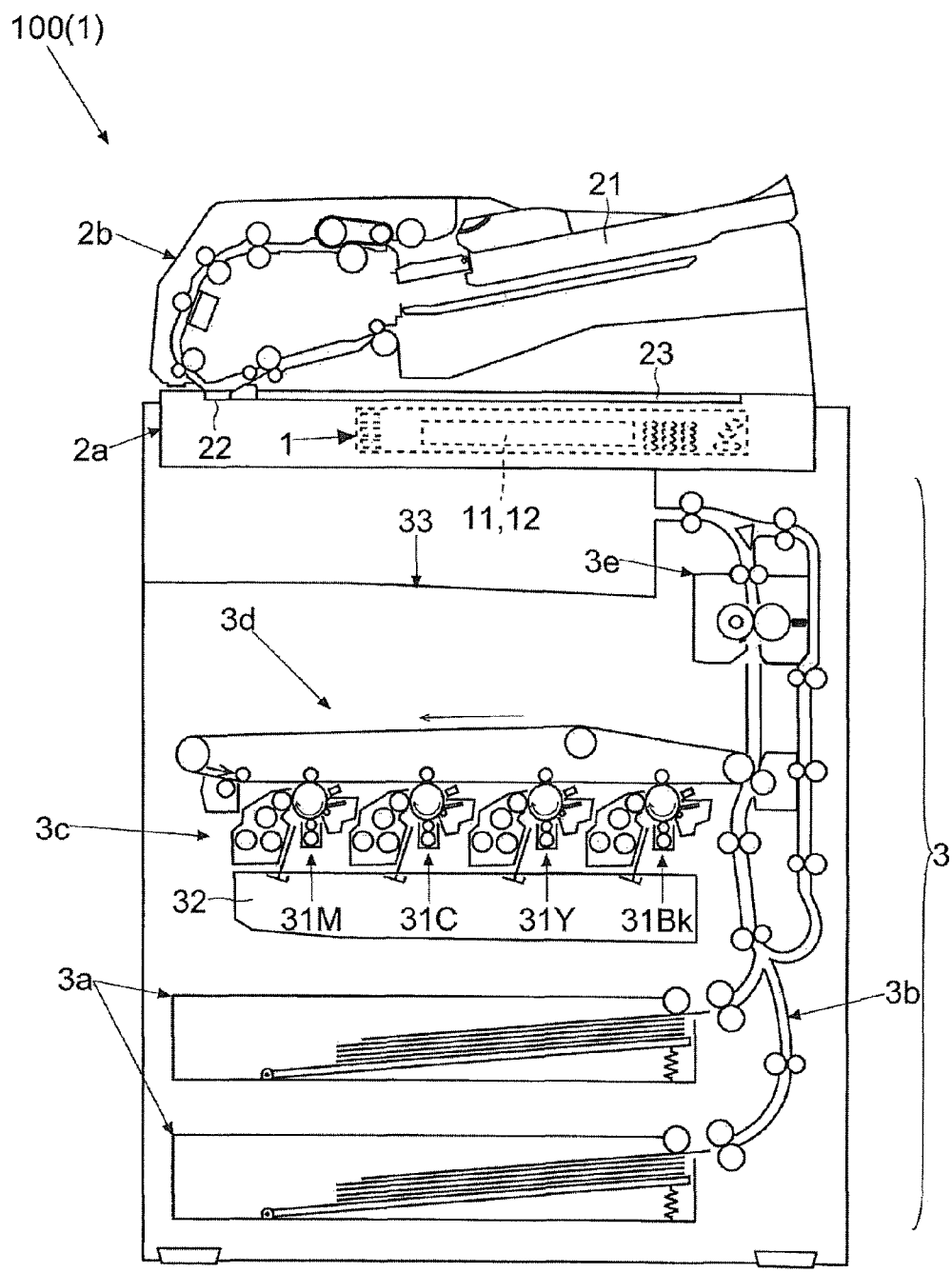
FIG. 1 is a diagram showing an example of a multifunction peripheral according to an embodiment.

First, with reference to FIG. 1, a schematic structure of a main body of the multifunction peripheral 100 according to the embodiment is described.

On an upper part of the multifunction peripheral 100 of this embodiment, there are disposed an image reader unit 2a, a document feeder unit 2b, and the operation panel 1 (details of the operation panel 1 is described later). The document feeder unit 2b successively feeds document sheets set on a document set tray 21 one by one to a read position (feed-reading contact glass 22) of the image reader unit 2a. In addition, the document feeder unit 2b can be opened and closed in such a manner that a front side swings about a pivot point (not shown) disposed on a rear side in FIG. 1. A document such as a book can be placed on a place-reading contact glass 23, and the document can be pressed downward by closing the document feeder unit 2b. The image reader unit 2a reads a document sheet passing the feed-reading contact glass 22 or a document placed on the place-reading contact glass 23, so as to generate image data. The generated image data of the document is used for copying, transmission, or the like.

In addition, a printer unit 3 is disposed in the main body of the multifunction peripheral 100. The printer unit 3 includes a paper sheet feeder 3a, a transport unit 3b, an image forming portion 3c, an intermediate transfer unit 3d, and a fixing unit 3e. The paper sheet feeder 3a stores and feeds paper sheets used for printing. The transport unit 3b is a passage for transporting a paper sheet in the apparatus. The image forming portion 3c includes image forming units 31Bk, 31Y, 31C, and 31M of individual colors (black, yellow, cyan, and magenta) and an exposing device 32 for exposing photoreceptor drums of the image forming units 31Bk to 31M, respectively. The image forming units 31Bk, 31Y, 31C, and 31M and the exposing device 32 form toner images of the individual colors based on the image data. The intermediate transfer unit 3d overlays the generated toner images received from the image forming units 31Bk, 31Y, 31C, and 31M without misregistration as primary transfer, and secondarily transfers the toner image onto a paper sheet fed from the paper sheet feeder 3a. The fixing unit 3e fixes the toner image transferred onto the paper sheet. The transport unit 3b discharges the paper sheet after passing through the fixing unit 3e onto the discharge tray 33.

(Operation Panel 1)

Figure 2:
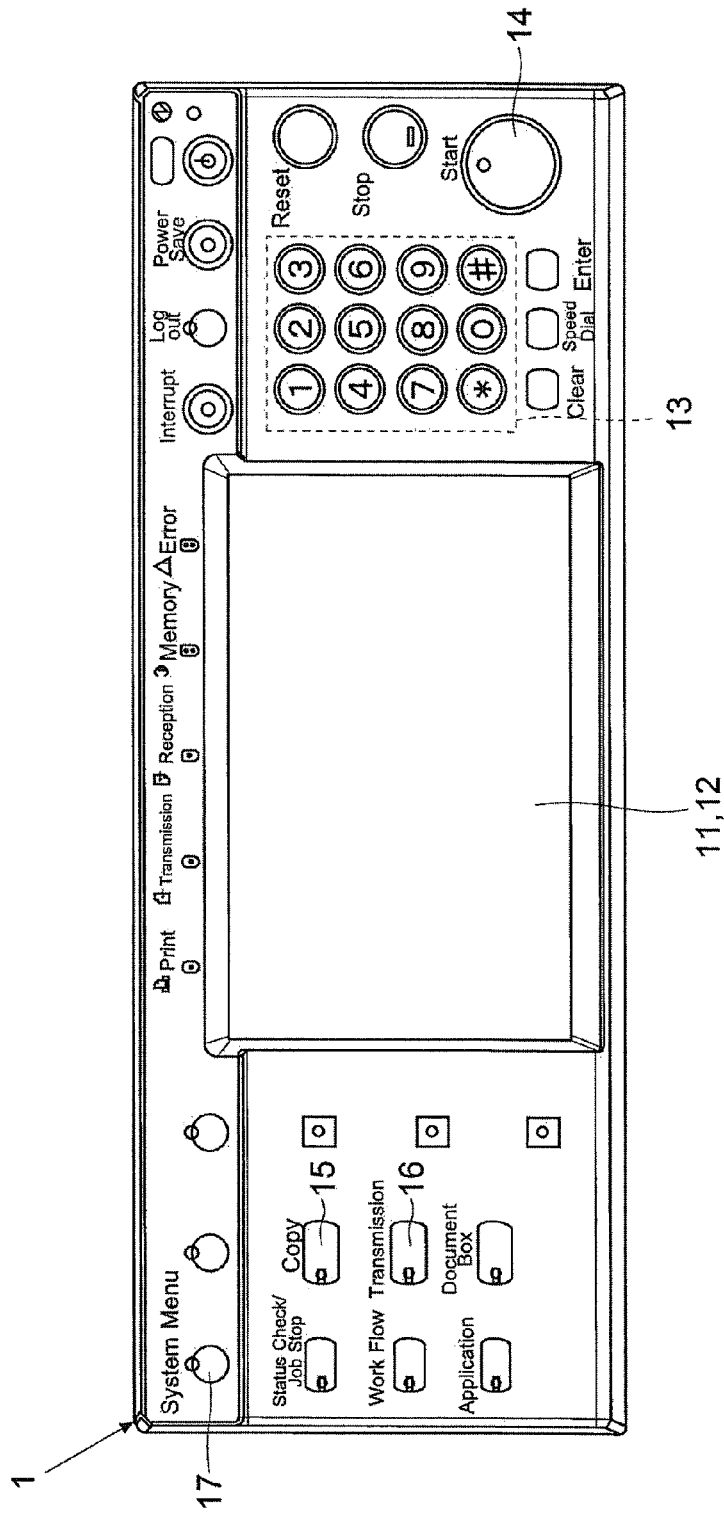
FIG. 2 is a diagram showing an example of an operation panel according to the embodiment.

Next, with reference to FIG. 2, an example of the operation panel 1 according to the embodiment is described. The operation panel 1 functions as the display input device for setting for printing such as copying, document reading, and transmission of image data. Further, as shown in FIG. 1, the operation panel 1 is disposed on a front upper part of the multifunction peripheral 100. The operation panel 1 includes a display unit 11.

The display unit 11 is a liquid crystal display panel. However, it is possible to use an organic EL display panel or other display panel instead of the liquid crystal panel. Further, the display unit 11 displays a selection screen of a set item (a function to be used) and a setting screen of the set value. In addition, the display unit 11 displays buttons (keys) for performing selection of a set item, setting of a set value, completion of setting, cancel of setting, and instruction to execute a job, and an image or a message of explanation in individual screens. By operating the button displayed on the display unit 11 (touching a display position of the button), the user makes settings of jobs that can be performed by the multifunction peripheral 100 (e.g., printing, scanning, and transmission) or settings about system.

In addition, there is disposed a touch panel unit 12 on the upper surface of the display unit 11. The touch panel unit 12 is used for detecting a touch position or coordinates. Note that a touch panel unit that can detect multiple touch points (e.g., a capacitive type) is used as the touch panel unit 12.

For instance, the operation panel 1 is provided with hardware keys such as a ten-key unit 13 for numerical input, and a start key 14 for instructing to start a job (such as copying) after various setting. In addition, a hardware key for selecting a function is also disposed. As the hardware keys, there are disposed a copy key 15 to be pressed for using a copy function, and a transmission key 16 to be pressed for using a transmission function such as a scanner function or a FAX function. In addition, there is also disposed a system menu key 17 to be pressed for setting for system of the multifunction peripheral 100 such as department management, user management, or communication setting.

(Hardware Structure of Multifunction Peripheral 100)

Figure 3:
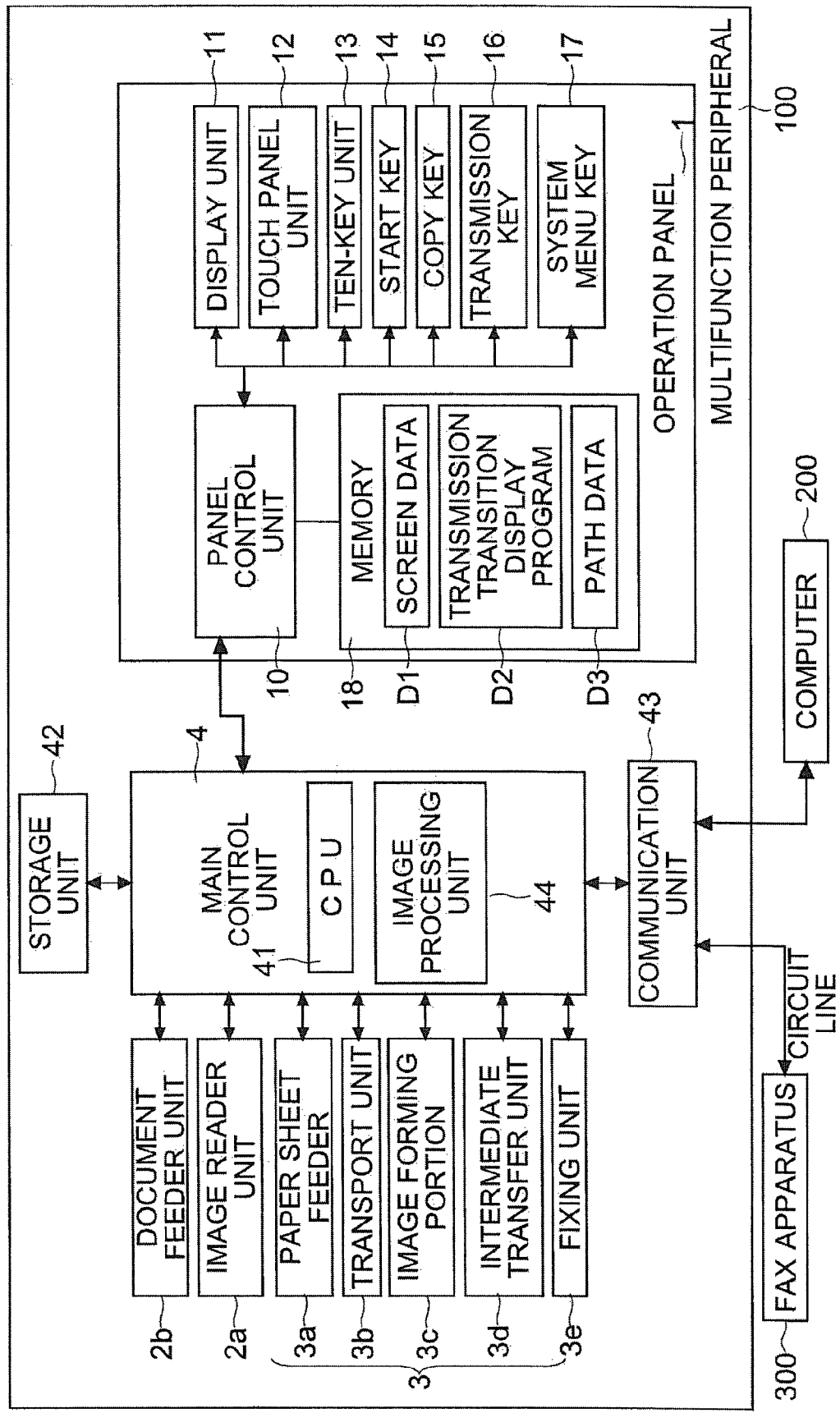
FIG. 3 is a diagram showing an example of a hardware structure of the multifunction peripheral according to the embodiment.

Next, with reference to FIG. 3, a hardware structure of the multifunction peripheral 100 according to the embodiment is described.

A main control unit 4 is disposed in the multifunction peripheral 100. The main control unit 4 controls the operation panel 1, the image reader unit 2a, the document feeder unit 2b, and the printer unit 3 (the paper sheet feeder 3a, the transport unit 3b, the image forming portion 3c, and the fixing unit 3e), for example.

The main control unit 4 includes an element such as a CPU 41 for processing and calculation. The CPU 41 performs calculation based on a control program stored in a storage unit 42, and controls individual units of the multifunction peripheral 100. Further, the main control unit 4 may be divided into function units such as a control unit for overall control and image processing, and an engine control unit for controlling printing such as ON/OFF of motors for rotating various rotation members and toner image formation.

The storage unit 42 is connected to the main control unit 4 in a communicable manner. The storage unit 42 is constituted as a combination of a nonvolatile storage device such as a ROM or an HDD and a volatile storage device such as a RAM. The storage unit 42 can store a control program of the multifunction peripheral 100, and various data such as control data, setting data, and image data.

Further, the main control unit 4 is connected to a communication unit 43 (communication interface) including various connectors, sockets, and a FAX modem in a communicable manner. The communication unit 43 is connected to a plurality of external computers 200 (e.g., personal computers and servers) and FAX apparatuses 300 via a network or a public line in a communicable manner (only one for each is shown in FIG. 3 for convenience sake). For instance, using the communication unit 43, it is possible to transmit the image data obtained by document reading by the image reader unit 2a to the computer 200 or the FAX apparatus 300 on the other end (as the scanner function or the FAX function). In addition, using the communication unit 43, it is possible to print in accordance with image data transmitted from the computer 200 or the FAX apparatus 300 on the other end to be supplied to the multifunction peripheral 100 (as a printer function or the FAX function).

In addition, for example, the main control unit 4 is provided with an image processing unit 44 for performing image processing on image data obtained by reading a document by the image reader unit 2a or image data supplied to the multifunction peripheral 100 via the communication unit 43. The image data processed by the image processing unit 44 is transmitted to the image forming portion 3c to be used for printing, to be stored in the storage unit 42, or to be transmitted to a transmission destination (e.g., computer 200) via the communication unit 43.

In addition, the main control unit 4 is connected to the operation panel 1 in a communicable manner. The main control unit 4 receives from the operation panel 1 a signal indicating a content of input or setting made on the operation panel 1. The main control unit 4 controls the printer unit 3, the document feeder unit 2b, the image reader unit 2a, the communication unit 43, and the storage unit 42, so that a job such as copying or transmission is executed in accordance with setting by the user.

Next, the operation panel 1 of this embodiment is described. The operation panel 1 includes a panel control unit 10, a memory 18, the display unit 11, the touch panel unit 12, the ten-key unit 13, the start key 14, the copy key 15, the transmission key 16, and the system menu key 17.

The panel control unit 10 (corresponding to a calculation unit) includes a CPU, an IC, and a driver circuit for the panel of the display unit 11. The panel control unit 10 controls a display on the display unit 11. In addition, the panel control unit 10 receives an output of the touch panel unit 12 and recognizes coordinates of a position pressed (touched) on the display unit 11 (touch panel unit 12). Data such as a table indicating association between an output of the touch panel unit 12 and the coordinates is stored in the memory 18. The panel control unit 10 compares the coordinates of the pressed position and image data of the screen displayed on the display unit 11, so as to specify and recognize the button operated (pressed) on the screen. In addition, the panel control unit 10 receives a signal from a hardware key and recognizes which hardware key is pressed.

In addition, the memory 18 stores screen data D1 for displaying screens in accordance with an operation to the touch panel unit 12 (a button disposed on each screen) or a hardware key. The screen data D1 is defined for each screen. The screen data D1 contains various data (image data, text data, and display position defining data) necessary for displaying a background, a framework, buttons to be displayed on the screen, a message, an explanation, and the like. In accordance with the operation, the panel control unit 10 reads out data necessary for displaying the next screen from the screen data and controls the display unit 11 to switch the screen.

(Hierarchical Structure of Screen Display)

Figure 4:
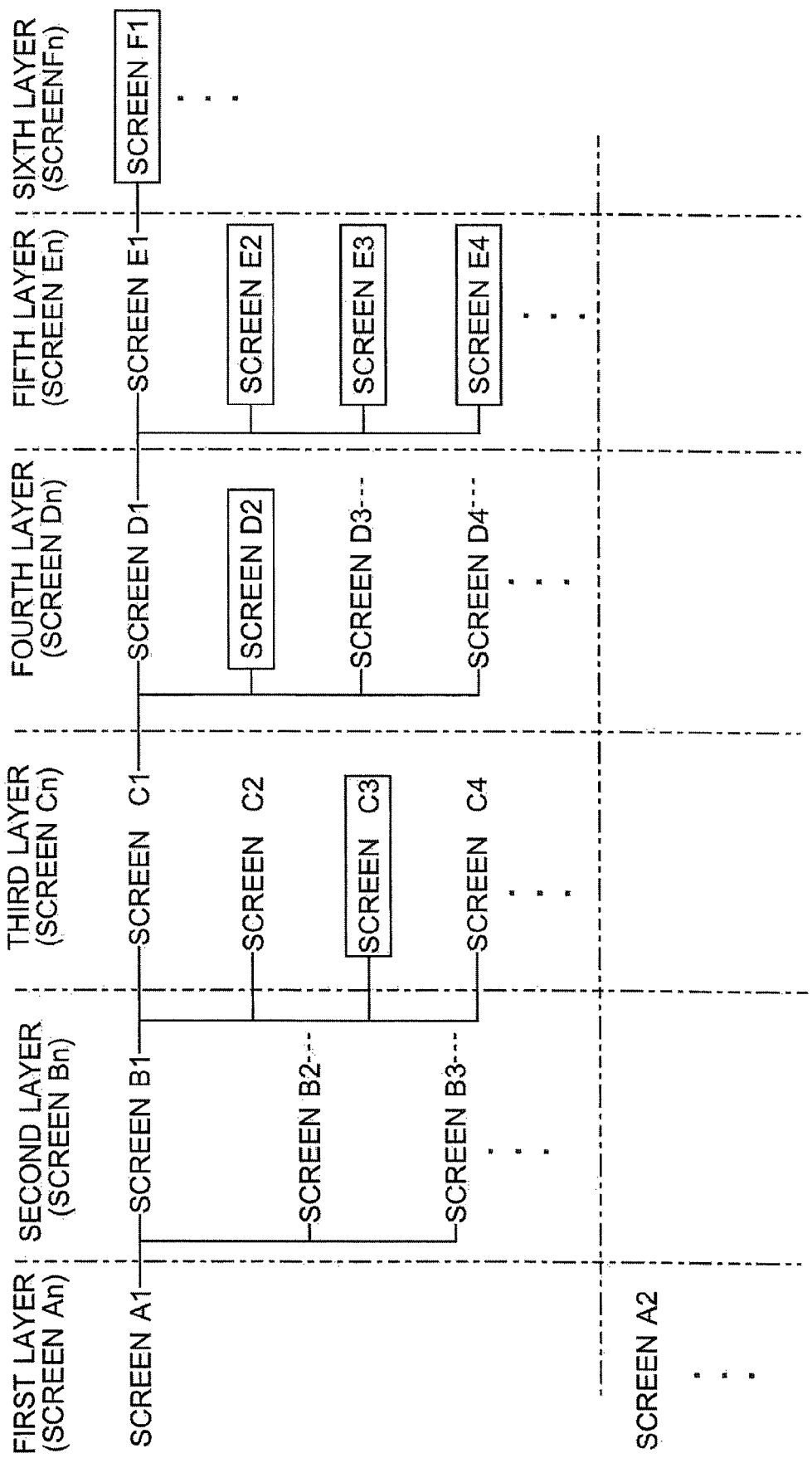
FIG. 4 is a diagram showing an example of a hierarchical structure of a screen display of the operation panel according to the embodiment.

Next, with reference to FIG. 4, a hierarchical structure of the screen display on the operation panel 1 according to this embodiment is described.

As to the operation panel 1 of this embodiment, the screen display has a hierarchical structure. When a key for selecting a function to be used such as the system menu key 17, the copy key 15, or the transmission key 16 is pressed, a main menu screen prepared for each function is displayed (see FIG. 5, which shows a main menu screen 51 concerning system setting corresponding to the system menu key 17). Main menu screens for copying, transmission, and system setting are prepared for individual functions. Each main menu screen corresponds to a first layer (highest layer) shown in FIG. 4.

In normal mode, the panel control unit 10 controls the display unit 11 to display a screen corresponding to the operated button (i.e., a next lower layer screen). In addition, in the screen, a button for returning to the upper layer such as a return button B14 is disposed. When the button for returning to the upper layer is operated, the panel control unit 10 controls the display unit 11 to display a next upper layer screen of the currently displayed screen.

Further, in FIG. 4, screens surrounded by solid line boxes (screen C3, screen D2, and screens E2 to E4) are lowest layers in transition paths. In other words, the screens surrounded by boxes are end screens in the paths. For instance, the lowest layer screen is a screen for selecting and setting a set value. As shown in FIG. 4, the screen layer for setting a set value is not always the same. The number of layers between the highest layer and the lowest layer depends on the path. Therefore, the number of times of operating buttons until reaching the screen for setting a set value depends on a type of the screen.

Because of this hierarchical structure, the user operates buttons a plurality of times to reach a target screen, so as to trace the path from the first layer (highest layer) to the target screen (desired screen) in the normal mode.

(Normal Screen Switching Operation)

The operation panel 1 of this embodiment has a transmission transition mode in which the display unit can perform successive screen transition by a transmission transition display by one operation. However, with reference to FIGS. 5 to 10 first, a normal screen switching operation (screen transition) (in a normal mode) is described.

In this description, there is exemplified a case where setting about system of the multifunction peripheral 100 is made. Specifically, there is described a case where the system menu key 17 (see FIG. 2) is pressed on the operation panel 1 so as to make settings about the user management. Descriptions about other settings (paths) are omitted.

Figure 5:
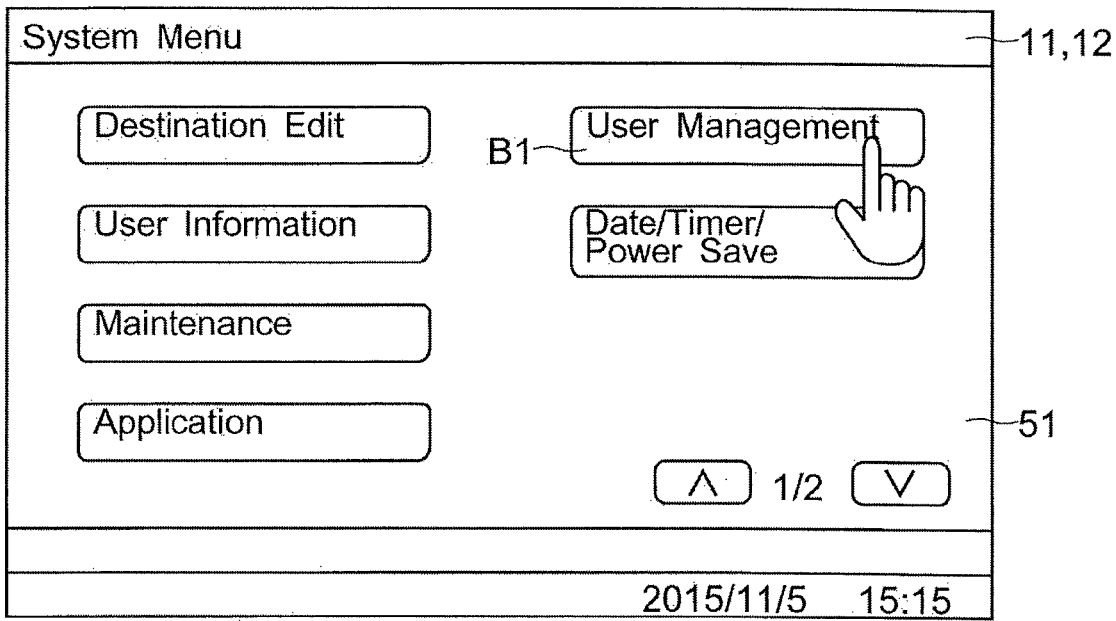
FIG. 5 is a diagram showing an example of a screen displayed on the operation panel according to the embodiment.

FIG. 5 shows an example of the main menu screen 51 that is displayed when the system menu key 17 is pressed. When the system menu key 17 is pressed, the panel control unit 10 controls the display unit 11 to display the main menu screen 51. The main menu screen 51 is a highest layer screen among screens about the system setting. Unless the transmission start operation for displaying in the transmission transition mode is performed, the panel control unit 10 controls the display unit 11 to switch the screen on every operation of a button as response to the operation in the normal mode.

A plurality of buttons are disposed in the main menu screen 51. The buttons disposed in the main menu screen 51 indicate a large classification of the set items. When settings about the user management is made, the user operates (touches a display position thereof, and the same applies hereinafter) a user management button B1 (bearing a character string "user management"). Further, when a button other than the user management button B1 in the main menu screen 51 is operated, a corresponding screen (e.g., a screen concerning system setting such as maintenance or language setting) is displayed. However, description of details is omitted.

Figure 6:
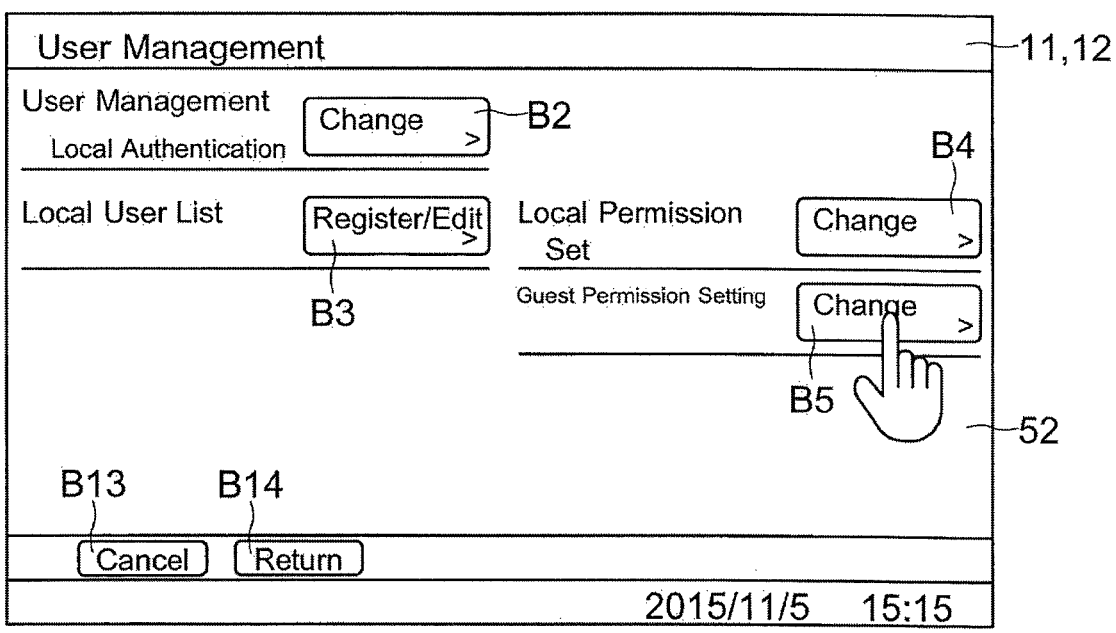
FIG. 6 is a diagram showing an example of a screen displayed on the operation panel according to the embodiment.

When the user management button B1 is operated, as shown in FIG. 6, the panel control unit 10 controls the display unit 11 to display a user management screen 52 that is the next lower layer. In the user management screen 52, there are disposed an authentication method button B2 (accompanying a character string "user management" and bearing a character string "change"), a user list button B3 (accompanying a character string "local user list" and bearing a character string "register/edit"), a local permission button B4 (accompanying a character string "local permission" and bearing a character string "change"), and a guest permission button B5 (accompanying a character string "guest permission setting" and bearing a character string "change"). The authentication method button B2 is a button for displaying a screen for setting whether to perform local authentication (based on user information stored in the multifunction peripheral 100) or to perform network authentication (based on user information stored in a server via a network). The user list button B3 is a button for registering and editing users who are given permission to use the multifunction peripheral 100. The local permission button B4 is a button for displaying a screen for restricting or canceling functions (such as copying, scanning, and transmission) that each user can use. The guest permission button B5 is a button for displaying a screen for setting about a person (guest) who is given temporary permission to use without registering as a user in the multifunction peripheral 100 or the server.

Figure 7:
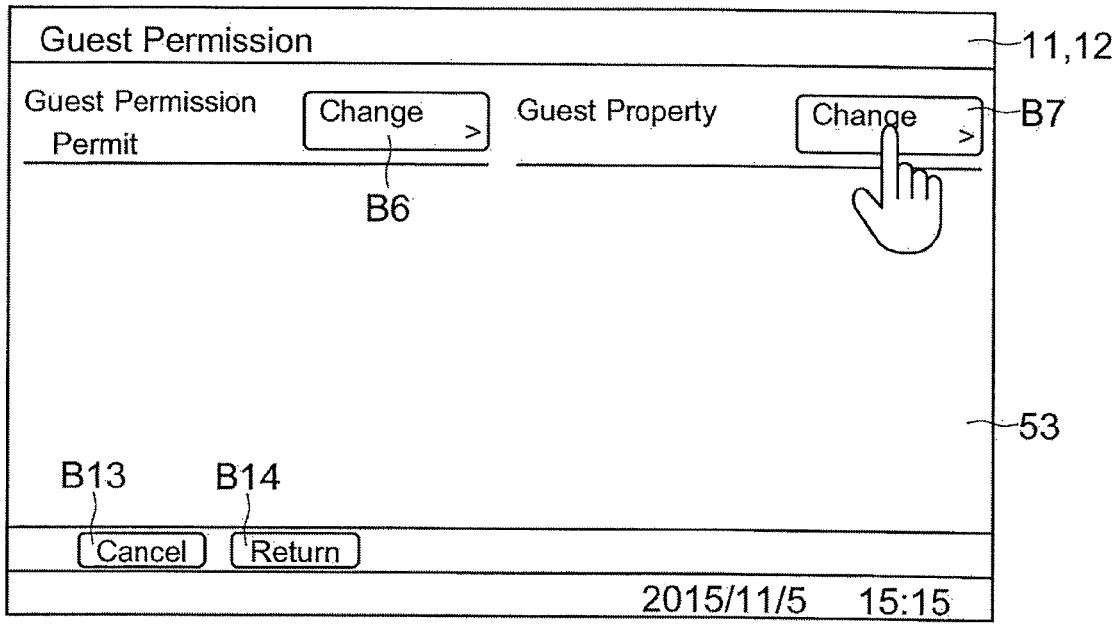
FIG. 7 is a diagram showing an example of a screen displayed on the operation panel according to the embodiment.

When the guest permission button B5 is operated, the panel control unit 10 controls the display unit 11 to display a guest permission setting screen 53 belonging to the next lower layer (see FIG. 7). Further, when a button other than the guest permission button B5 is pressed in the user management screen 52, a corresponding screen is displayed, but description thereof is omitted.

In the guest permission setting screen 53, there are disposed a guest permission/inhibition button B6 (accompanying a character string "guest permission" and bearing a character string "change"), and a guest property button B7 (accompanying a character string "guest property" and bearing a character string "change"). The guest permission/inhibition button B6 is a button for displaying a screen for setting whether or not to permit a guest to temporarily use the multifunction peripheral 100. The guest property button B7 is a button for displaying a screen for setting details of the guest (property).

Figure 8:
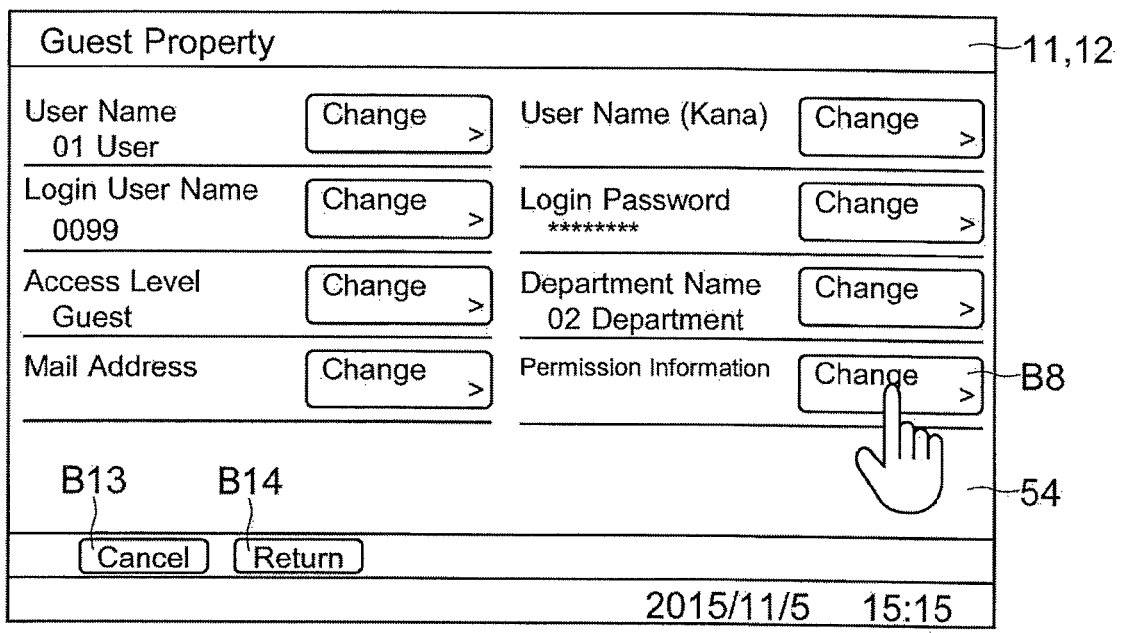
FIG. 8 is a diagram showing an example of a screen displayed on the operation panel according to the embodiment.

When the guest property button B7 is operated in the guest permission setting screen 53, the panel control unit 10 controls the display unit 11 to display a guest property setting screen 54 belonging to the next lower layer (see FIG. 8). Further, when a button other than the guest property button B7 is pressed in the guest permission setting screen 53, a corresponding screen is displayed, but description thereof is omitted.

In the guest property setting screen 54, there are total eight buttons for setting information in the case where a guest is regarded as a user. By touching the buttons disposed in the guest property setting screen 54, it is possible to set a user name (i.e., a guest name), a log-in name for logging in as a guest, a password for logging in as a guest, and the like (see FIG. 8). When a button of a set item that requires input of a character string (e.g., the user name or the guest name) is operated, the panel control unit 10 controls the display unit 11 to display a software keyboard (not shown) for inputting a character string. In addition, among the buttons disposed in the guest property setting screen 54, a permission information button B8 (accompanying a character string "permission information" and bearing a character string "change") is a button for displaying a screen for restricting functions that the guest can use among functions of the multifunction peripheral 100 (e.g., copying and transmission), and for changing the function that the guest can use.

When the permission information button B8 is operated in the guest property setting screen 54, the panel control unit 10 controls the display unit 11 to display a restriction setting screen 55 belonging to the next lower layer (see FIG. 9). Further, when a button other than the permission information button B8 is pressed in the guest property setting screen 54, a corresponding screen is displayed, but description thereof is omitted.

In the restriction setting screen 55, there are total nine buttons for restricting functions that the guest can use. Functions that the guest as a user can use can be determined by operating the buttons disposed in the restriction setting screen 55.

For instance, it can be set whether or not the guest can use the multifunction peripheral 100 as a copy machine or a printer, or whether or not the guest can print in color. In addition, it can be set whether or not to permit the guest to store image data obtained by reading by the image reader unit 2a in an external memory (such as a USB memory connected to the multifunction peripheral 100) or in the storage unit 42. In addition, it can also be set whether or not to permit the guest to use the transmission function via a network or FAX. Further, among the buttons disposed in the restriction setting screen 55, a transmission restriction button B9 (accompanying a character string "transmission restriction" and bearing a character string "change") is a button for displaying a screen for setting whether or not the guest can use a function of transmitting image data to the computer 200 or the storage device on the network (except the facsimile transmission).

When the transmission restriction button B9 is operated in the restriction setting screen 55, the panel control unit 10 controls the display unit 11 to display a transmission restriction screen 56 belonging to the next lower layer (see FIG. 10). Further, when the button other than the transmission restriction button B9 is pressed on the restriction setting screen 55, a screen corresponding to the operated button is displayed, but description thereof is omitted.

The transmission restriction screen 56 is a screen for setting a set value. Further, the transmission restriction screen 56 is a lowest layer screen. In the transmission restriction screen 56, it is possible to select (set) one of a set value indicating "to permit the guest to use transmission" and a set value indicating "not to permit the guest to use transmission".

Specifically, in the transmission restriction screen 56, there are displayed a restriction execution button B10 (bearing a character string "set") for executing the transmission restriction, and a restriction inexecution button B11 (bearing a character string "not set") for not executing the transmission restriction. When an OK button B12 (bearing a character string "OK") is operated after the restriction execution button B10 is operated, the panel control unit 10 recognizes that the setting for executing the transmission restriction is made. The panel control unit 10 transmits the set content to the main control unit 4. As a result, the main control unit 4 controls the communication unit 43 to disable image data transmission by the guest. Alternatively, the panel control unit 10 does not accept (ignore) the transmission execution instruction from the guest. On the other hand, when the OK button B12 is operated after the restriction inexecution button B11 is operated, the panel control unit 10 recognizes that the setting for not executing the transmission restriction is made. In this case, the panel control unit 10 accepts setting about transmission by the guest and transmits the set content to the main control unit 4. The main control unit 4 controls the communication unit 43 and the image reader unit 2a so that a transmission job corresponding to the transmitted set content is executed.

Here, in the lowest layer screen (for setting a set value), the OK button B12 is disposed. In addition, the OK button B12 may be disposed in a screen for setting a set value except for FIG. 10. When the OK button B12 is operated so that setting of a set value is completed, the panel control unit 10 switches the screen to the highest layer screen (returns to a base screen or the main menu screen).

In addition, a cancel button B13 (bearing a character string "cancel") for canceling the setting is also disposed in each screen. When the cancel button B13 is operated, the panel control unit 10 does not change the current set value and controls the display unit 11 to display the highest layer screen (main menu screen 51). In addition, the return button B14 (bearing a character string "return") is disposed in screens other than the highest layer screen. When the return button B14 is operated, the panel control unit 10 controls the display unit 11 to display a next upper layer screen of the current screen (to return the path).

In this way, the display unit 11 displays the buttons in the screen. Further, in accordance with an output of the touch panel unit 12 for accepting an operation of the button displayed on the display unit 11, the display unit 11 switches the currently displayed screen to one of a lower layer screen and an upper layer screen.

In addition, for the later description, there is described a screen that is displayed when operating the user list button B3 (accompanying a character string "local user list" and bearing a character string "register/edit") in the user management screen 52 (see FIG. 6) described above (a screen on the path when the user list button B3 is operated). In addition, there is also described a screen that is displayed when operating the guest permission/inhibition button B6 (accompanying a character string "guest permission" and bearing a character string "change") in the guest permission setting screen 53 (see FIG. 7) (a screen on the path when the guest permission/inhibition button B6 is operated).

When the user list button B3 is operated in the user management screen 52, the panel control unit 10 controls the display unit 11 to display a register/edit screen 57 belonging to the next lower layer (see FIG. 11). The register/edit screen 57 is a screen for changing user registration or registered contents.

A new registration button B15 (accompanying a character string "new registration" and bearing a character string "register"), and an edit button B16 (accompanying a character string "edit" and bearing a character string "edit") are disposed in the register/edit screen 57. The new registration button B15 is a button for displaying a screen for newly registering a user who can use in the multifunction peripheral 100 (storage unit 42). The edit button B16 is a button for displaying a screen for editing (changing or correcting) user information (user property) stored in the multifunction peripheral 100 (storage unit 42) as a user who can use.

When the edit button B16 is operated in the register/edit screen 57, the panel control unit 10 controls the display unit 11 to display a user property setting screen (not shown) belonging to the next lower layer. Note that the user property setting screen is similar to the guest property setting screen 54 shown in FIG. 8. For the same item as in the guest property setting screen 54, the user information can be set by using the software keyboard to input characters, numerals, and symbols. For instance, in the user property setting screen, the user name, the log-in name for logging in, the password for the user to log in, and the like can be set or changed.

Further, also in the case where the new registration button B15 is operated in the register/edit screen 57, the user property setting screen is displayed. When the edit button B16 is operated, the panel control unit 10 controls to display content that is input before and stored in the memory 18 in the user property setting screen. On the other hand, when the new registration button B15 is operated, the panel control unit 10 controls to display the user property setting screen in a state with no input. Further, there is a further next lower layer screen of the user property setting screen, but description of details is omitted.

On the other hand, when the guest permission/inhibition button B6 (accompanying a character string "guest permission" and bearing a character string "change") is operated in the guest permission setting screen 53, the panel control unit 10 controls the display unit 11 to display a guest permission/inhibition setting screen 58 belonging to the next lower layer (see FIG. 12). The guest permission/inhibition setting screen 58 is a screen for setting whether or not to permit the guest to use. In other words, the guest permission/inhibition setting screen 58 is a screen for setting whether or not to permit only registered users to use the multifunction peripheral 100.

In the guest permission/inhibition setting screen 58, there are displayed a permission button B17 (bearing a character string "permit") and a non-permission button B18 (bearing a character string "not permit"). The permission button B17 is operated when permitting a guest (i.e., a user who is not registered in the multifunction peripheral 100) to temporarily use the multifunction peripheral 100. The non-permission button B18 is operated when temporary use of the multifunction peripheral 100 is not permitted to the guest.

When the permission button B17 is operated and further the OK button B12 is operated in the guest permission/inhibition setting screen 58, the panel control unit 10 becomes a state of permitting the guest to use. Specifically, when a correct guest name and a guest password are input in a login screen (not shown) displayed in a logged out state, the state is changed to a logged in state. In the logged in state, the panel control unit 10 recognizes setting by the guest using the touch panel unit 12 and hardware keys. Further, the logged in state is canceled when a predetermined time has elapsed without using or when the job is completed, and hence the operation panel 1 and the multifunction peripheral 100 are changed to the logged out state.

On the other hand, when the non-permission button B18 is operated and further the OK button B12 is operated in the guest permission/inhibition setting screen 58, the panel control unit 10 becomes a state in which a guest is not permitted to use. Specifically, when a guest name and a guest password are input in a login screen (not shown) displayed in a logged out state, the state is not changed to a logged in state. Further, the operation panel 1 maintains the state where job setting and a job execution instruction are not accepted.

(Outline of Transmission Transition Display)

Figure 13:
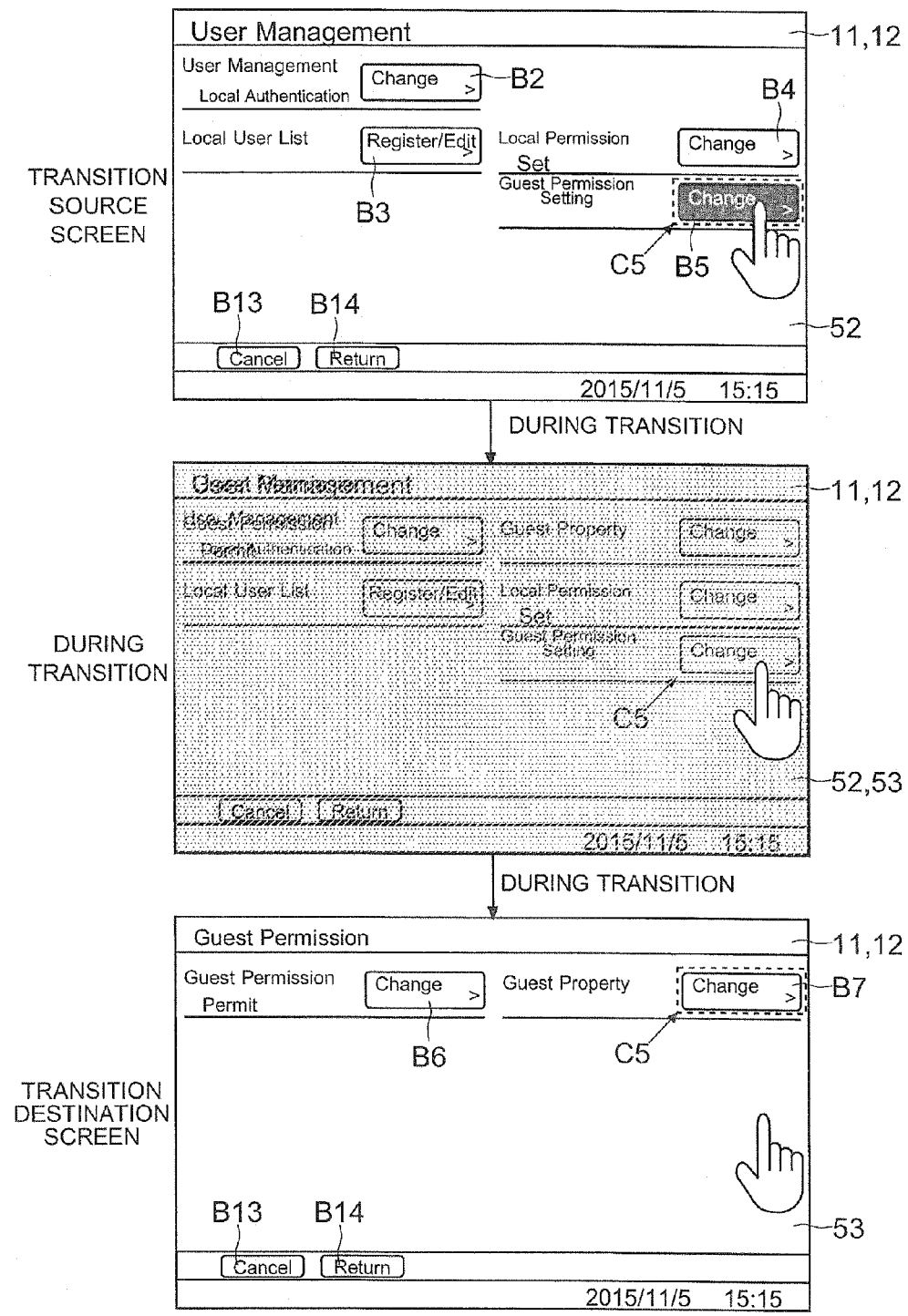
FIG. 13 is a diagram showing an example of a transmission transition display according to the embodiment.
Figure 14:
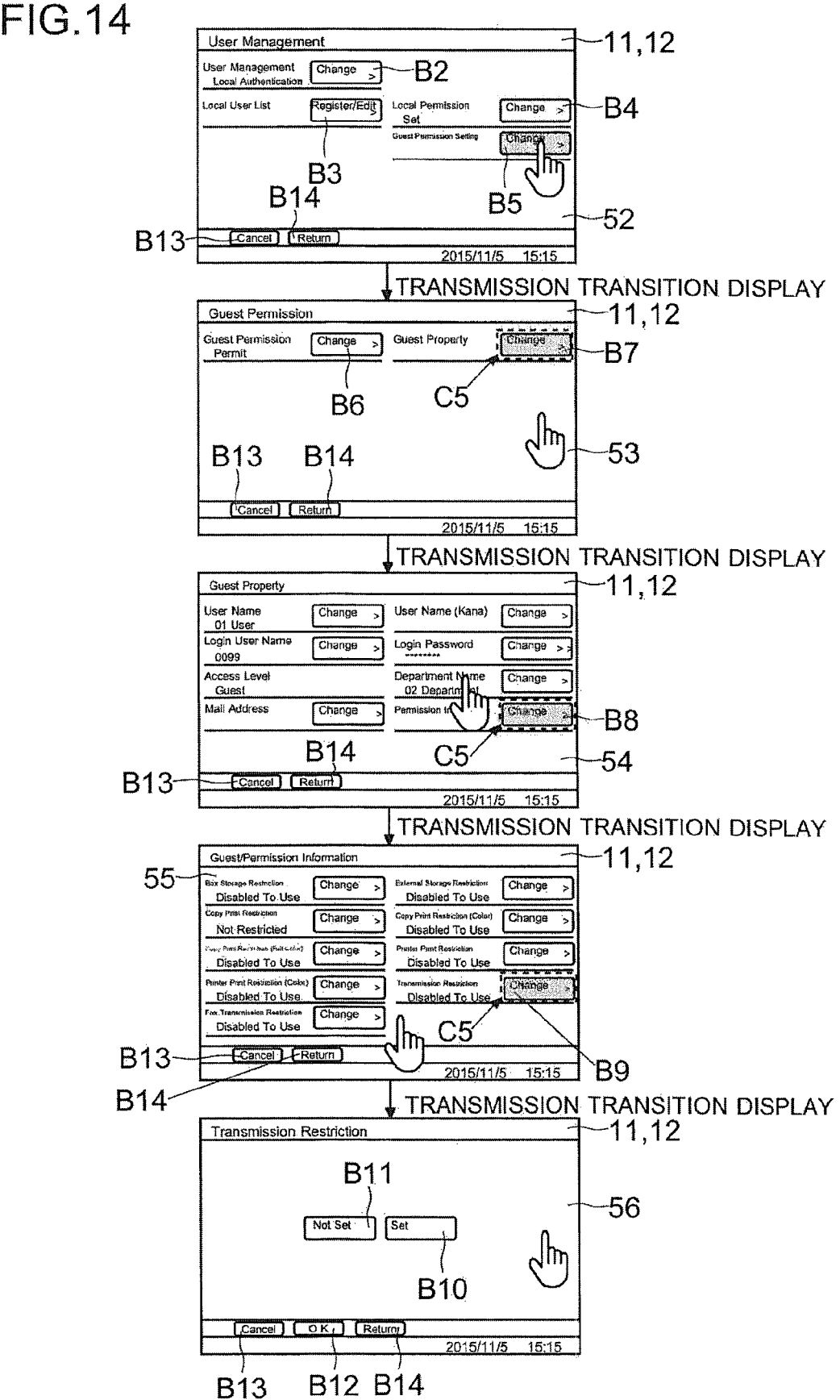
FIG. 14 is a diagram showing an example of a transmission transition display over a plurality of layers according to the embodiment.

Next, with reference to FIG. 13 and FIG. 14, an outline of the transmission transition display of the operation panel 1 of this embodiment is described.

The touch panel unit 12 accepts a predetermined transmission start operation as an instruction to perform the transmission transition display (an instruction to change to the transmission transition mode). When the touch panel unit 12 accepts the transmission start operation, the panel control unit 10 controls the display unit 11 to change the display mode to the transmission transition mode. Here, in the transmission transition display toward a lower layer, the panel control unit 10 brings a transition source screen that is currently displayed to disappear as time passes. Further, the panel control unit 10 controls the display unit 11 to perform a display in which a ratio of display of a transition destination screen that is a next lower layer screen of the transition source screen is increased as time passes, so as to change (switch) the screen to be displayed. In other words, when the transmission transition display is performed toward a lower layer, the panel control unit 10 controls the display unit 11 to display in such a manner that the upper layer screen gradually disappears while the lower layer screen gradually appears.

Further, though details are described later, the transmission transition mode can be finished by a predetermined finishing operation of taking all fingers off the touch panel unit 12. In other words, after the transmission start operation, the transmission transition mode is maintained while the touch panel unit 12 is continuously touched.

Specifically, with reference to FIG. 13, description is added. FIG. 13 shows an example in which the user management screen 52 (see FIG. 6) is regarded as a first transition source screen while the guest permission setting screen 53 (see FIG. 7) is regarded as a first transition destination screen. In other words, there is shown an example in which the transmission transition display is performed from the user management screen 52 to the guest permission selling screen 53.

First, the transmission start operation is described. An operation to be regarded as the transmission start operation can be determined appropriately. The touch panel unit 12 of this embodiment accepts an operation of long pressing a display position of a button displayed in the screen in the normal mode state as the transmission start operation. Further, the transmission start operation may be other type of operation such as an operation of two point touching of a button displayed in the screen, or an operation of moving a touch position so as to cross an inside area of the button along a longitudinal direction of the button.

Further, in accordance with an output of the touch panel unit 12, the panel control unit 10 recognizes a long press operation of a button in the normal mode (transmission start operation) as an instruction input for performing the transmission transition display (instruction to change to the transmission transition mode). Specifically, when a display position of a button is touched and a display area of the same button is continuously touched for a predetermined long press period (e.g., approximately 0.5 to a few seconds), the panel control unit 10 recognizes that the long press (transmission start operation) is made. By this recognition as a trigger, the panel control unit 10 controls the display unit 11 to start the transmission transition display. A first transition source screen of the transmission transition display is the screen having the button that is used for the transmission start operation (the highest layer screen in the example of FIG. 13).

Further, when the long press is continued, the touch position may be shifted from the long press position. In addition, there may be a user who is difficult to press the same position continuously because of an injured hand or a congenital reason. Therefore, even if the panel control unit 10 recognizes that the touch position is shifted based on an output of the touch panel unit 12, the panel control unit 10 may recognize that the touching (transmission start operation) is continued in the case where a shift distance is within a predetermined permissible range.

When the transmission start operation is made so that the transmission transition display (transmission transition mode) is started, the panel control unit 10 replaces pixels of the transition source screen (upper layer screen) with pixels of the transition destination screen (lower layer screen) gradually (step by step) in a necessary time period.

Specifically, in the initial (first) transmission transition display, the panel control unit 10 regards the screen in which the transmission start operation was made as the first transition source screen. In addition, the panel control unit 10 regards the screen (corresponding screen) that is displayed when the button used for the transmission start operation is operated in the normal operation (normal mode) as the first transition destination screen. In this way, the transmission start operation (such as the long press operation of continuously touching the same position) is made on the button for which the lower layer screen is desired to check, and hence the range of screens in transition can be restricted. Further, the path of transition can be narrowed in an initial stage. Specifically, FIG. 13 shows an example in which the long press operation is made on the guest permission button B5 in the user management screen 52, and hence the panel control unit 10 performs the transition display (switches the screen) to the guest permission setting screen 53. Note that the guest permission setting screen 53 is a screen that is displayed when the guest permission button B5 is operated in the user management screen 52.

In the transmission transition display, the panel control unit 10 repeats a process of replacing a part of pixels of the transition source screen with pixels of the transition destination screen in a periodical manner (at a constant interval). The replacing process is performed a plurality of number of times. The transition destination screen is being displayed so as to overlay (emerge) on the transition source screen step by step. Further, the panel control unit 10 finally completes switching to the transition destination screen (100% transmittance of the transition source screen). In other words, the panel control unit 10 repeats the process of replacing pixels of the transition source screen with pixels of the transition destination screen by a constant number of pixels a predetermined number of times at a constant period from a start time point of the transition until all the pixels are replaced with pixels of the transition destination screen. Note that the predetermined number of times (the number of steps from start to completion of the transition) can be determined appropriately (e.g., a few tens to 100).

By repeating the replacement of the constant number of pixels the predetermined number of times, the transition source screen disappears step by step (gradually) while the transition destination screen appears step by step (gradually). Thus, transmission (animation-like) switching of the screen to be displayed can be performed (see the middle part of FIG. 13). By input to the touch panel unit 12, it is possible to determine the interval (period) of the replacing process in advance. Alternately, by input to the touch panel unit 12, a time necessary for transmission transition from the transition source screen to the transition destination screen (from transmission start to completion) can be determined in advance. In this case, the panel control unit 10 determines the interval of the replacing process by dividing the necessary time by a predetermined number of replacing times. In accordance with the determined interval, the replacing process of pixels is performed.

Further, the transmission transition display is not limited to the above-mentioned transition pattern, and other display method may be used. For instance, the panel control unit 10 may control the display unit 11 to switch the display screen in which the transition source screen disappears step by step while the transition destination screen appears step by step, by decreasing density of the transition source screen at a constant interval while increasing density of the transition destination screen at a constant interval. In addition, it is possible to configure to replace pixels of the transition source screen with pixels of the transition destination screen by line unit from one of upper, lower, left, and right sides to the opposite side of the display unit 11 (partially transmission display). Alternatively, it is possible to adopt a structure in which the transition destination screen appears by sliding from one of sides of the display unit 11.

In this way, by devising the number of pixels or positions of pixels to be replaced from the transition source screen to the transition destination screen at a constant interval, various transmission effects can be expressed. A program for performing this transmission transition display is stored as a transmission transition display program D2 in the memory 18 (see FIG. 3). The panel control unit 10 changes display on the display unit 11 based on the transmission transition display program D2 and image data of the transition source screen and the transition destination screen.

Summarizing the above, the panel control unit 10 controls the display unit 11 to perform the transmission transition display from the transition source screen to the transition destination screen that is the next lower layer screen of the transition source screen in a predetermined necessary time (e.g., approximately 1 to 3 seconds, which can be appropriately determined).

Further, as shown in the middle part of FIG. 13, in order to clearly indicate that the screen is under being changed, the panel control unit 10 may control the display unit 11 to display with light color or half-tone dot meshing over the entire screen during the transition. Further, when the replacement of all pixels from the transition source screen to the transition destination screen is completed, the panel control unit 10 stops the display with light color or half-tone dot meshing.

(Automatic Repetition of Transmission Transition Display)

Figure 15:
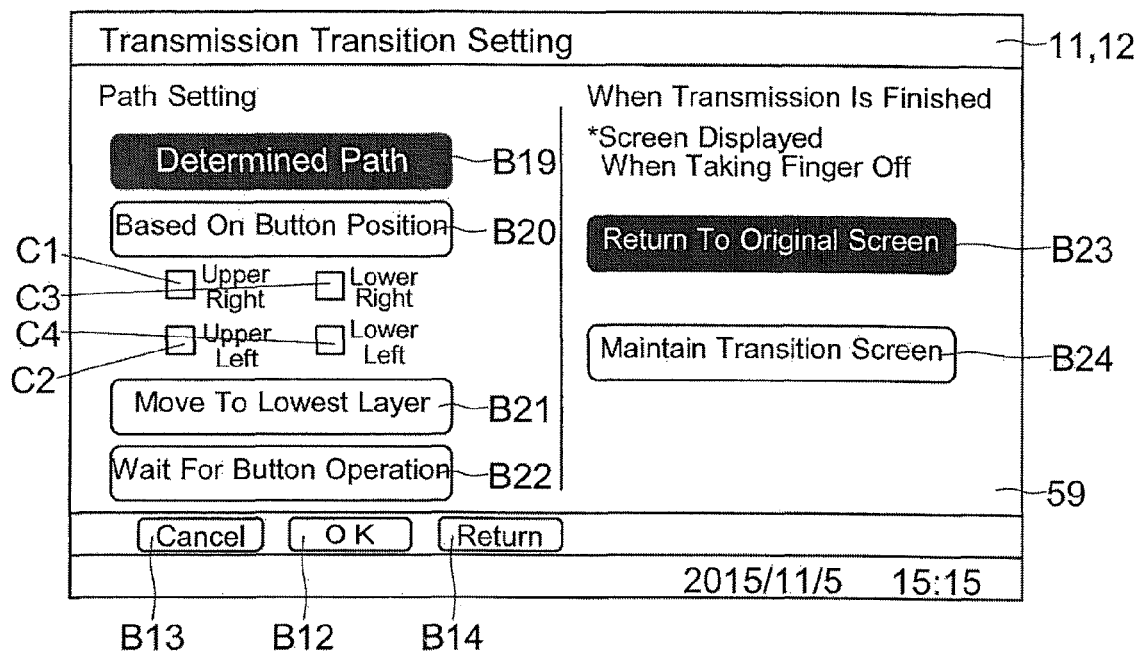
FIG. 15 is a diagram showing an example of a setting screen of the transmission transition display according to the embodiment.

Next, with reference to FIG. 14 and FIG. 15, automatic repetition of the transmission transition display on the operation panel 1 of this embodiment is described.

In the multifunction peripheral 100 of this embodiment, when the screen transition is performed in the transmission transition mode, it is possible to select a transition destination screen (that is a next transition destination screen after the current transition is completed) by performing a temporary halt operation or a transition destination setting operation (details are described later) during the transition from the transition source screen to the transition destination screen (details are described later).

On the other hand, in the case of no operation for determining the next transition destination (the temporary halt operation or the transition destination setting operation) during the transition, the panel control unit 10 automatically selects the next (new) transition destination screen and controls the display unit 11 to continue (repeat) the automatic transmission transition display until reaching the lowest layer screen.

Therefore, with reference to FIG. 14 and FIG. 15, before describing the operation for selecting the next transition destination screen, there is described an automatic selection of the transition destination screen (transition path) and an automatic repetition in the case of no operation for determining the next transition destination, as follows.

In the operation panel 1 of this embodiment, in the case where the touching of the touch panel unit 12 (that is started from the transmission start operation) is continued and further there is no operation for determining the next transition destination during the transmission transition mode, the panel control unit 10 regards the transition destination screen after the transition is completed as a new transition source screen. In addition, the panel control unit 10 automatically selects a screen among screens belonging to the next lower layer of the new transition source screen. Then, the panel control unit 10 controls the display unit 11 to perform the next transmission transition display toward a lower layer by regarding the automatically selected screen as the new transition destination screen.

FIG. 14 shows an example in which the panel control unit 10 controls the display unit 11 to automatically continue (repeat) the transmission transition display by regarding the transition destination screen after the transition is completed as a new transition source screen and by regarding a screen belonging to the next lower layer of the screen after the transition is completed as a new transition destination screen.

In this way, after the transmission start operation is made, the transmission transition display toward a lower layer is repeated only by continuing to touch, so that two or more screens can be automatically switched. Therefore, by continuing to touch after the transmission start operation, it is possible to check screens on a path to the lowest layer screen.

For instance, when the transmission start operation is made on the user management screen 52 and the touching is continued without selecting a next transition destination screen, the panel control unit 10 controls the display unit 11 to switch the screen in order of the user management screen 52, the guest permission setting screen 53, the guest property setting screen 54, the restriction setting screen 55, and the transmission restriction screen 56. Further, the panel control unit 10 controls the display unit 11 to perform the transmission transition display in switching between the screens (see FIG. 14).

In this way, the display input device (operation panel 1) according to the embodiment includes the display unit 11 configured to display the button in the screen, and to switch the screen to be displayed from the screen that is currently displayed to one of the lower layer screen and the upper layer screen in accordance with the button that is operated in the normal mode, and the touch panel unit 12 for accepting the operation on the screen of the display unit 11 and accepting the operation on the button displayed on the display unit 11. Further, when the touch panel unit 12 accepts the predetermined transmission start operation (such as the long press operation of continuing to touch the same position), the display unit 11 performs the transmission transition display in which the transition source screen that is currently displayed disappears gradually while a ratio of the display of the transition destination screen that belongs to the next lower layer of the transition source screen is increased (to 100%) as time passes. When the transmission start operation is continued, the display unit 11 continues (repeats) the transmission transition display by regarding the transition destination screen after the transition is completed with total transmission of the transition source screen as the new transition source screen and by regarding a screen belonging to the next lower layer of the new transition source screen as the new transition destination screen. In this way, only by continuing the transmission start operation (e.g., by continuing to press the same position as the long press operation), the screen can be sequentially changed to the lower layer screens. In addition, only by making the transmission start operation, it is possible to easily check the screens belonging to a plurality of layers. In addition, it is also possible to check which screen belongs to which layer. In addition, because automatic and successive screen transitions are performed in such a manner that the screen of the transition destination (in the lower layer) gradually appears, it is possible to differentiate switching of the normal screen and the transmission transition display.

In the automatic selection of the path, it is necessary to determine which path should be traced in the transition to a lower layer. In other words, the transmission transition display is repeated by automatically determining the path without the operation for determining the next transition destination, it is necessary to determine the screen displayed when a certain button is operated to be regarded as a new transition destination screen.

Here, it is possible to determine a path to be traced in the repetition of the transmission transition display over two or more screens as follows. For instance, the panel control unit 10 may control the display unit 11 to perform the transmission transition display over a plurality of screens so as to trace a predetermined screen transition path. In this case, the memory 18 stores path data D3 (see FIG. 3) defining which path is used for switching screens when which button is operated for making the transmission start operation, for each type of the button.

In addition, the panel control unit 10 may control the display unit 11 to perform the transmission transition display over a plurality of screens by regarding that the button at a predetermined position among buttons disposed in the screen is operated. In this case, the memory 18 stores the path data D3 (see FIG. 3) defining which button in a position is regarded as operated among the buttons disposed in the screen. Note that FIG. 14 shows an example in which the transition path is determined by regarding the screen that is displayed when a button disposed in the lowermost rightmost (lower right side) position among the buttons disposed in the screen under being displayed is operated as the next (new) transition destination screen.

In addition, the panel control unit 10 may perform the transmission transition display so as to trace a path that can lead to a deepest layer screen. In other words, it is possible to determine the path so that the number of screens to be switched becomes largest by repeating the transmission transition display. In this case, data defining the path that can lead to the deepest layer screen is stored as the path data D3 for each button in the memory 18 (see FIG. 3).

After the transmission start operation, the panel control unit 10 automatically selects the new transition destination screen based on the path data D3 in synchronization with completion of the transmission transition to the transition destination screen, during a period while touching of the touch panel unit 12 is continued, when the operation for determining the next transition destination is not performed. Further, the panel control unit 10 controls the display unit 11 to repeat the transmission transition display to a lower layer screen. In this way, the automatic switching of the screen over a plurality of screens is performed.

Further, when the transition to a lowest layer (such as a screen for setting a set value) is finished, there is no lower layer screen of the screen. In this case, the panel control unit 10 controls the display unit 11 to continue to display the lowest layer screen until end of the transmission transition mode (return to the normal mode), or until an instruction to execute the transmission transition display toward an upper layer (reverse transition operation).

The path in the automatic screen transition should be determined by one of the above-mentioned methods. However, as shown in FIG. 15, it is possible to adopt a structure in which the path traced when the automatic transmission transition display is repeated can be set in advance.

FIG. 15 shows an example of a transmission transition setting screen 59 concerning setting of the path in the automatic transmission transition display. The transmission transition setting screen 59 can be displayed by making a predetermined operation on the operation panel 1. Further, in the transmission transition setting screen 59, there are disposed a first button B19 (bearing a character string "determined path"), a second button B20 (bearing a character string "based on button position"), a third button B21 (bearing a character string "move to lowest layer"), and a fourth button B22 (bearing a character string "wait for button operation"). In addition, four check boxes C1, C2, C3, and C4 are assigned to the second button B20.

The first button B19 is operated when repeating the transmission transition display in a predetermined screen transition path. The third button B21 is operated when repeating the transmission transition display in a path that can lead to the deepest lower layer screen. The fourth button B22 is operated when the operation for determining the next transition destination is not made in the transmission transition mode and the display of the transition destination screen in the next previous transmission transition display is continued without automatically selecting the new transition destination screen until the operation for determining the next transition destination is made (the fourth button 22 is not selected when the automatic transmission transition display is performed).

In addition, the second button B20 is operated when the transmission transition display is repeated by regarding that a button in a predetermined position among buttons disposed in the screen after the transition is operated. Note that a position of the button can be selected by using the check boxes C1 to C4. In this way, the user can obtain an automatic and sequential display of lower layer screens so as to check contents of the screens without any operation. In addition, the user can obtain the transmission transition display over a plurality of screens by regarding that buttons in predetermined positions among buttons in the screen are operated. In this case, the user can obtain the automatic and sequential display of lower layer screens without any operation under a constant regularity, so as to check contents of the screens. In addition, it is also possible to obtain a transmission transition display over a plurality of screens in such a manner to trace the path that can lead to the deepest layer screen. In this way, the user can automatically check lower layer screens sequentially to the deepest (lowest) layer without any operation.

Here, as illustrated in FIGS. 13 and 14, when automatically selecting the next transition destination screen, the panel control unit 10 may control the display unit 11 to display a cursor C5 indicating which button is to be operated for displaying the next transition destination screen. In other words, the panel control unit 10 may control the display unit 11 to display an emphasized display by adding an image of the cursor C5 to the button regarded as operated in the transmission transition of the screen. Further, though a rectangular figure is displayed as the cursor C5 in the example of FIG. 14, it is possible to display other image such as an arrow, a symbol "○", an ellipse, a mark, or a character as the cursor C5.

In addition, when the next transition destination screen is automatically selected, in order to indicate which button is to be operated for displaying the next transition destination screen, the panel control unit 10 may change color of the button corresponding to the next transition destination screen to be different from other buttons (that do not correspond to the same) (see FIG. 13 and FIG. 14). For instance, the panel control unit 10 controls the display unit 11 to display the button corresponding to the transition destination screen with a background color of gray color or blue color and characters on the button with white color, and to display buttons that do not correspond to the transition destination screen with a background color of white color and characters on the buttons with black color. In this way, it is possible to easily recognize the automatically selected button.

(Transition Destination Screen Selection in Transmission Transition Display)

Next, with reference to FIGS. 16 to 21, transition destination screen selection in the transmission transition display (transmission transition mode) is described.

The operation panel 1 of this embodiment can perform the transmission transition display with the transition source screen in which the transmission start operation was made and the transition destination screen that is displayed when the button used for the transmission start operation in the normal operation (normal mode) is operated. In addition, the panel control unit 10 can automatically and successively repeats the transmission transition display.

However, the user may want to check a screen (path) different from the screen on the path selected automatically by the panel control unit 10. In addition, though the button is selected by the transmission start operation, the user may want to check a screen of another button on the way.

Therefore, in the operation panel 1 of this embodiment, while the display unit 11 continues the transmission transition display from the transmission start operation to the transition destination screen, or from the new transition source screen to the new transition destination screen, when the touch panel unit 12 accepts a predetermined temporary halt operation during the transmission transition display to the transition destination screen, the display unit 11 stops the transmission transition display to the transition destination screen. When the touch panel unit 12 accepts a selection operation for selecting a button in the transition source screen following to the temporary halt operation and accepts a predetermined confirmation operation following to the selection operation, the display unit 11 restarts the transmission transition display by regarding the screen corresponding to the selected button in the confirmation operation (a screen corresponding to the button of the transmission start operation and a screen different from automatically selected screen) as a new transition destination screen.

<Temporary Halt Operation>

Figure 16:
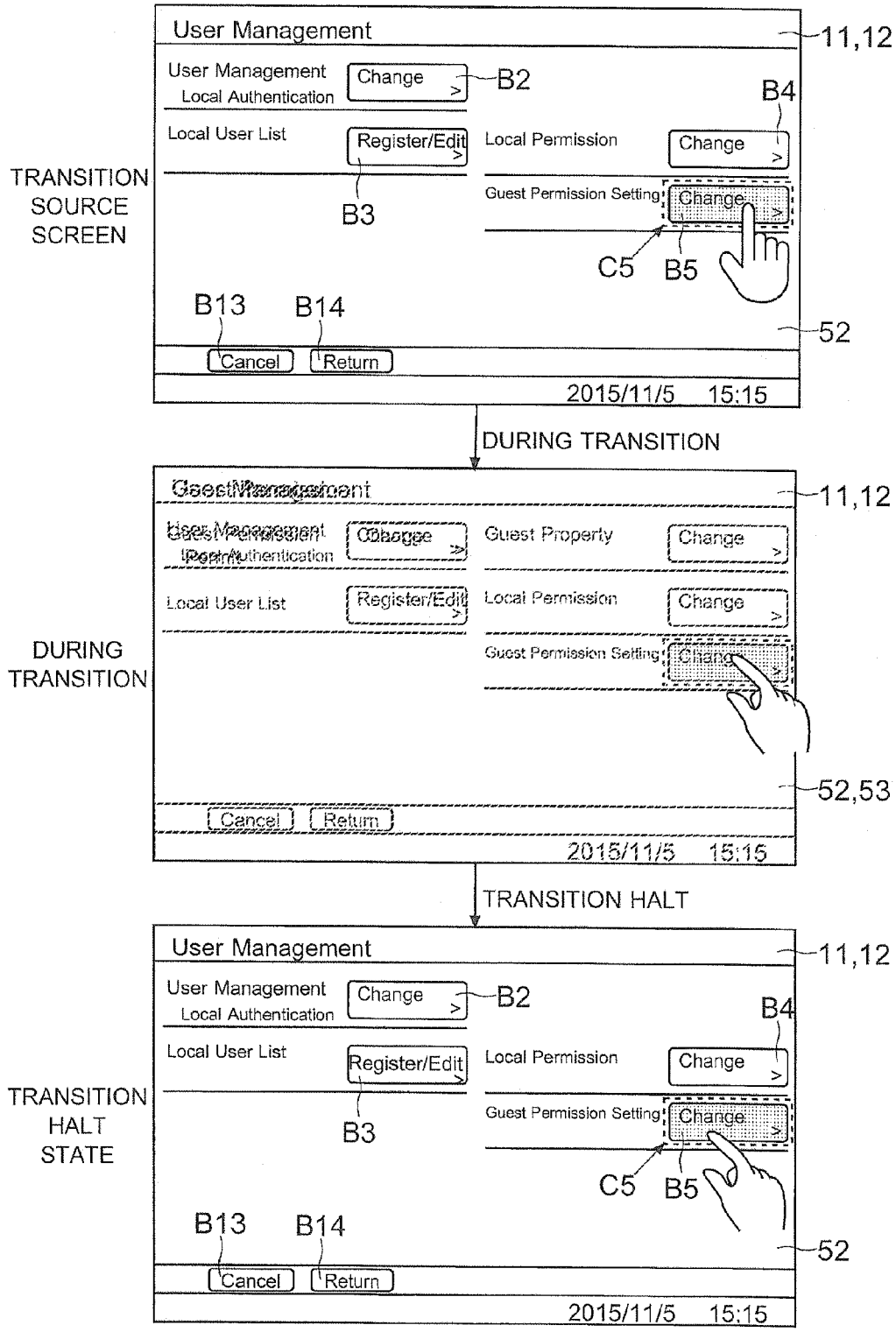
FIG. 16 is a diagram for explaining temporary halt operation and transition stop according to the embodiment.

Therefore, with reference to FIG. 16, the temporary halt operation is described first. The upper part of FIG. 16 shows an example where the transmission start operation is made on the guest permission button B5 of the user management screen 52 (see FIG. 6) (accompanying a character string "guest permission setting" and bearing a character string "change").

Further, the middle part of FIG. 16 shows a state where the transmission transition is already started. The panel control unit 10 controls the display unit 11 to perform the transmission transition display by regarding the user management screen 52 as the transition source screen and regarding the guest permission setting screen 53 (corresponding to the guest permission button B5, see FIG. 7) as the transition destination screen. In addition, the lower part of FIG. 16 shows a state where the temporary halt operation is made during the transition.

Here, the temporary halt operation is described. The touch panel unit 12 of this embodiment accepts two-point touch as the temporary halt operation. Specifically, the touch panel unit 12 accepts an operation of adding a touch position in the state where one-point touch is continued from the transmission start operation (such as an operation of adding a touch of a point outside the button area or an operation of long press by adding a new touch position) as the temporary halt operation. Further, it is possible to accept other gesture operation such as three-point touch while continuing the one-point touch as the temporary halt operation.

Further, the lower part of FIG. 16 shows the state where the panel control unit 10 controls the display unit 11 to stop the transmission transition display to the transition destination screen based on the fact that the touch panel unit 12 has accepted the temporary halt operation. When stopping the transmission transition display, the panel control unit 10 removes a component of the transition destination screen and controls the display unit 11 to restore and display only the transition source screen (see the lower part of FIG. 16). Further, the panel control unit 10 may control the display unit 11 to stop the transmission transition display by maintaining the screen when the temporary halt operation is made without removing the component of the transition destination screen.

Figure 17:
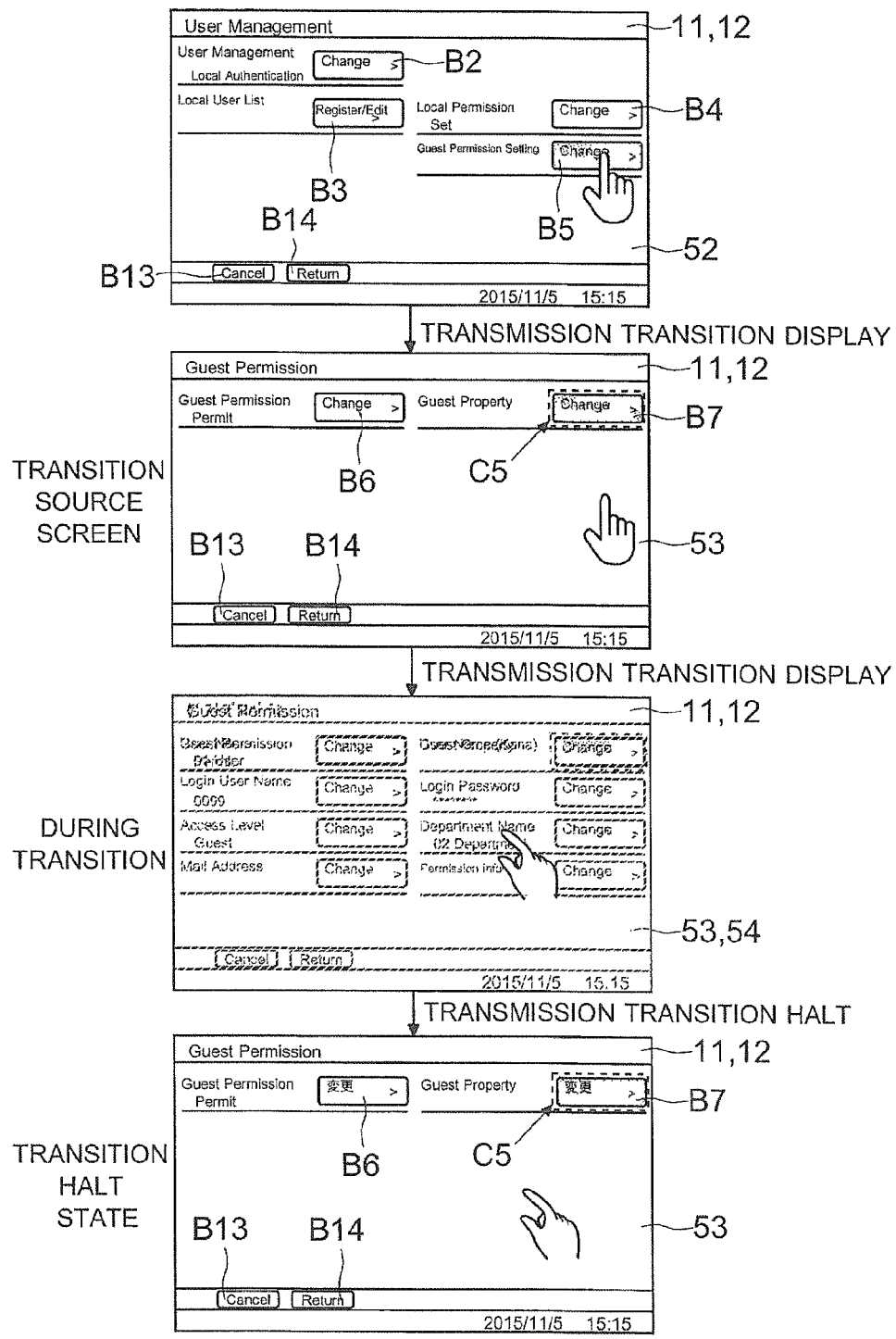
FIG. 17 is a diagram for explaining the temporary halt operation and the transition stop according to the embodiment.

Next, with reference to FIG. 17, the temporary halt operation in the repetition process of the transmission transition display (screen in a lower layer of the screen in which the transmission start operation was made) is described. The upper part of FIG. 17 shows an example in which the transmission start operation is made on the guest permission button B5 in the user management screen 52 (see FIG. 6).

The second upper part of FIG. 17 shows a state where the transmission transition display from the user management screen 52 to the guest permission setting screen 53 (see FIG. 7) is completed. In addition, the second upper part of FIG. 17 shows that the one-point touch to the touch panel unit 12 is continued.

The third part of FIG. 17 shows a state where the panel control unit 10 controls the display unit 11 to perform the transmission transition display by the automatic selection of the new transition destination screen, in which the guest permission setting screen 53 is regarded as the new transition source screen while the guest property setting screen 54 (see FIG. 8) is regarded as the new transition destination screen. Further, the third part of FIG. 17 shows the state where the temporary halt operation (two-point touch) is accepted during the transmission transition display.

Further, the lowest part of FIG. 17 shows a state where the panel control unit 10 controls the display unit 11 to stop the transmission transition display to the transition destination screen (guest property setting screen 54) based on the fact that the touch panel unit 12 has accepted the temporary halt operation.

In this way, when the touch panel unit 12 accepts the temporary halt operation during the transmission transition display to the new transition destination screen, the panel control unit 10 stops the transmission transition display to the new transition destination screen.

<Selection Operation>

Figure 18:
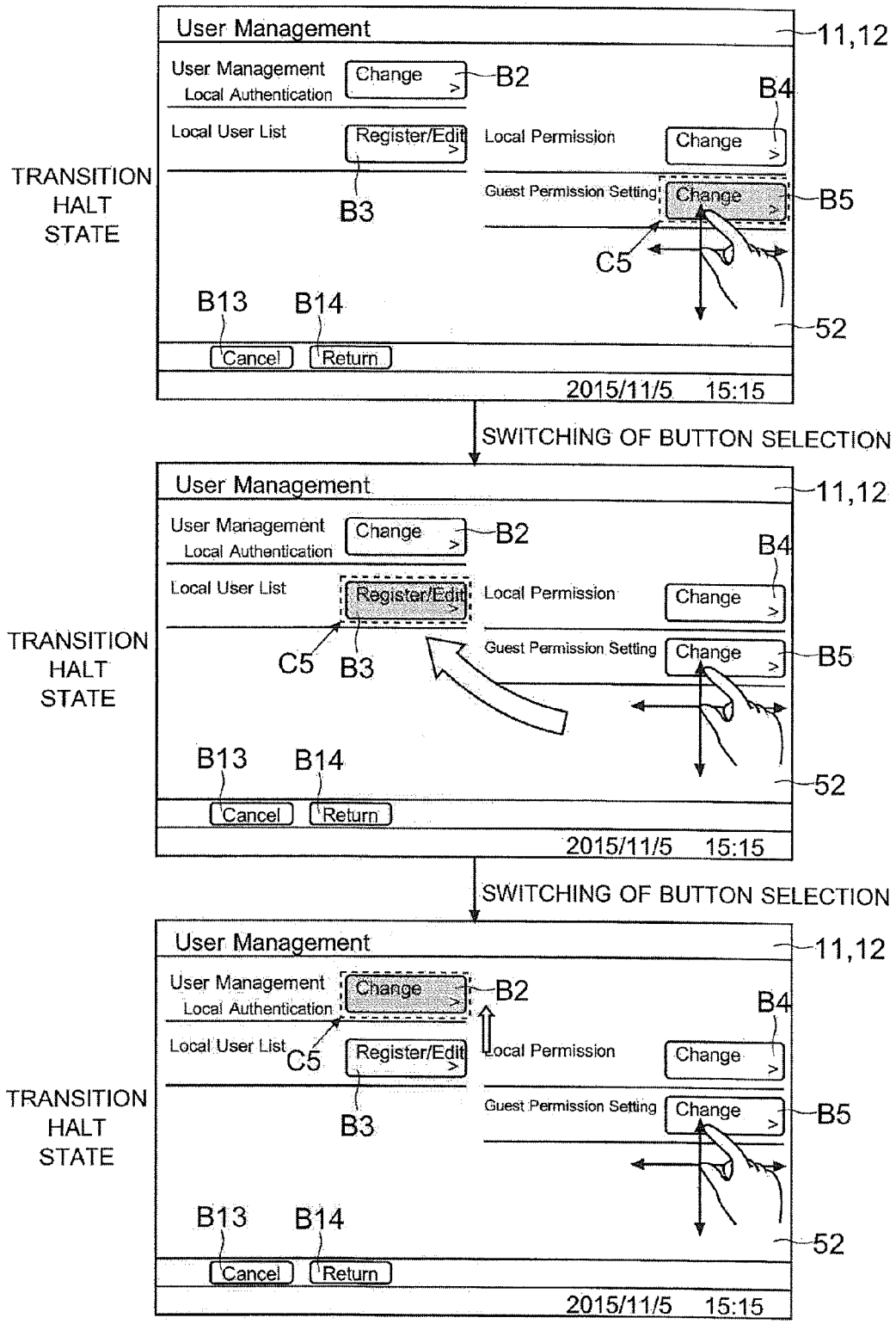
FIG. 18 is a diagram for explaining a selection operation according to the embodiment.
Figure 19:
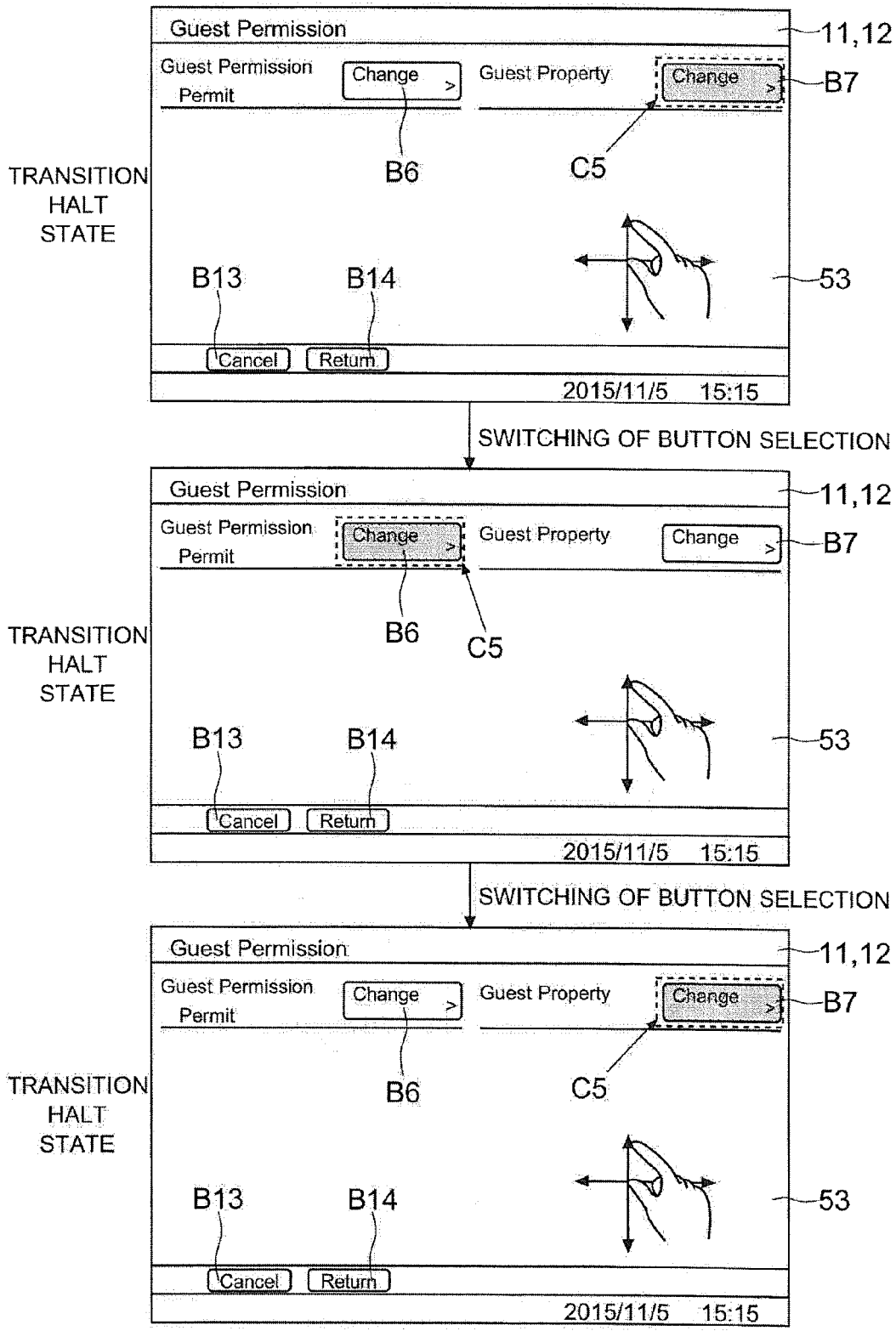
FIG. 19 is a diagram for explaining the selection operation according to the embodiment.

Next, with reference to FIG. 18 and FIG. 19, the selection operation is described. FIG. 18 corresponds to FIG. 16. In addition, FIG. 19 corresponds to FIG. 17.

The upper part of FIG. 18 shows the user management screen 52 (see FIG. 6) that is the transition source screen when the transmission transition display is stopped by the temporary halt operation. Further, the upper part of FIG. 18 shows a state of starting the selection operation by the user management screen 52.

In addition, the upper part of FIG. 19 shows the guest permission setting screen 53 (see FIG. 7) that is the transition source screen when the transmission transition display is stopped by the temporary halt operation in the process of repeating the transmission transition display (in a screen of a lower layer of the screen in which the transmission start operation was made). Further, the upper part of FIG. 19 shows a state where the selection operation is started in the guest permission setting screen 53.

Here, the selection operation is described. The selection operation is an operation following the temporary halt operation and is an operation for selecting a button in the transition source screen. The touch panel unit 12 of this embodiment accepts an operation for moving at least one of a plurality of touches by the temporary halt operation as the selection operation. Specifically, the touch panel unit 12 accepts an operation of moving any one-point touch position in the state where two-point touch is continued from the temporary halt operation as the selection operation. Note that other gesture operation may be accepted as the selection operation.

Further, the middle part of FIG. 18 shows a state where the button in selected state is shifted by one in a clockwise direction by the selection operation. Further, the lower part of FIG. 18 shows an example where the button in selected state is further shifted by one in the clockwise direction from the state of the middle part of FIG. 18 because the confirmation operation for confirming the selection is not made.

In addition, the middle part of FIG. 19 shows an example where the button in selected state is shifted by one when the selection operation is made. Further, the lower part of FIG. 19 shows an example where the button in selected state is further shifted by one from the state of the middle part of FIG. 19 (to return to the original position) because the confirmation operation for confirming the selection is not made. Note that it is possible to adopt a structure in which the cancel button B13 and the return button B14 are not selected (do not become selected state) in the selection operation.

Here, in order to clearly indicate the selected button, the panel control unit 10 controls the display unit 11 to perform the emphasized display on the button in selected state after the selection operation is made until the confirmation operation is made.

Specifically, the panel control unit 10 controls the display unit 11 to perform the emphasized display by adding the image to the button in selected state (see FIG. 18 and FIG. 19). Specifically, in the operation panel 1 of this embodiment, the panel control unit 10 controls the display unit 11 to display the cursor C5 to surround the button in selected state. Note that a broken line rectangle is displayed as the cursor C5 in the example of FIG. 18 and FIG. 19. However, other image such as an arrow, a symbol "o", an ellipse, a mark, or a character may be displayed as the cursor C5.

In addition, the panel control unit 10 changes color of the button in selected state to be different from other buttons (non-selected buttons). The panel control unit 10 controls the display unit 11 to display the selected button in gray color or blue color and the non-selected buttons in normal color (such as white color). By the emphasized display, the user can easily check which button is selected among buttons in the transition source screen in the state where the transmission transition display is stopped.

Here, the panel control unit 10 may control the display unit 11 to move a position of the button in the emphasized display (the button in selected state) in a predetermined order after the selection operation until the confirmation operation for confirming the selection. In this case, when the moving speed is too fast, the confirmation operation cannot be made in the state where a desired button is selected. Therefore, the panel control unit 10 controls the display unit 11 to move the position of the button in the emphasized display in a predetermined order at a predetermined interval (approximately one to a few seconds).

In addition, the panel control unit 10 may regard a button in a moving direction of the finger in the selection operation as the selected button. For instance, when the touch position is moved upward, the button in the emphasized display (button in selected state) is changed to the button in one upper position of the current button in selected state. Also when the touch position moves downward, rightward, leftward, or in a diagonal direction, the position of the button in selected state is moved to a button in the moving direction of the touch position with respect to the button in selected state. In this case, every time when one of two touch positions is moved, the panel control unit 10 changes the position of the button in selected state. In this way, the user can arbitrarily select a button displayed in the transition source screen by the selection operation. In addition, the user can easily select a button corresponding to the screen to be displayed next.

<Confirmation Operation>

Figure 20:
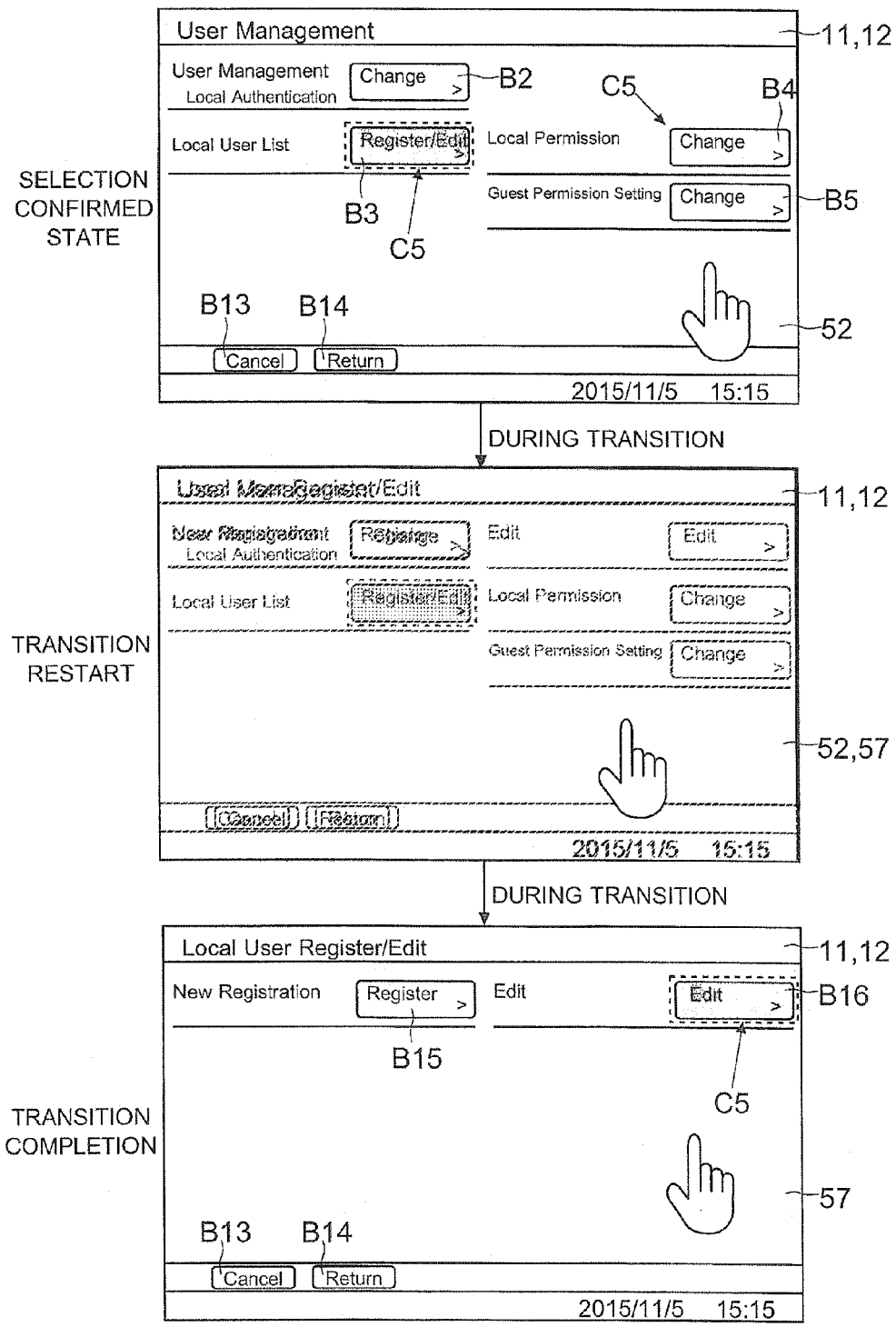
FIG. 20 is a diagram for explaining an example of confirmation operation and restart of transmission transition display according to the embodiment.
Figure 21:
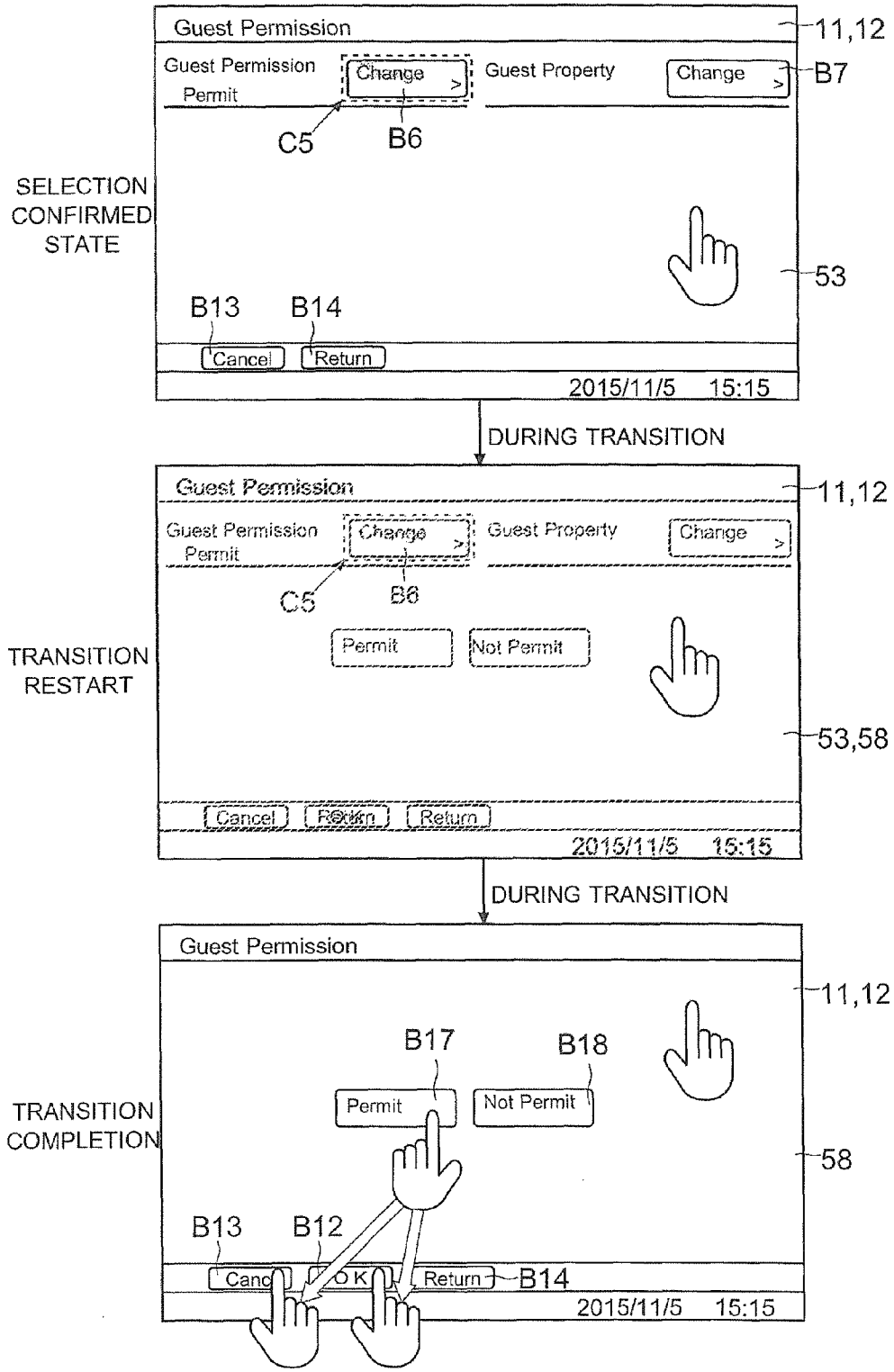
FIG. 21 is a diagram for explaining an example of the confirmation operation and the restart of transmission transition display according to the embodiment.

Next, with reference to FIG. 20 and FIG. 21, the confirmation operation is described. FIG. 20 corresponds to FIG. 16 and FIG. 18. In addition, FIG. 21 corresponds to FIG. 17 and FIG. 19.

First, the confirmation operation is described. The confirmation operation is an operation following the selection operation and is an operation for confirming the selected button in the screen during stop of the transmission transition display (the transition source screen). The touch panel unit 12 of this embodiment accepts an operation of decreasing the number of touch positions on the touch panel unit 12 from the multiple-point touch (two-point touch) state for the selection operation as the confirmation operation. Specifically, the touch panel unit 12 accepts an operation of eliminating one touch position (an operation of taking at least one finger off the screen) as the confirmation operation. Note that other gesture operation may be accepted as the confirmation operation. In this way, the touch panel unit 12 accepts the operation of adding the new touch (such as the long press) of the touch panel unit 12 while continuing to touch the touch panel unit 12 from the transmission start operation as the temporary halt operation, accepts the operation of moving at least one of touches by the temporary halt operation as the selection operation, and accepts the operation of decreasing the number of touch positions on the touch panel unit 12 as the confirmation operation. In this way, only by performing the simple operation (transmission start operation) one time, the automatic and successive switching of screens over a plurality of layers can be performed, and the transition destination can be selected. In addition, the operation for selecting the transition destination is also a simple operation. Therefore, the next transition destination screen (transition path) can be easily selected, and the path toward a lower layer in the transmission transition mode can be easily determined.

Further, the upper part of FIG. 20 shows a state where the confirmation operation is made in the state where the user list button B3 is selected by the selection operation in the user management screen 52 (see FIG. 6). In addition, the upper part of FIG. 21 shows a state where the confirmation operation is made in the state where the guest permission/inhibition button B6 is selected by the selection operation in the guest permission selling screen 53 (see FIG. 7) unlike the case shown in FIG. 15 (in which the path is automatically selected).

Further, the middle part of FIG. 20 shows a state where the transmission transition display is restarted by regarding the user management screen 52 as the transition source screen and by regarding the screen (the register/edit screen 57 shown in FIG. 11) corresponding to the selected and confirmed button (the user list button B3) as the transition destination screen, when the confirmation operation is made on the touch panel unit 12. In other words, when the touch panel unit 12 accepts the predetermined confirmation operation after the selection operation, the panel control unit 10 restarts the transmission transition display by regarding the screen corresponding to the selection button in the confirmation operation (the screen corresponding to the button in the emphasized display when the confirmation operation is made) as the transition destination screen.

The lower part of FIG. 20 shows a state where the transmission transition display from the user management screen 52 to the register/edit screen 57 is completed. In this way, by performing the temporary halt operation, the selection operation, and the confirmation operation, it is possible to check a screen in a path different from the path exemplified in FIG. 15 (automatically selected path).

In addition, the middle part of FIG. 21 shows a state where the transmission transition display is restarted by regarding the guest permission setting screen 53 as the transition source screen and by regarding the screen corresponding to the selected and confirmed button (guest permission/inhibition button B6) (the guest permission/inhibition setting screen 58 shown in FIG. 12) as the transition destination screen, when the confirmation operation is made on the touch panel unit 12 in the process of repeating the transmission transition display (in the screen in a lower layer of the screen in which the transmission start operation is made). In other words, when the touch panel unit 12 accepts the selection operation for selecting a button in the transition source screen after the temporary halt operation and accepts the predetermined confirmation operation after the selection operation, the panel control unit 10 restarts the transmission transition display by regarding the screen corresponding to the selection button in the confirmation operation (the screen corresponding to the button in the emphasized display when the confirmation operation is made) as the new transition destination screen.

The lower part of FIG. 21 shows a state where the transmission transition display from the guest permission setting screen 53 to the guest permission/inhibition setting screen 58 is completed. In this way, until reaching the lowest layer, during repetition of the transmission transition display, by performing the temporary halt operation, the selection operation, and the confirmation operation, it is possible to check the screen in the path different from the path exemplified in FIG. 15 (automatically selected path).

In this way, during the screen transition in the first transmission transition display, only by performing the easy sequential operations (the temporary halt operation, the selection operation, and the confirmation operation), it is possible to select the transition to another screen (the next transition destination screen). For instance, when the transition destination screen in the first transmission transition display is not an intended screen, it is possible to promptly change the transition path. The user can determine the path (process) in the display of successive and automatic change of screens toward a lower layer.

Therefore, when the user makes the transmission start operation and notices that the screen is not a desired screen during the transition to the transition destination screen, the user can easily change the transition destination to a different lower layer screen. In order to change the transition destination, the additional and easy sequential gesture operation (the temporary halt operation, the selection operation, and the confirmation operation) should be performed. Further, the next transition display can be performed toward the screen corresponding to the button selected in the selection operation (the screen associated with the selected button; the screen which is switched when the button is operated in the normal mode). Therefore, it is possible to arbitrarily and easily check screens belonging to lower layers based on user's intention. In addition, it is also possible to check which screen belongs to which layer. In addition, also in the transmission transition display after changing from an original layer to the next lower layer (also on the way of the repeated transmission transition display), the user can easily select the next transition destination screen (transition path) by the simple temporary halt operation, so as to easily determine the path toward a lower layer in the transmission transition mode.

(Flow of Transmission Transition Display)

Figure 22:
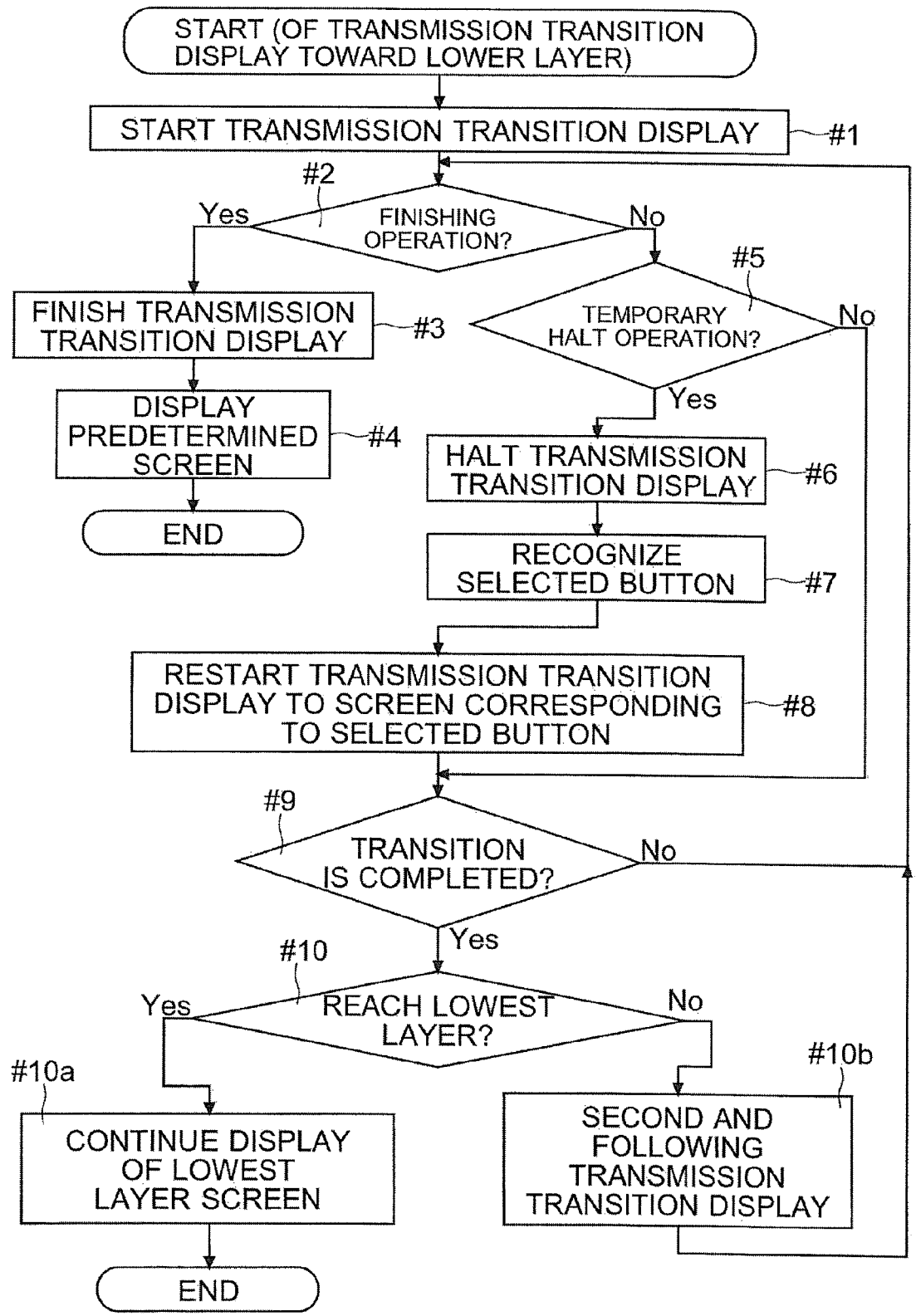
FIG. 22 is a flowchart showing an example of a flow of the transmission transition display toward a lower layer according to the embodiment.

Next, with reference to FIG. 22, a flow of the transmission transition display toward a lower layer on the operation panel 1 according to the embodiment is described.

<Transmission Transition Display Toward a Lower Layer>

The flow of FIG. 22 starts when the panel control unit 10 recognizes based on an output of the touch panel unit 12 that the transmission start operation (long press operation) is made to one of the display positions in the screen. In other words, the flow starts when a start condition of the transmission transition display toward a lower layer is satisfied.

First, the panel control unit 10 starts the transmission transition (switching) display toward a lower layer from the transition source screen to the transition destination screen (Step #1). Next, the panel control unit 10 checks whether or not the finishing operation is made (an operation taking all fingers off the touch panel unit 12 for finishing the transmission transition mode, and details are described later) (Step #2).

When the finishing operation is made (Yes in Step #2), the panel control unit 10 controls the display unit 11 to finish the transmission transition display (transmission transition mode) and returns to the normal input state (Step #3). Further, the panel control unit 10 controls to display a predetermined screen (details are described later) based on setting in the transmission transition setting screen 59 that is made in advance (Step #4). Then, this flow is finished.

On the other hand, when the finishing operation is not made (No in Step #2), the panel control unit 10 checks whether or not the temporary halt operation is made based on the output of the touch panel unit 12 (Step #5). When the temporary halt operation is made (Yes in Step #5), the panel control unit 10 stops the transmission transition display (Step #6).

Further, the panel control unit 10 recognizes the button selected and confirmed by the selection operation and the confirmation operation based on the output of the touch panel unit 12 (Step #7). Next, the panel control unit 10 controls the display unit 11 to restart the transmission transition display to the screen corresponding to the selected and confirmed button (Step #8).

After Step #8 or in the case of no temporary halt operation (No in Step #5), the panel control unit 10 checks whether or not the transition to the transition destination screen is completed (whether or not all pixels in the screen are replaced with pixels of the transition destination screen) (Step #9).

In the case where the transition is not completed (No in Step #9), the flow returns to Step #2. On the other hand, in the case where the transition is completed (Yes in Step #9), the panel control unit 10 checks whether or not the lowest screen has been reached (Step #10). In the case where the lowest screen has been reached (Yes in Step #10), there is no new transition destination screen. Therefore, the panel control unit 10 controls the display unit 11 to continue to display the lowest screen until the reverse transition operation (details are described later) or the finishing operation is made (Step #10a to END).

On the other hand, in the case where the lowest screen has not been reached (No in Step #10), the panel control unit 10 controls the display unit 11 to perform the second and following transmission transition displays by regarding the transition destination screen after the transition as the new transition source screen and by regarding the next lower layer screen as the transition destination screen (Step #10b). Then, the flow returns to Step #2.

(Method of not Temporarily Halting Transmission Transition Display)

In the example described above, there is described the case where when the temporary halt operation for selecting the next transition destination is made, the transmission transition display is temporarily halted (stopped), and the component of the transition destination screen is removed, so that only the transition source screen is displayed on the display unit 11. However, it is possible to adopt a method of determining the next transition destination while continuing the transmission transition display without temporarily halting the transmission transition display. It is possible to perform the transmission transition display by one of the methods. In addition, it is possible to configure the transmission transition display program D2 so that the transmission transition display can be performed in each method, and the method for selecting the next transition destination can be selected by the operation panel 1.

Figure 23:
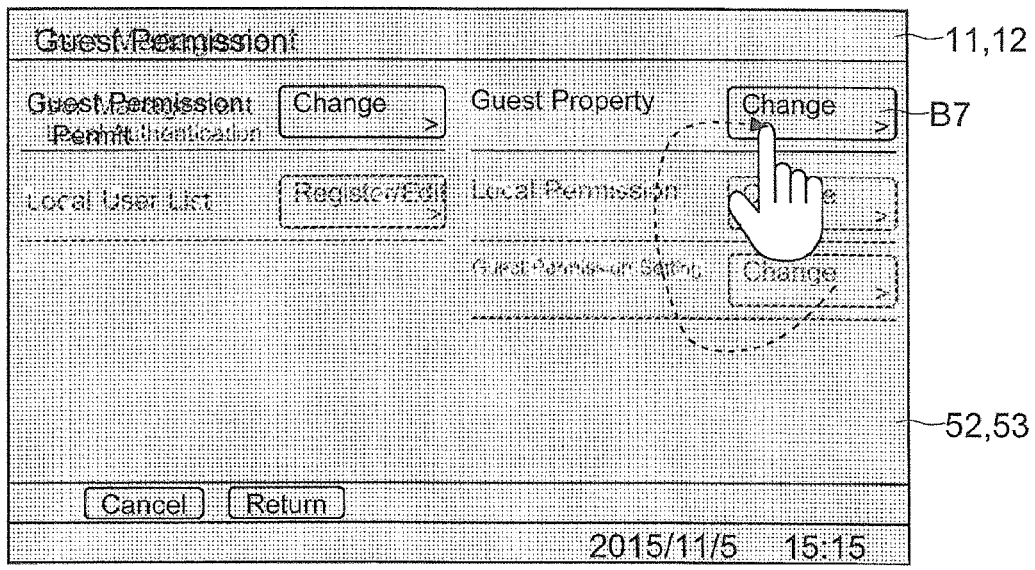
FIG. 23 is a diagram for explaining transition destination setting operation according to the embodiment.
Figure 24:
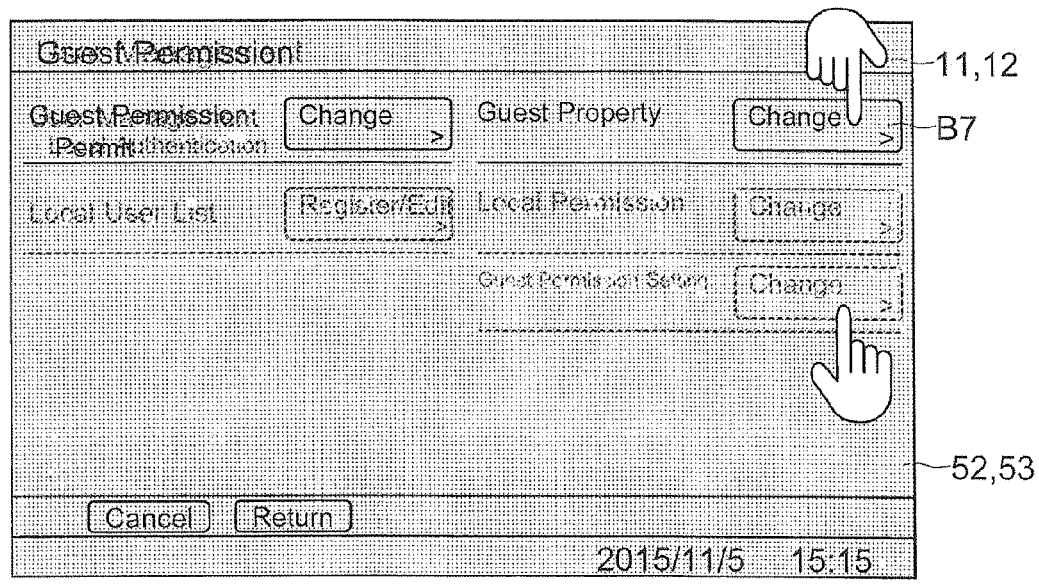
FIG. 24 is a diagram for explaining the transition destination setting operation according to the embodiment.
Figure 25:
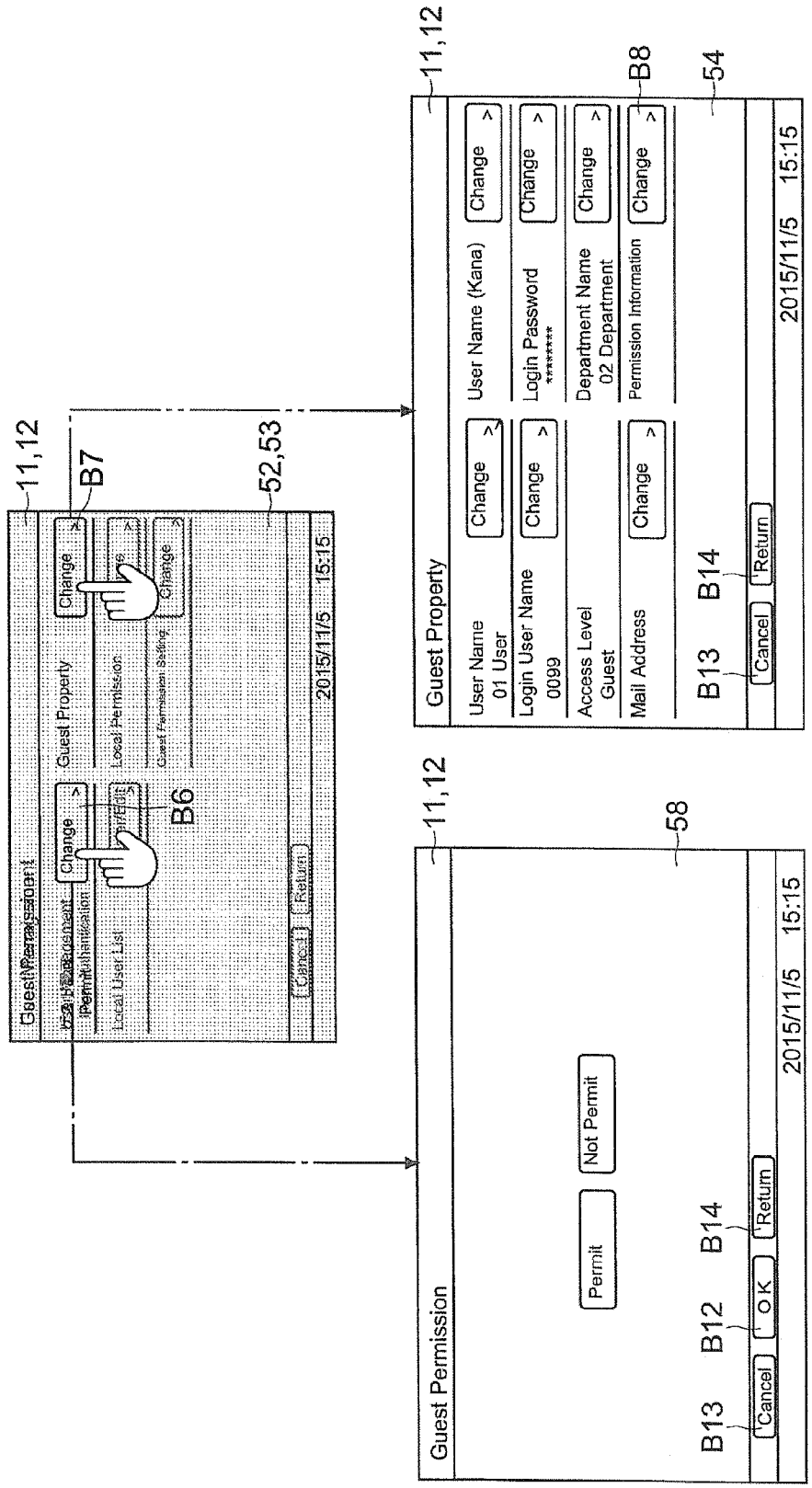
FIG. 25 is a diagram showing an example of new transition destination screen selection in a way without temporary halt of the transmission transition display according to the embodiment.

Specifically, with reference to FIGS. 23 to 25, there is described a new transition destination screen selection when continuing the transmission transition display.

In the repetition of the transmission transition display, when performing the second and following transmission transition displays (when performing the transmission transition display over a plurality of screens), the new transition destination screen can be selected among a plurality of new transition destination screen candidates by the transition destination setting operation. In this method, the touch panel unit 12 accepts a predetermined operation on the button in the transition destination screen that is being displayed in the transition display as the transition destination setting operation for selecting the new (next) transition destination screen (without temporary halt).

Further, when the transition destination setting operation is made on the button in the transition destination screen that is being displayed, the panel control unit 10 controls the display unit 11 to continue the new transmission transition display (transmission or animation-like switching of the display screen) by regarding the transition destination screen after the transition is completed as the new transition source screen and by regarding the screen corresponding to the button on which the transition destination setting is made (the screen that is displayed when the button on which the transition destination setting was made is touched in the normal mode) as the new transition destination screen.

Next, the transition destination setting operation is described. The transition destination setting operation may be an operation of sliding and moving the touch position continuously touched from the transmission start operation to a display position of one of buttons in the transition destination screen while continuing the touching. In addition, the transition destination setting operation may be an operation of touching a display position (e.g., long press operation) of another button in the transition destination screen in the state where the touching based on the transmission start operation is continued. In this way, only by performing the simple operation one time, it is possible to select the transmission transition destination. In addition, the transition destination setting operation is also a simple operation, and the user can easily select the next transition destination screen after the transition is completed, and the path toward a lower layer in the transmission transition mode can be easily determined.

Specifically, with reference to FIG. 23 and FIG. 24, the transition destination setting operation (for selecting the new transition destination screen) is described. FIG. 23 and FIG. 24 show an example in which the transmission start operation is made on the guest permission button B5 in the user management screen 52, and the display unit 11 performs a display in the transmission transition mode. Further, FIG. 23 and FIG. 24 show an example in which the display unit 11 performs the transmission transition display by regarding the user management screen 52 as the transition source screen (see FIG. 6 and FIG. 11) and by regarding the guest permission setting screen 53 (see FIG. 7 and FIG. 11) as the transition destination screen.

First, FIG. 23 shows an example in which the panel control unit 10 recognizes the operation of moving the touch position continuously touched from the transmission start operation to a display position of one of buttons in the transition destination screen as the transition destination setting operation (an example of a locus of the sliding operation is shown by a broken line). In this case, the touch position is moved so as not to enter a display area of a button other than the target button on the way of the slide operation to the target button.

In addition, FIG. 24 shows an example in which the panel control unit 10 recognizes the operation of touching a display position (long press) of another button in the transition destination screen (a button that is being displayed completely) while continuing the touching from the transmission start operation as the transition destination setting operation. For instance, it is possible to use a finger of the same hand touching continuously so as to perform the transition destination setting operation or use a finger of another hand different from the hand touching continuously (i.e. using both hands) so as to perform the transition destination setting operation.

Further, FIG. 23 and FIG. 24 shows an example in which the transition destination setting operation is made on the guest property button B7. In this case, when the pixel replacement to pixels of the transition destination screen (guest permission setting screen 53) is completed (when the transmission transition from the transition source screen to the transition destination screen is completed), the panel control unit 10 controls the display unit 11 to perform the transmission transition display by regarding the original transition destination screen (guest permission setting screen 53) as the new transition source screen and by regarding the guest property setting screen 54 corresponding to the button (guest property button B7) on which the transition destination setting operation is made as the new transition destination screen.

In addition, FIG. 25 shows that the transition destination screen in the next transmission transition display is different depending on the button on which the transition destination setting operation is made in the transition destination screen. The upper middle part of FIG. 25 shows a state in which the transmission transition display is being performed by regarding the user management screen 52 as the transition source screen (see FIG. 6 and FIG. 11) and by regarding the guest permission setting screen 53 (see FIG. 7 and FIG. 11) as the transition destination screen.

Further, the lower left part of FIG. 25 (see the dot dashed line arrow) shows an example in which the next transition destination screen is the guest permission/inhibition setting screen 58 when the transition destination setting operation is made on the guest permission/inhibition button B6 of the transition destination screen (guest permission setting screen 53). In addition, the lower right part of FIG. 25 (see the double-dot dashed line arrow) shows an example in which the next transition destination screen is the guest property setting screen 54 when the transition destination setting operation is made on the guest property button B7 in the transition destination screen (guest permission setting screen 53).

In this way, in the operation panel 1 of this embodiment, when repeating the transmission transition display to a lower layer is repeated over a plurality of screens in the transmission transition mode, the panel control unit 10 continues the transmission transition display by regarding the transition destination screen after the transition is completed as the new transition source screen and by regarding the screen corresponding to the button on which the transition destination setting operation is made among buttons in the original transition destination screen as the new transition destination screen. Therefore, the user can select the transition destination in the transmission transition mode by a simple operation (transition destination setting operation).

Further, also in this method, when the transition destination setting operation is not made, the automatic repetition of the transmission transition display is performed (see FIG. 14). In addition, the path that is traced when the automatic transmission transition display is repeated can be set in the transmission transition setting screen 59 shown in FIG. 15 as described above.

(Flow of Transmission Transition Display in Method without Temporary Halt of Transmission Transition Display)

Figure 26:
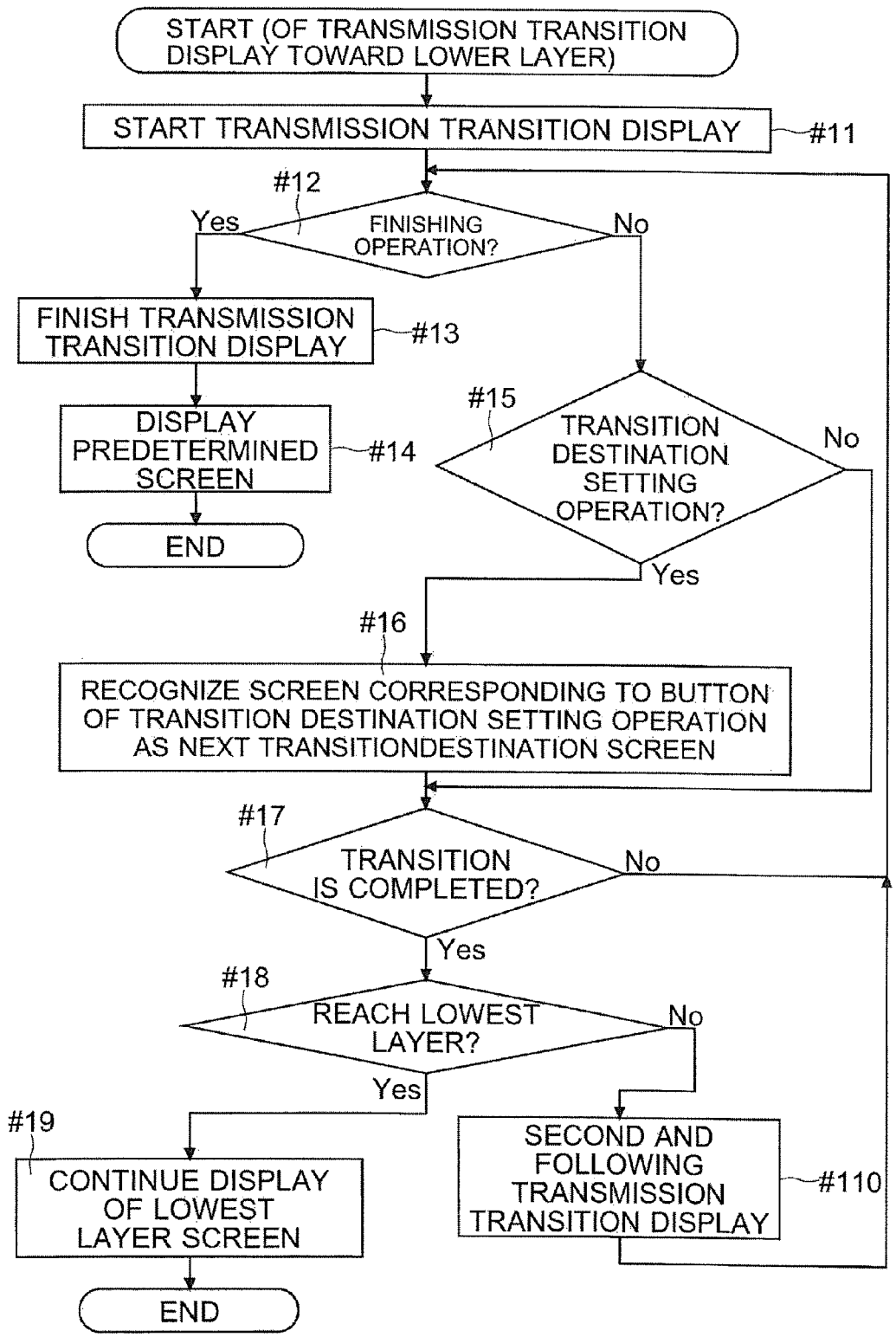
FIG. 26 is a flowchart showing an example of a flow of the transmission transition display toward a lower layer in a way without temporary halt of the transmission transition display according to the embodiment.

Next, with reference to FIG. 26, there is described a flow of the transmission transition display toward a lower layer in a method without temporary halt of the transmission transition display.

The flow of FIG. 26 starts when the panel control unit 10 recognizes based on the output of the touch panel unit 12 that the transmission start operation (long press operation) is made on one of the display positions in the screen. In other words, the flow starts when a start condition of the transmission transition display toward a lower layer is satisfied.

First, the panel control unit 10 controls to start the transmission transition (switching) display toward a lower layer from the transition source screen to the transition destination screen (Step #11). Next, the panel control unit 10 checks whether or not the finishing operation (taking all fingers off the touch panel unit 12 for finishing the transmission transition mode) (Step #12).

When the finishing operation is made (Yes in Step #12), the panel control unit 10 controls the display unit 11 to finish the transmission transition display (transmission transition mode) so as to return to the normal input state (Step #13). Further, the panel control unit 10 controls to display the predetermined screen (details are described later) based on setting in the transmission transition setting screen 59 made in advance (Step #14). Then, this flow is finished.

On the other hand, when the finishing operation is not made (No in Step #12), the panel control unit 10 checks whether or not the transition destination setting operation (for selecting the next transition destination screen) is made (Step #15). When the transition destination setting operation is made (Yes in Step #15), the panel control unit 10 recognizes the screen corresponding to the button on which the transition destination setting operation is made (the screen that is displayed when the button on which the transition destination setting operation was made is operated in the normal mode) as the next transition destination screen (Step #16).

After Step #16, or when the transition destination setting operation is not made (No in Step #15), the panel control unit 10 checks whether or not the transition to the transition destination screen is completed (whether or not all pixels of the screen are replaced with pixels of the transition destination screen) (Step #17).

When the transition is not completed (No in Step #17), the flow returns to Step #12. On the other hand, when the transition is completed (Yes in Step #17), the panel control unit 10 checks whether or not the lowest screen has been reached (Step #18). When the lowest screen has been reached (Yes in Step #18), there is no new transition destination screen. Therefore, the panel control unit 10 controls the display unit 11 to continue to display the lowest screen until the reverse transition operation or the finishing operation is made (Step #19 to END).

On the other hand, when the lowest screen has not been reached (No in Step #18), the panel control unit 10 controls the display unit 11 to perform the second and following transmission transition displays by regarding the transition destination screen after the transition is completed as the new transition source screen and by regarding a screen in the next lower layer of the new transition source screen as the transition destination screen (Step #110). In this case, when the transition destination setting operation is made, the panel control unit 10 regards the screen corresponding to the button on which the transition destination setting operation is made as the new transition destination screen. When the transition destination setting operation is not made, the new transition destination screen is automatically selected based on setting in the transmission transition setting screen 59. Further, the flow returns to Step #12.

In this way, when a predetermined transition destination setting operation is made on the button in the transition destination screen during the transition, the display input device (operation panel 1) of this embodiment continues the transmission transition display by regarding the transition destination screen after the transition is completed with total transmission of the transition source screen as the new transition source screen and by regarding the screen corresponding to the button on which the transition destination setting operation was made as the new transition destination screen. In this way, in the process of transition, the transition path (the next transition destination screen) can be selected only by making the transition destination setting operation. Further, the user can determine the automatic screen transition path (process) toward a lower layer. Therefore, by making the transmission start operation and by making the transition destination setting operation as necessary, it is possible to easily check screens over a plurality of layers. In addition, it is also possible to check which screen belongs to which layer.

(Transition to Upper Layer)

Figure 27:
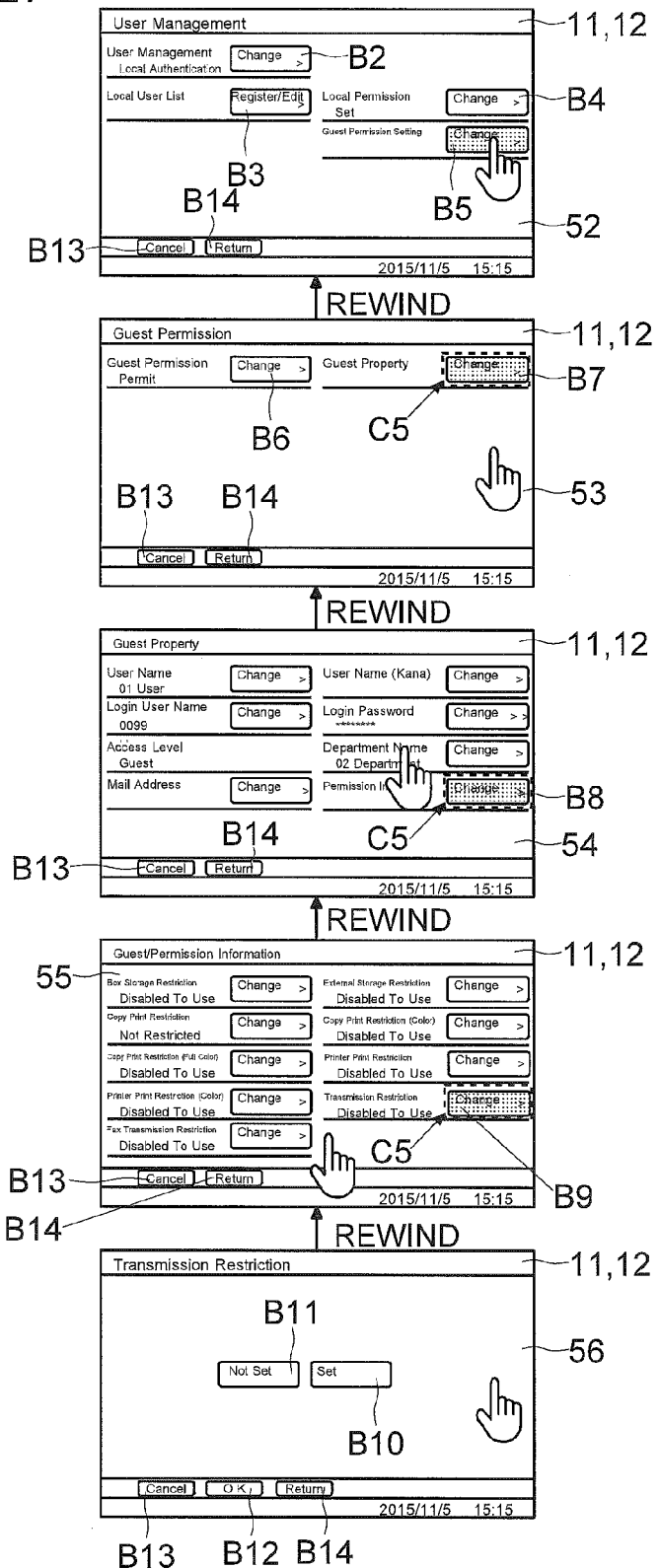
FIG. 27 is a diagram for explaining transition to an upper layer during the transmission transition display of the operation panel according to the embodiment.

Next, with reference to FIG. 27, there is described the transmission transition display to an upper layer in the transmission transition mode of the operation panel 1 according to the embodiment.

In the transmission transition mode, when the touching on the touch panel unit 12 is continued after the transmission start operation, the transmission transition display toward a lower layer is repeated. Further, when the lowest screen is reached, there is no lower layer screen. Therefore, the panel control unit 10 controls the display unit 11 to stop the transition in the lowest screen. Then, the panel control unit 10 controls the display unit 11 to continue to display the lowest screen.

However, there is a case where the user wants to check again a screen displayed in the process of repeating the transmission transition display (a screen in the path). In addition, there is a case where the user wants to return to an upper layer so as to check a screen in other path by the temporary halt operation or the transition destination setting operation.

Therefore, when the transmission transition display toward a lower layer is performed, or when the touch panel unit 12 accepts a predetermined reverse transition operation as an instruction for returning to an upper layer in the state where the transition to a lowest screen is completed, the panel control unit 10 controls the display unit 11 to perform the transmission transition display toward an upper layer (reverse transition) so as to halt (stop) the transmission transition display to a lower layer, and to rewind and play the switching process of the screen in the transmission transition display toward a lower layer (see FIG. 17). In this way, not only in the direction to a lower layer but also in the direction to an upper layer, the transmission successive display change can be performed so as to perform the screen transition. Further, the user can check again a screen that is once displayed by the transition.

The panel control unit 10 controls the display unit 11 to continue the transmission transition display toward an upper layer so as to rewind the switching process of the screen (rewind and play) in the transmission transition display toward a lower layer during a period while the reverse transition operation is continued. The transmission transition display toward an upper layer is continued unless the restart operation of the transmission transition display toward a lower layer (the stop operation of the reverse transition operation) or returning to the normal mode is performed, until the transition to the screen on which the transmission start operation was made is completed.

Here, the touch panel unit 12 accepts an operation of two-point touch on the touch panel unit 12 and decreasing or increasing a distance between the touched two points (a gesture operation such as pinch-in or pinch-out) as the reverse transition operation. In addition, the touch panel unit 12 may accepts an operation of continuing to touch the touch panel unit 12 (to touch at least one point on the touch panel unit 12 based on the transmission start operation or the transition destination setting operation) and touching another one point at a position where buttons are not displayed (two-point touch operation), or an operation of moving the second touch position to a specific direction, as the reverse transition operation. After this reverse transition operation, in a period while the two-point touch is being continued, the panel control unit 10 controls the display unit 11 to perform the transmission transition display toward an upper layer. In any case, an operation other than the transmission start operation, the temporary halt operation, the transition destination setting operation, the selection operation, the confirmation operation, and the finishing operation is accepted as the reverse transition operation.

Specifically, the rewind and play process is described. When the reverse transition operation is made during the transmission transition display to a lower layer, the panel control unit 10 halts (stops) the transmission transition display to a lower layer. Further, the panel control unit 10 regards the current transition destination screen as a reverse transition source screen and regards the current transition source screen as a reverse transition destination screen. Further, the panel control unit 10 controls the display unit 11 to perform the transmission transition display in which the reverse transition source screen disappears gradually while a ratio of the reverse transition destination screen display is gradually increased as time passes.

On the other hand, when the transition to a lowest screen is completed in the transmission transition display to a lower layer, or when the reverse transition operation is made in the state where the next transmission transition display is not started after the transmission transition to the transition destination screen is completed, the panel control unit 10 regards the currently displayed screen as the reverse transition source screen and regards a next upper layer screen of the currently displayed screen as the reverse transition destination screen.

Similarly also in the transmission transition display toward an upper layer, the panel control unit 10 performs replacement of pixels of the reverse transition source screen with pixels of the reverse transition destination screen in a periodical manner (at a constant interval) a predetermined number of times. Further, the reverse transition destination screen is being displayed so as to overlay (emerge) on the reverse transition source screen step by step. Further, the panel control unit 10 controls the display unit 11 to finally complete switching to the reverse transition destination screen (100% transmittance of the reverse transition source screen). In other words, the panel control unit 10 replaces a constant number of pixels in the reverse transition source screen with pixels of the reverse transition destination screen at a constant period from the start point of the transition. In addition, the panel control unit 10 repeats the replacing process a predetermined number of times until all pixels are replaced with pixels of the reverse transition destination screen. Further, the predetermined number of times (the number of steps from start to completion of the transition) can be determined appropriately (e.g., a few tens to 100).

By repeating the replacement of the constant number of pixels the predetermined number of times, the reverse transition source screen disappears step by step (gradually) while the reverse transition destination screen appears step by step (gradually). In this way, transmission (animation-like) screen switching can be performed. Further, also in the transmission transition display toward an upper layer, it is possible to adopt a structure in which an interval (period) between the replacing process and the next replacing process can be set by the touch panel unit 12.

Further, when the touch panel unit 12 accepts an operation (restart operation) for restarting the transmission transition display toward a lower layer, the panel control unit 10 controls the display unit 11 to restart the transmission transition display toward a lower layer. In this way, the transition of screens can be performed by transmission successive display change not only in the direction to a lower layer but also in the direction to an upper layer. Further, the user can check again a screen that is once displayed by the transition. In addition, by performing the selection operation and the transition destination setting operation in the restarted transmission transition display toward a lower layer, a lower layer screen can be displayed in a path different from the former path. Further, the touch panel unit 12 accepts an operation of releasing one point of the two-point touch as an operation for restarting the transmission transition display. Alternatively, when the operation of increasing or decreasing the distance between the two touch points is the reverse transition operation, the touch panel unit 12 accepts an operation of moving both the two touch position in the direction opposite to the reverse transition operation as the operation for restarting the transmission transition display. In any case, a gesture operation other than the transmission start operation, the temporary halt operation, the transition destination setting operation, the selection operation, the confirmation operation, the finishing operation, and the reverse transition operation is accepted as the restart operation.

In this case, the panel control unit 10 restarts the transmission transition display toward a lower layer by regarding the reverse transition destination screen as the transition source screen and by regarding the reverse transition source screen as the transition destination screen.

<Transmission Transition Display Toward an Upper Layer>

Figure 28:
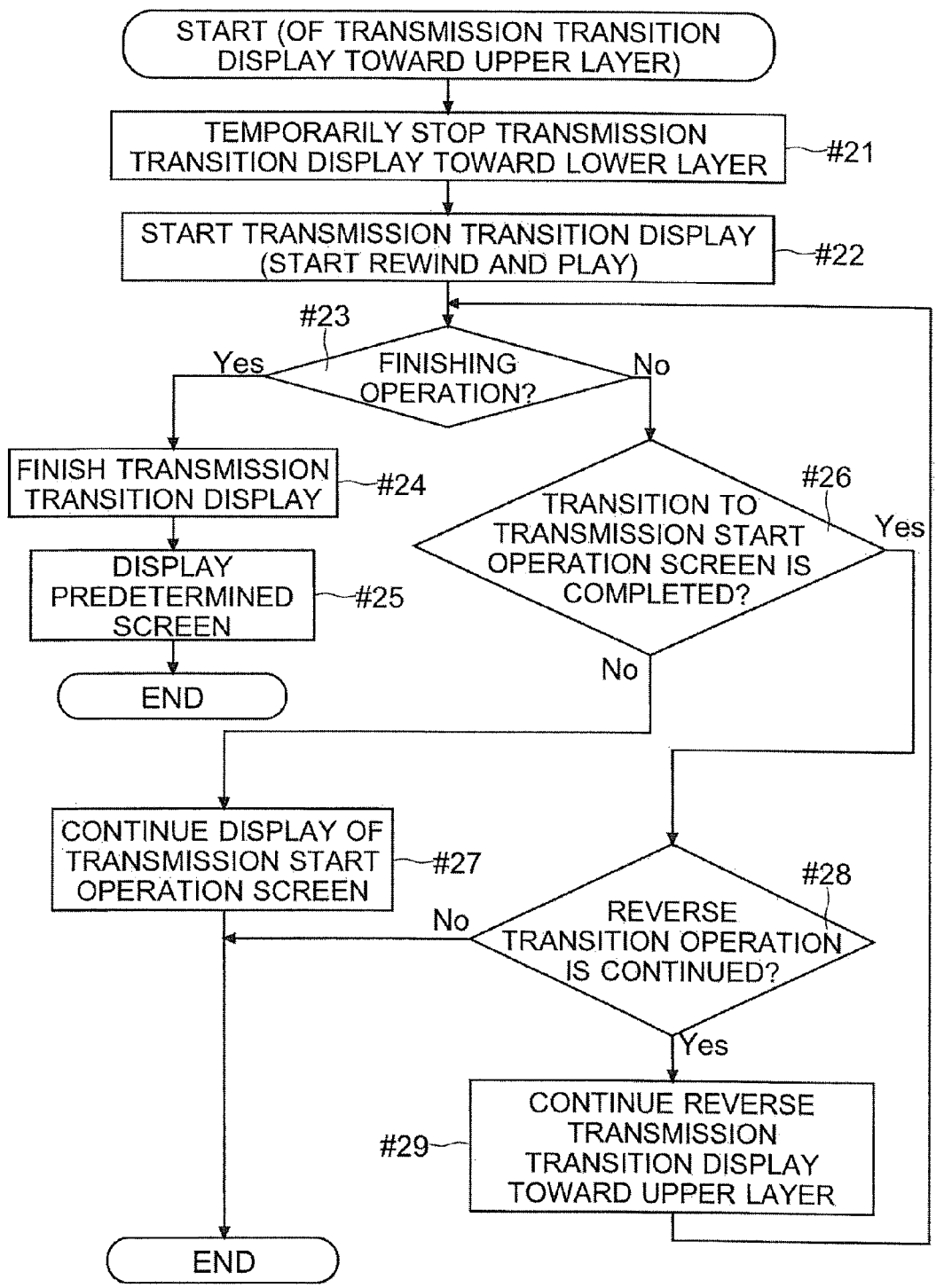
FIG. 28 is a flowchart showing an example of a flow of transmission transition display toward an upper layer according to the embodiment.

Next, with reference to FIG. 28, a flow of the transmission transition display toward an upper layer is described. The flow of FIG. 28 starts when the panel control unit 10 recognizes that the reverse transition operation is made (i.e., an instruction to perform the transmission transition display toward an upper layer is input) based on an output of the touch panel unit 12. In other words, the flow starts when a start condition of the transmission transition display toward an upper layer is satisfied.

First, when the reverse transition operation is made, the panel control unit 10 temporarily stops the transmission transition display toward a lower layer (Step #21). Further, the panel control unit 10 controls the display unit 11 to perform the reverse transmission transition display to an upper layer (Step #22).

Further, the panel control unit 10 checks whether or not the finishing operation (details are described later) is made (Step #23). When the finishing operation is made (Yes in Step #23), the panel control unit 10 controls the display unit 11 to finish the transmission transition display (transmission transition mode) (Step #24). Further, the panel control unit 10 controls to display the predetermined screen (details are described later) based on setting in the transmission transition setting screen 59 made in advance (Step #25). Then, this flow is finished.

On the other hand, when the finishing operation is not made (No in Step #23), the panel control unit 10 checks whether or not the transition to a screen in which the transmission start operation was made in the transmission transition display toward an upper layer is completed (Step #26).

As a result of the rewind and play, when the screen in which the transmission start operation was made is reached (Yes in Step #26), there is no new reverse transition destination screen. Therefore, the panel control unit 10 controls the display unit 11 to continue to display the screen in which the transmission start operation was made until the restart operation (release of the reverse transition operation and an instruction to restart the transmission transition display toward a lower layer), or the finishing operation is made (Step #27 to END). When the restart operation is made, the flow shown in FIG. 22 or FIG. 26 is started.

On the other hand, when the screen in which the transmission start operation was made is not reached (No in Step #26), the panel control unit 10 checks whether or not the reverse transition operation is continued based on the output of the touch panel unit 12 (Step #28). When the reverse transition operation is continued (Yes in Step #28), the panel control unit 10 controls the display unit 11 to continue to perform the reverse transmission transition display (Step #29). In the case where the transmission transition display to an upper layer is continued, when the transition to the reverse transition destination screen is completed, the panel control unit 10 controls the display unit 11 to perform the transmission transition display toward an upper layer by regarding the completed reverse transition destination screen as the new reverse transition source screen and by regarding the next upper layer screen of the new reverse transition source screen (corresponding to the new reverse transition source screen) as the new reverse transition destination screen.

On the other hand, when the reverse transition operation is released (No in Step #28), this flow is finished (END). When all touches are released, the operation panel 1 returns to the normal mode. In addition, when the one-point touch is continued, the transmission transition display toward a lower layer is restarted (start of the flow shown in FIG. 23).

(Setting of Transition Speed in Transmission Transition Display to Lower Layer)

Next, with reference to FIGS. 29 to 32, there is described a setting operation of the transition speed (or time necessary for the transition) when the operation panel 1 according to the embodiment performs the transmission transition display toward a lower layer.

In the display input device (operation panel 1) of this embodiment, it is possible to set transition time in the transmission transition display toward a lower layer (time for completing the transition from the transition source screen to the transition destination screen in the next lower layer) by making a lowering speed setting operation. This setting of the transition speed (transmission time or transmission speed) (lowering speed setting operation) can be performed during the transmission transition display (during the transmission transition mode).

Here, the touch panel unit 12 accepts a predetermined operation (speed setting mode change operation) for changing an operation panel mode to a mode for setting the transition speed of the transmission transition display. When the speed setting mode change operation is made, the transition speed can be set on the operation panel 1. Here, the speed setting mode change operation can be determined appropriately. For instance, sequential touching (like a double click) of another one point (or a plurality of points) in addition to the touching continued from the transmission start operation on the display unit 11 (touch panel unit 12) is regarded as the speed setting mode change operation. Alternatively, the touch panel unit 12 may accepts an operation of shaking the touch position continued from the transmission start operation as the speed setting mode change operation. Further, when the panel control unit 10 recognizes the speed setting mode change operation based on the output of the touch panel unit 12, the panel control unit 10 changes the mode of the operation panel 1 to the speed setting mode. In this mode, the lowering speed setting operation is accepted. Further, when the lowering speed setting operation is made, the panel control unit 10 (operation panel 1) automatically finishes the speed setting mode and returns to the normal (original) transmission transition mode.

The lowering speed setting operation is an operation for making the two-point touch on the touch panel unit 12 during the speed setting mode so as to move the touch position in a predetermined forward direction. The panel control unit 10 performs a measurement about the lowering speed setting operation based on the output of the touch panel unit 12 and determines a first calculation value. Next, the panel control unit 10 determines the transition speed based on the determined first calculation value. Further, when the lowering speed setting operation is made, the panel control unit 10 controls the display unit 11 to perform the transmission transition display toward a lower layer at a determined transition speed.

<1. Lowering Speed Setting Operation>

Figure 29:
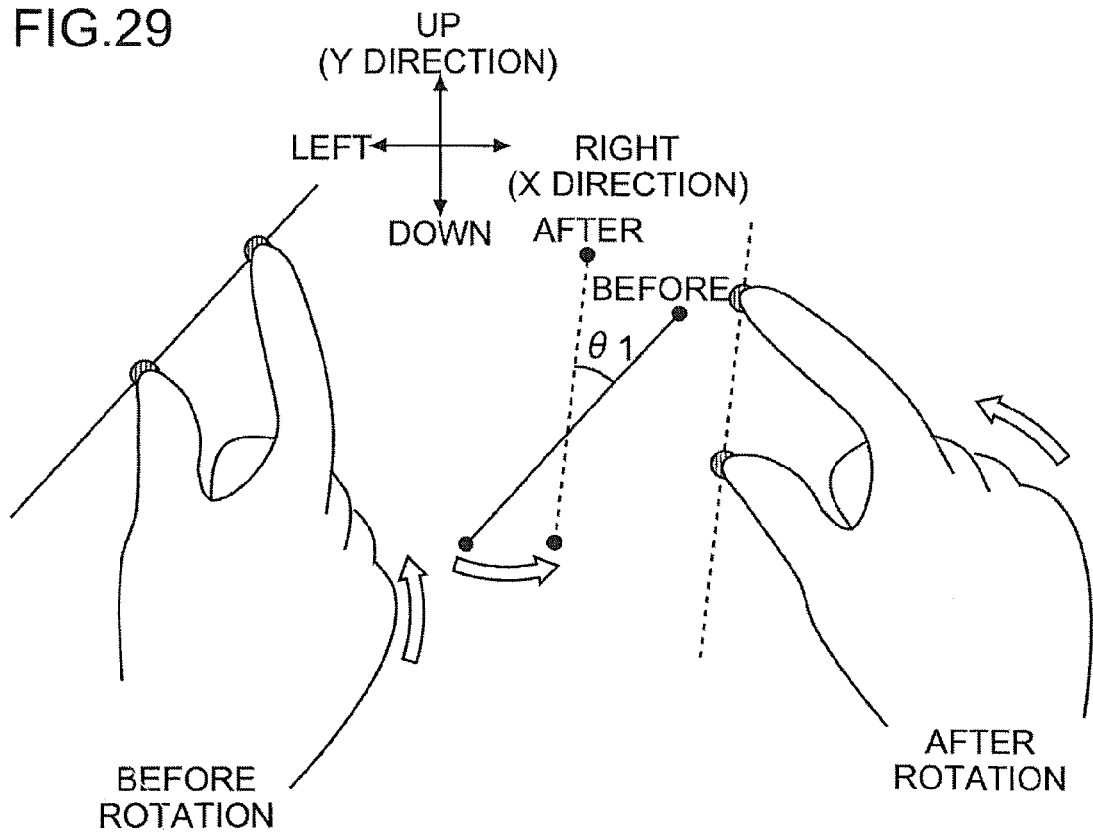
FIG. 29 is a diagram for explaining an example of a lowering speed setting operation according to the embodiment.

The lowering speed setting operation is described in detail. As shown in FIG. 29, the touch panel unit 12 of this embodiment accepts an operation of rotating the two-point touch positions in the forward direction as the lowering speed setting operation. The predetermined forward direction of the rotation operation can be determined appropriately. A clockwise direction or a counter-clockwise direction is determined as the forward direction. In this way, the screen transition speed can be adjusted by a simple operation (gesture operation) of rotating the touch position or moving the touch position.

The panel control unit 10 recognizes the operation of rotating the two touch positions based on the output of the touch panel unit 12. The panel control unit 10 continues to check an output value of the touch panel unit 12 (at a predetermined period). Further, the panel control unit 10 recognizes an operation of changing coordinates of at least one of the touch positions without ceasing the touching and remaining a variation of distance between the two touch positions within a predetermined range (i.e., without bringing the fingers close or apart to each other, so that an interval between the fingers is maintained to a certain extent) as the rotation operation.

Figure 30:
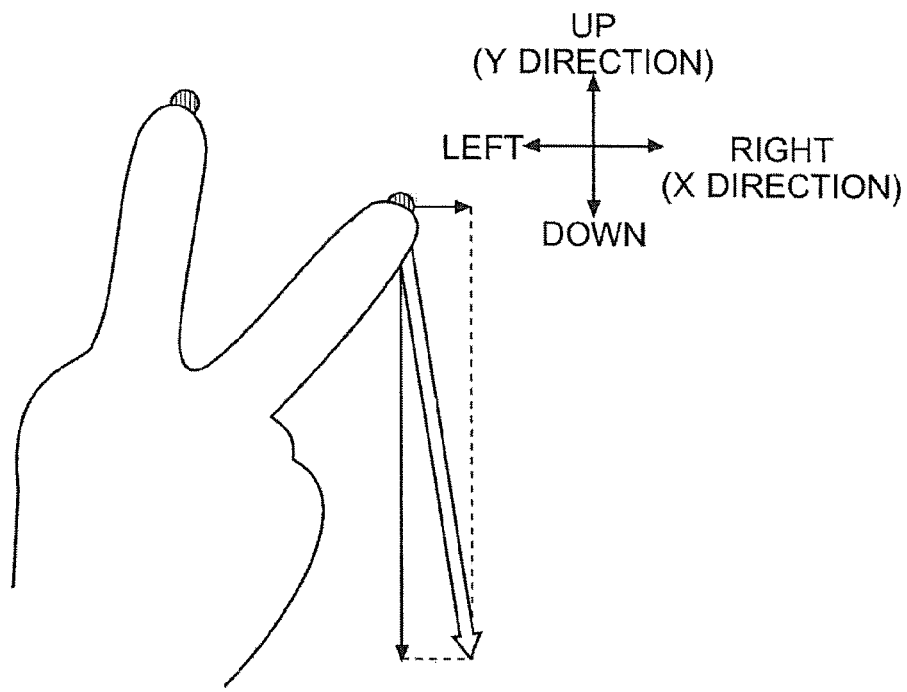
FIG. 30 is a diagram for explaining an example of the lowering speed setting operation according to the embodiment.

In addition, as shown in FIG. 30, the touch panel unit 12 of this embodiment may accepts an operation of moving one of two touch positions in a predetermined forward direction (so as to include a forward direction component) (one-point moving operation) as the lowering speed setting operation. When this one-point moving operation is regarded as the lowering speed setting operation, the predetermined forward direction can be determined appropriately (as one of upper, lower, left and right directions). Because the screen switching toward a lower layer is performed, in the display input device of this embodiment, the forward direction is the lower direction. In this way, the direction of moving the finger matches a layer moving direction.

The panel control unit 10 recognizes the one-point moving operation (of moving one of two touch points) based on the output of the touch panel unit 12. The panel control unit 10 continues to check the output value of the touch panel unit 12 (at a predetermined period). Further, the panel control unit 10 recognizes an operation of changing (moving) coordinates of one of the two touch positions downward without ceasing touching so that a distance between the two touch positions changes to exceed a predetermined value as the lowering speed setting operation.

<2. First Calculation Value>

The panel control unit 10 determines the first calculation value about operation content of the lowering speed setting operation. The panel control unit 10 determines and operation speed of the lowering speed setting operation as the first calculation value.

As shown in FIG. 29, when regarding the rotation operation in the forward direction as the lowering speed setting operation, the panel control unit 10 determines a rotation speed of the lowering speed setting operation as the first calculation value. The panel control unit 10 measures time from start to end of the rotation operation of the touch position (change of coordinates of the touch position) based on the output of the touch panel unit 12. In addition, for example, the panel control unit 10 determines an angle $\theta 1$ between a straight line connecting the two touch positions when the rotation is started and a straight line connecting the two touch positions after the rotation operation as a rotation angle of the lowering speed setting operation. Further, the panel control unit 10 divides the determined rotation angle by the measured time so as to determine the rotation speed of the lowering speed setting operation (the first calculation value).

Alternatively, the panel control unit 10 checks a locus (distance or rotation amount) of the touch position from start to end of the rotation operation of the two touch positions. Further, the panel control unit 10 may determine a length of the locus of each touch position or a moving distance between touch positions of start and end of the rotation of the same finger as an operation amount (rotation amount) in the rotation operation. In addition, the panel control unit 10 may determine a value indicating the rotation operation amount so as to be larger as the rotation angle is larger by other method. Further, the panel control unit 10 may determine the first calculation value by dividing the determined rotation amount by the measured time (from start to end of the rotation operation of the touch position).

Note that the panel control unit 10 may recognize the locus of the two touch positions (moving path of the touch position) based on the output of the touch panel unit 12, so as to recognize the rotation direction based on the locus. In addition, the panel control unit 10 may recognize the rotation direction based on a variation of the straight line connecting (the coordinates of) the two touch positions before and after the rotation operation. Alternatively, the panel control unit 10 may recognize whether or not the rotation operation is made and the rotation direction in accordance with whether or not a variation pattern of the touch position coordinates matches the variation pattern of the coordinates in a predetermined rotation operation. In addition, the rotation direction may be recognized by other method. In this way, the panel control unit 10 recognizes that the operation of rotating the two touch positions in the forward direction is made.

On the other hand, when the one-point moving operation including the forward direction component in the two-point touch is regarded as the lowering speed setting operation, the panel control unit 10 determines the moving speed (operation speed) of the touch position in the one-point moving operation as the first calculation value based on the output of the touch panel unit 12.

For instance, the panel control unit 10 measures time from start to end of moving one of touch positions based on the output of the touch panel unit 12. The panel control unit 10 may determine a value obtained by dividing the operation amount (moving distance) of the touch position by the measured time as the first calculation value (operation speed of the lowering speed setting operation).

As shown in FIG. 30, the panel control unit 10 determines a length of a straight line connecting touch positions at start and end of moving the touch position, or a coordinate difference in the up and down direction (Y direction component length) between start and end of the movement as the operation amount (either can be used). Further, the panel control unit 10 determines a value obtained by dividing the determined operation amount by the measured time as a first calculation value (operation speed of the lowering speed setting operation).

The panel control unit 10 recognized that the lowering speed setting operation is made in accordance with whether or not the movement includes a forward direction component, based on the output of the touch panel unit 12, and based on coordinates at start and end of the movement of the one touch position. Alternatively, the panel control unit 10 may recognize whether or not the one-point moving operation is made and a moving direction of the touch position in accordance with whether or not a variation pattern of the touch position coordinates matches a coordinate variation pattern of a predetermined one-point moving operation. When the movement includes a forward direction component, the touch panel unit 12 recognizes that the lowering speed setting operation is made.

In addition, it is possible to determine a rotation amount or a moving amount (moving distance) itself of the touch position as the first calculation value instead of determining the operation speed as the first calculation value.

When the rotation operation in the forward direction is regarded as the lowering speed setting operation, the panel control unit 10 may determine the rotation amount in the lowering speed setting operation as the first calculation value. For instance, the panel control unit 10 may determine a rotation angle from start to end of the rotation operation of the two touch positions as the rotation amount (first calculation value). As shown in FIG. 29, for example, the panel control unit 10 may determine an angle between a straight line connecting two touch positions when the rotation starts and a straight line connecting two touch positions after the rotation operation in the forward direction as the rotation angle (first calculation value).

Alternatively, the panel control unit 10 checks a locus (distance) of the touch position from start to end of the rotation operation of the two touch positions in the forward direction based on the output of the touch panel unit 12. Further, the panel control unit 10 may determine a length of a locus of each touch position or a distance of the touch position coordinates between before and after the rotation as the operation amount of the lowering speed setting operation (rotation operation).

On the other hand, when the one-point moving operation including the forward direction component is regarded as the lowering speed setting operation, the panel control unit 10 may determine the operation amount (moving distance) of the touch position in the lowering speed setting operation as the first calculation value.

In this case, the panel control unit 10 determines an operation amount (moving distance) of one touch position based on the output of the touch panel unit 12. For instance, the panel control unit 10 measures a length of a straight line connecting touch positions (coordinates) of start and end of the touch position movement, or a coordinate difference in the up and down direction (Y direction component length) between before and after the movement as the operation amount. Further, the panel control unit 10 determines the measured operation amount as the first calculation value.

<3. Transition Toward Lower Layer Based on First Calculation Value>

Next, with reference to FIG. 31, there is described setting of the transition speed based on the first calculation value on the operation panel 1 of this embodiment.

The memory 18 of the operation panel 1 of this embodiment stores transition speed setting data D4 defining data concerning the screen transition speed corresponding to the determined first calculation value in the transmission transition display toward a lower layer (see FIG. 3).

Concerning the transmission transition display to a lower layer, the transition speed setting data D4 is defined so that the transition speed from the transition source screen to the transition destination screen becomes higher as the determined first calculation value is larger. In addition, the transition speed setting data D4 is defined so that the transition speed from the transition source screen to the transition destination screen becomes lower as the determined first calculation value is smaller.

The transition speed setting data D4 defines time from the transmission start from the transition source screen to transmission completion to the transition destination screen (transition time). The panel control unit 10 determines the first calculation value, refers to the transition speed setting data D4 in the memory 18, and reads out the transition time corresponding to the determined first calculation value. Further, the panel control unit 10 performs the transmission transition from the transition source screen to the next lower layer screen or the next upper layer screen in the read transition time.

The panel control unit 10 replaces pixels of the transition source screen with pixels of the transition destination screen a predetermined number of times from the transmission start (transition start) to the transmission completion (transition completion). The number of pixels to be replaced in one time (a constant number) is determined so as to satisfy a relationship "(the predetermined number of times)×(the number of pixel per one replacing process)=(the total number of pixels of the screen)". Therefore, the panel control unit 10 adjusts an execution interval of the pixel replacing process (replacing process period) so as to determine the transition speed corresponding to the first calculation value.

It is supposed that the predetermined number of times is 100. When the transition time defined in the transition speed setting data D4 is 5 seconds, the panel control unit 10 sets the replacing process period to 0.05 seconds. When the defined transition time is 2 seconds, the replacing process period is set to 0.02 seconds. In other words, the panel control unit 10 performs the replacing process by a period obtained by dividing the defined transition time corresponding to the first measured value by the predetermined number of times. Further, the panel control unit 10 increases the ratio of the transition destination screen (0 to 100%) every period. Therefore, the replacing process period with respect to a range of each first calculation value may be stored in the transition speed setting data D4. Further, it is possible to change the transition speed by increasing or decreasing the predetermined number of times.

In any case, the panel control unit 10 controls the display unit 11 to perform the transmission transition of the screen at higher speed as the first calculation value is larger (as the operation speed is higher, or as the operation amount is larger). On the other hand, the panel control unit 10 controls the display unit 11 to perform the transmission transition of the screen at lower speed as the first calculation value is smaller. For instance, the highest transition speed is approximately a few times higher than the lowest transition speed. In other words, time necessary for the transition from the transition source screen to the transition destination screen at the highest speed is approximately a fraction of that at the lowest speed.

Data in the uppermost block denoted by (1) in FIG. 31 correspond to the case where the operation of rotating the two touch positions is regarded as the lowering speed setting operation. In addition, the data correspond to the case where a value concerning a rotation operation speed is determined as the first calculation value. Further, a magnitude relationship of values in the block (1) of FIG. 31 satisfies "V11<V12<Vx1" in values concerning a rotation operation speed.

Data in the second upper block denoted by (2) in FIG. 31 correspond to the case where the operation of rotating the two touch positions is regarded as the lowering speed setting operation. In addition, the data correspond to the case where a value concerning the operation amount in the rotation operation is determined as the first calculation value. Further, a magnitude relationship of values in the block (2) of FIG. 31 satisfies "L11<L12<Lx1" in values concerning the rotation operation amount.

Data in the third block denoted by (3) in FIG. 31 correspond to the case where the one-point moving operation including the forward direction component is regarded as the lowering speed setting operation. In addition, the data correspond to the case where a value concerning the operation speed (touch position moving speed) is determined as the first calculation value. Further, a magnitude relationship of values in the block (3) of FIG. 31 satisfies "V13<V14<Vx2" in values concerning the rotation operation speed.

Data in the lowermost block denoted by (4) in FIG. 31 correspond to the case where the one-point moving operation including the forward direction component is regarded as the lowering speed setting operation. In addition, the data correspond to the case where a value concerning the operation amount (moving distance) in the lowering speed setting operation is determined as the first calculation value. Further, a magnitude relationship of values in the block (4) of FIG. 31 satisfies "L13<L14<Lx2" in values concerning the operation amount of the rotation operation.

Further, in the transition speed setting data D4, the transition time satisfies the relationship "T11>T12>Tx". In accordance with the definition in the transition speed setting data D4, the transition time from the transition source screen to the transition destination screen for completing the transmission transition becomes shorter as the determined first calculation value is larger. The transition time from the transition source screen to the transition destination screen for completing the transmission transition becomes longer as the determined first calculation value is smaller. As a result, when the panel control unit 10 performs the transmission transition display to a lower layer, the transition speed becomes higher as the first calculation value is larger, while the transition speed becomes lower as the first calculation value is smaller.

In the operation panel 1 of this embodiment (touch panel unit 12), it is possible to adopt a structure in which only one of operations that can be used as the lowering speed setting operation (the rotation operation and the one-point moving operation) is accepted as the lowering speed setting operation. In addition, it is sufficient to determine only one of the operation speed and the operation amount as the first calculation value.

Further, as shown in FIG. 32, in the operation panel 1 of this embodiment, it is possible to set which operation should be accepted as the lowering speed setting operation, and which value should be determined as the first calculation value, in the transition operation setting screen 58 in advance.

FIG. 32 shows an example of the transition operation setting screen 58. The touch panel unit 12 accepts an operation on a rotation operation button B25 (bearing a character string "rotation operation") disposed in the transition operation setting screen 58 or a one-point moving operation button B26 (bearing a character string "one-point moving operation"). In other words, the touch panel unit 12 accepts setting for selecting whether the rotation operation made after the transmission start operation is regarded as the lowering speed setting operation or the one-point moving operation including the forward direction component is regarded as the lowering speed setting operation. Further, it is possible to adopt a structure in which both the two touch position rotation operation and the one-point moving operation are accepted as the lowering speed setting operation without disposing the buttons.

In addition, the touch panel unit 12 accepts an operation on a speed button B27 (bearing a character string "operation speed") disposed in the transition operation setting screen 58 or an operation amount button B28 (bearing a character string "operation amount (moving distance)"). In other words, the touch panel unit 12 accepts setting for selecting whether the operation speed is determined as the first calculation value (the transition time is shortened in proportion to the operation speed) or the value concerning the moving amount (moving distance) of the touch position is determined as the first calculation value (the transition time is shortened in proportion to the operation amount).

Further, when the touch panel unit 12 accepts the operation on the OK button B12, the panel control unit 10 controls the memory 18 to store the set content made in the transition operation setting screen 58. Further, the panel control unit 10 recognizes the lowering speed setting operation in accordance with the set content stored in the memory 18, determines the first calculation value, and determines the transition time in the transition to a lower layer.

In this way, the panel control unit 10 (calculation unit) determines the first calculation value for the lowering speed setting operation in which the two-point touch operation is made on the touch panel unit 12 during the speed setting mode in the transmission transition mode and the touch position is moved in a predetermined forward direction. The display unit 11 performs the transmission transition display to a lower layer so that the transition speed from the transition source screen to the transition destination screen becomes higher as the determined first calculation value is larger, and performs the transmission transition display toward a lower layer so that the transition speed from the transition source screen to the transition destination screen becomes slower as the determined first calculation value is smaller. In this way, the transmission transition display toward a lower layer is performed at a speed corresponding to the obtained first calculation value. Therefore, the switching time (transition speed) of the screen can be arbitrarily determined by the simple gesture operation. In addition, because the transition speed can be determined in accordance with (in proportion to) strength of operation, it is possible to adjust the transition speed (time necessary for the transition) based on an intuitive and sensitive operation like operating a speed adjusting switch. Therefore, the user can quickly obtain a display of a lower screen to be checked by a plurality of layers only by a fast operation or by increasing the operation amount of the touch position. In addition, when the user wants to check each screen in sufficient time, the user can decrease the transition speed of the screen transition toward a lower layer so as to finely check the screens only by the slow operation or by decreasing the operation amount of the touch position. Therefore, the user can easily adjust a switching speed of the screen in the transmission transition display toward a lower layer so as to match the intention.

(Setting of Transition Speed in Transmission Transition Display Returning to Upper Layer)

Figure 33:
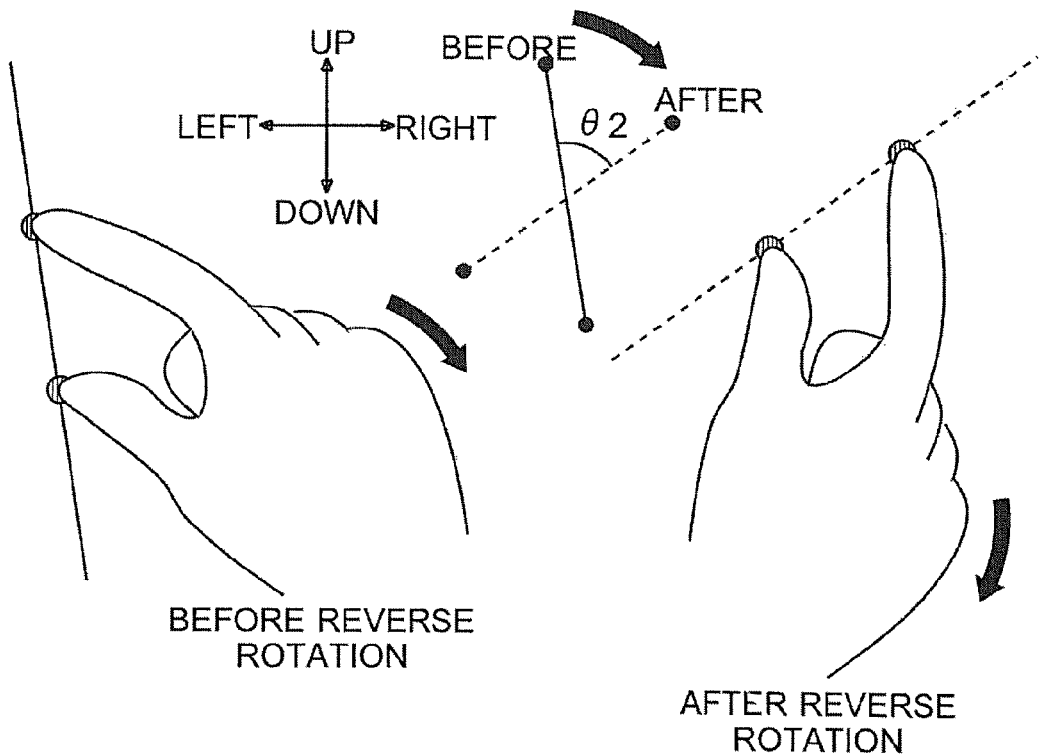
FIG. 33 is a diagram for explaining an example of a heightening speed setting operation according to the embodiment.
Figure 34:
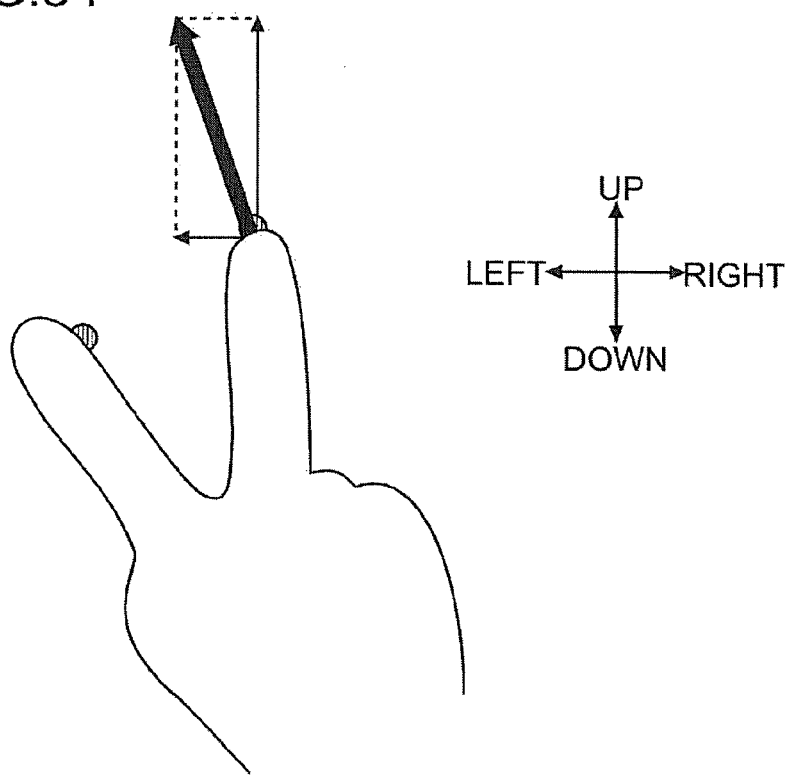
FIG. 34 is a diagram for explaining an example of the heightening speed setting operation according to the embodiment.

Next, with reference to FIGS. 33 to 34, there is described setting of the transition speed in the transmission transition display returning to an upper layer according to the embodiment.

In the display input device (the operation panel 1) of this embodiment, the transition time in the transmission transition display toward an upper layer (time for completion of transition from a transition source screen to a transition destination screen in the next upper layer) can be set by a heightening speed setting operation. This setting of the transition speed (the transmission time or the transmission speed) can be made during the transmission transition display to an upper layer (during the transmission transition mode).

Here, also in the case of the transmission transition display toward an upper layer, when a predetermined speed setting mode change operation is made during the transmission transition display, the transition speed can be set on the operation panel 1. Here, the speed setting mode change operation can be the same as in the case of a lower layer. Further, when the panel control unit 10 recognizes that the speed setting mode change operation is made during the transmission transition display to an upper layer, the operation panel 1 is set to the speed setting mode. Further, when the heightening speed setting operation is made in the speed setting mode, the panel control unit 10 (operation panel 1) automatically finishes the speed setting mode so as to return to the normal transmission transition mode.

<1. Heightening Speed Setting Operation>

First, the heightening speed setting operation is described. As shown in FIGS. 33 and 34, the touch panel unit 12 of this embodiment accepts an operation in the opposite direction to the forward direction of the lowering speed setting operation as the heightening speed setting operation.

When the touch panel unit 12 accepts the rotation operation in the forward direction as the lowering speed setting operation, the touch panel unit 12 accepts the operation of rotating the two touch positions in the opposite direction to the lowering speed setting operation as the heightening speed setting operation. FIG. 33 shows an example in which the forward direction is a leftward rotation (counter-clockwise direction) and the opposite direction is a rightward rotation (clockwise direction).

Further, the panel control unit 10 recognizes an operation of rotating the two touch positions in the opposite direction based on the output of the touch panel unit 12. The method of recognizing the rotation operation may be the same as that in the case of the forward direction (the case of the lowering speed setting operation) (description thereof is omitted).

In addition, as shown in FIG. 34, the touch panel unit 12 may accept the operation of moving one of two touch positions in the direction opposite to the forward direction (so as to include an opposite direction component) (one-point moving operation) as the heightening speed setting operation. Further, the method of recognizing the one-point moving operation may be the same as that in the case of the forward direction (the case of the lowering speed setting operation) (description thereof is omitted). In this way, the touch panel unit 12 accepts at least one of the rotating operation in the opposite direction and the one-point moving operation in the opposite direction as the heightening speed setting operation. When performing the transmission transition display toward a lower layer, meaning of operation to the opposite direction and meaning of the direction opposite to the transition between layers are overlapped with each other. As described above, in the display input device of this embodiment, because the forward direction in the one-point moving operation is a downward direction, an upward direction is the opposite direction.

<2. Second Calculation Value>

Further, the panel control unit 10 determines a second calculation value of the operation content (the operation speed or the operation amount) of the heightening speed setting operation. Here, the panel control unit 10 according to the embodiment determines an operation speed of the heightening speed setting operation as the second calculation value.

When the two touch position rotation operation in the opposite direction is regarded as the heightening speed setting operation, the panel control unit 10 determines the rotation speed of the heightening speed setting operation as the second calculation value based on the output of the touch panel unit 12. The method of determining the second calculation value may be the same as the first calculation value.

For instance, as shown in FIG. 33, the panel control unit 10 measures an angle θ2 between a straight line connecting two touch positions when the reverse rotation starts and a straight line connecting two touch positions after the reverse rotation operation as the rotation angle in the heightening speed setting operation. The panel control unit 10 can determine the rotation speed in the heightening speed setting operation (second calculation value) by dividing the rotation angle from start to end of the reverse rotation operation of the two touch positions by the measured time.

In addition, the panel control unit 10 may check the locus (distance or reverse rotation amount) of the touch position from start to end of the reverse rotation operation of the two touch positions. Further, the panel control unit 10 may determine a locus length of each touch position or a moving distance of the touch position of the same finger between before and after the reverse rotation as the operation amount of the reverse rotation operation (reverse rotation amount). In addition, the panel control unit 10 may determine a value indicating an operation amount of the reverse rotation operation so that the value becomes larger as the rotation angle is larger by other method. Further, the panel control unit 10 determines the operation speed in the reverse rotation (second calculation value) by dividing the determined operation amount by the measured time (from start to end of the reverse rotation operation of the touch position).

On the other hand, when the one-point moving operation including the opposite direction component in the two-point touch is regarded as the heightening speed setting operation, the panel control unit 10 may determine the touch position moving speed (operation speed) in the one-point moving operation to the opposite direction as the second calculation value based on the output of the touch panel unit 12.

For instance, the panel control unit 10 measures time from start to end of moving one of the touch positions based on the output of the touch panel unit 12. The touch panel unit 12 may determine a value obtained by the operation amount (moving distance) of the touch position by the measured time as the second calculation value (heightening speed setting operation speed).

As shown in FIG. 34, the panel control unit 10 determines a length of a straight line connecting touch positions at start and end of movement of the touch position or a coordinate difference between start and end of movement in the up and down direction (such as the Y direction component length) as the operation amount. Further, the panel control unit 10 determines a value obtained by dividing the determined operation amount by the measured time as the second calculation value.

The panel control unit 10 recognizes that the heightening speed selling operation is made in accordance with whether or not the movement includes an opposite direction component based on the coordinates of the start point and the end point of movement of the touch position moved by the one-point moving operation. The touch panel unit 12 recognizes that the heightening speed setting operation is made when the movement includes the opposite direction component.

In addition, it is possible to determine not the operation speed but the reverse rotation amount or the operation amount (moving distance) itself of the touch position of the one-point moving operation in the opposite direction as the second calculation value.

When the rotation operation in the opposite direction is regarded as the heightening speed setting operation, the panel control unit 10 may determine the reverse rotation amount as the second calculation value based on the output of the touch panel unit 12. For instance, the panel control unit 10 may determine the rotation angle from start to end of the reverse rotation operation as the reverse rotation amount (second calculation value) based on the output of the touch panel unit 12. As shown in FIG. 33, the panel control unit 10 may determine an angle between a straight line connecting the two touch positions when starting the reverse rotation and a straight line connecting the two touch positions after the reverse rotation operation in the opposite direction as the rotation angle (second calculation value).

Alternatively, the panel control unit 10 checks a locus (distance) of the touch positions from start to end of the reverse rotation operation in the opposite direction based on the output of the touch panel unit 12. Further, the panel control unit 10 may determine a locus (distance) of each touch position (a distance between the touch positions before and after the reverse rotation) as the operation amount of the heightening speed setting operation (reverse rotation operation).

On the other hand, when the one-point moving operation including the opposite direction component is regarded as the heightening speed setting operation, the panel control unit 10 may determine the operation amount (moving distance) of the touch position in the heightening speed setting operation as the second calculation value. For instance, the panel control unit 10 measures a length difference of the straight line connecting the touch positions (coordinates) between start and end of the touch position moved in the opposite direction, or a coordinate difference between before and after the movement in the up and down direction (such as the Y direction component length) as the operation amount, based on the output of the touch panel unit 12. Further, the panel control unit 10 determines the measured operation amount as the second calculation value.

<3. Transition Based on Second Calculation Value>

Next, with reference to FIG. 35, the transition speed setting on the operation panel 1 of this embodiment based on the second calculation value is described.

The memory 18 of the operation panel 1 of this embodiment also stores data defining screen transition time corresponding to a determined second calculation value (time from transmission start from the reverse transition source screen to transmission completion to the reverse transition destination screen) as the transition speed setting data D4, in the transmission transition display toward an upper layer (see FIG. 3).

The transition speed setting data D4 is defined so that the display unit 11 performs the transmission transition display (rewind and play) toward an upper layer at higher speed as the determined second calculation value is larger, while the display unit 11 performs the transmission transition display (rewind and play) toward an upper layer at lower speed as the determined second calculation value is smaller. In this way, when accepting the heightening speed setting operation for moving the touch position in the direction opposite to the forward direction in the lowering speed setting operation, the calculation unit (panel control unit 10) determines the operation speed of the operation for moving the touch position in the heightening speed setting operation or the operation amount of the touch position in the heightening speed setting operation as the second calculation value, based on the output of the touch panel unit 12. The display unit 11 performs the transmission transition display toward an upper layer so as to rewind and play the switching process of the screen in the transmission transition display toward a lower layer, performs the transmission transition display toward an upper layer so that a rewind and play speed becomes higher as the determined second calculation value is larger, and performs the transmission transition display toward an upper layer so that the rewind and play speed becomes lower as the determined second calculation value is smaller. In this way, in the transmission transition display toward an upper layer (screen switching), time necessary for screen switching (transition speed) from a screen to the next upper layer can be arbitrarily determined by the simple gesture operation. In addition, the transition speed can be operated so as to be proportional to strength of operation. Therefore, the user can quickly obtain a display of a screen that was displayed before only by a quick operation or increasing operation amount of the touch position. In addition, when the user wants to check each screen in sufficient time, the user can decrease the screen transition speed to an upper layer so as to increase time from transmission start of a certain screen to completion of switching to the next screen only by slow operation or decreasing the operation amount of the touch position. Therefore, the display unit 11 can easily perform the transmission transition display matching the user's intention.

More specifically, the transmission transition display toward an upper layer is described. First, when the speed setting mode change operation is made during the transmission transition display toward an upper layer, the operation panel 1 becomes the speed setting mode. When accepting the heightening speed setting operation for moving the touch position in the direction opposite to the forward direction in the lowering speed setting operation in the state where the two-point touch is made on the touch panel unit 12, the panel control unit 10 determines the operation speed of the heightening speed setting operation (for moving the touch position) or the operation amount in the heightening speed setting operation as the second calculation value, based on the output of the touch panel unit 12.

In addition, when the speed setting mode change operation and the heightening speed setting operation are made during the transmission transition display toward a lower layer, the panel control unit 10 may regard that the reverse transition operation is made and may stop the transmission transition display to a lower layer. Further, the panel control unit 10 regards the transition destination screen in the transmission transition display toward a lower layer as the reverse transition source screen and regards the transition source screen in the transmission transition display toward a lower layer as the reverse transition destination screen. Further, the panel control unit 10 controls the display unit 11 to start the transmission transition display to an upper layer in which the reverse transition source screen gradually disappears while a ratio of the reverse transition destination screen display is increased as time passes.

On the other hand, when the transition to the lowest screen is completed in the transmission transition display to a lower layer, or when the speed setting mode change operation and the heightening speed setting operation are made in the state where the next transmission transition display is not started after the transmission to the transition destination screen is completed, the panel control unit 10 may control the display unit 11 to perform the transmission transition display toward an upper layer by regarding that the reverse transition operation is made, by regarding the currently displayed screen as the reverse transition source screen, and by regarding the next upper layer screen of the currently displayed screen as the reverse transition destination screen.

When the transition is completed with total transmission of the reverse transition source screen without reaching the uppermost layer and without the lowering speed setting operation or returning to the normal mode, the panel control unit 10 controls the display unit 11 to repeat the transmission transition display toward an upper layer by regarding the reverse transition destination screen as the new reverse transition source screen and by regarding a screen belonging to the next upper layer of the new reverse transition source screen as the new reverse transition destination screen.

Further, the panel control unit 10 controls the display unit 11 to perform the transmission transition display toward an upper layer so that the transition speed from the reverse transition source screen to the reverse transition destination screen becomes higher as the determined second calculation value is larger. In addition, the panel control unit 10 controls the display unit 11 to perform the transmission transition display toward an upper layer so that the transition speed from the reverse transition source screen to the reverse transition destination screen becomes lower as the determined second calculation value is smaller.

Therefore, the transition speed setting data D4 is defined so that the transition speed from the reverse transition source screen to the reverse transition destination screen becomes higher (time necessary for the transition becomes shorter) as the determined second calculation value is larger. In addition, the transition speed setting data D4 is defined so that the transition speed becomes lower (time necessary for the transition becomes longer) as the determined second calculation value is smaller. The panel control unit 10 determines a second calculation value, refers to the transition speed setting data D4 in the memory 18, reads out transition time corresponding to the determined second calculation value, and performs the transmission transition to the next upper layer screen from the transition source screen to the transition source screen in the read transition time.

The panel control unit 10 repeats the process of replacing a constant number of pixels among pixels in the reverse transition source screen with pixels of the reverse transition destination screen a predetermined number of times from transmission start (transition start) of the reverse transition source screen to transmission completion (transition completion) to the reverse transition destination screen toward an upper layer. Further, the panel control unit 10 controls the display unit to change screens to be displayed step by step (similarly to the case toward a lower layer). The number of pixel (the constant number) to be replaced in one replacing process is determined so as to satisfy a relationship "(the predetermined number of times)×(the number of pixels in one replacing process)=(the total number of pixels in the screen)". Therefore, the panel control unit 10 adjusts the execution interval of the pixel replacing process (execution interval of image variation or an interval between steps) so as to determine the transition speed corresponding to the second calculation value.

It is supposed that the predetermined number of times is 100. When the transition time defined in the transition speed setting data D4 is 5 seconds, the panel control unit 10 sets the replacing process period in the reverse transition to 0.05 seconds. When the defined transition time is 2 seconds, the replacing process period in the reverse transition is set to 0.02 seconds. In other words, the panel control unit 10 regards time obtained by dividing the defined transition time toward an upper layer corresponding to the second measured value by the predetermined number of times as the replacing process period. Further, the panel control unit 10 increases a ratio of the reverse transition destination screen (0 to 100%) every elapsed time. Therefore, the replacing process period corresponding to each second calculation value may be stored in the transition speed setting data D4.

In any case, the panel control unit 10 controls the display unit 11 to perform the transmission transition toward an upper layer at higher speed as the second calculation value is larger, and controls the display unit 11 to perform the transmission transition toward an upper layer at lower speed as the second calculation value is smaller. For instance, the highest speed is approximately a few times the lowest speed.

Data in the uppermost block denoted by (1) in FIG. 35 are data in the case where the two touch position rotation operation in the opposite direction is regarded as the heightening speed setting operation. In addition, the data correspond to the case where a value concerning a reverse rotation operation speed is determined as the second calculation value. Further, a magnitude relationship of values in the block (1) of FIG. 35 satisfies "V21<V22<Vy1" in values concerning the reverse rotation operation speed.

Data in the second upper block denoted by (2) in FIG. 35 are data in the case where the operation of rotating the two touch positions as the heightening speed setting operation. In addition, the data correspond to the case where a value concerning the operation amount in the reverse rotation operation is determined as the second calculation value. Further, a magnitude relationship of values in the block (2) of FIG. 35 satisfies "L21<L22<Ly1" in values concerning the reverse rotation operation amount.

Data in the third block denoted by (3) in FIG. 35 are data in the case where the one-point moving operation including the opposite direction component is regarded as the heightening speed setting operation. In addition, the data correspond to the case where a value concerning the operation speed (touch position moving speed) is determined as the second calculation value. Further, a magnitude relationship of values in the block (3) of FIG. 35 satisfies "V23<V24<Vy2" in values concerning the reverse rotation operation speed.

Data in the lowermost block denoted by (4) in FIG. 35 are data in the case where the one-point moving operation including the opposite direction component is regarded as the heightening speed setting operation. In addition, the data correspond to the case where a value concerning the operation amount (moving distance) in the heightening speed setting operation is determined as the second calculation value. Further, a magnitude relationship of values in the block (4) of FIG. 35 satisfies "L23<L24<Ly2" in values concerning the reverse rotation operation amount.

Further, when the display unit 11 performs the transmission transition display to an upper layer, the transition time from the reverse transition source screen to the reverse transition destination screen becomes shorter as the determined second calculation value becomes larger. Therefore, in the transition speed setting data D4, the transition time satisfies the relationship "T21>T22>Ty".

Further, when the speed setting mode change operation and the lowering speed setting operation are made again after the speed setting mode change operation and the heightening speed setting operation are made in the transmission transition mode, the panel control unit 10 controls the display unit 11 to stop the transmission transition display to an upper layer and to restart the transmission transition display toward a lower layer. In this way, the switching of the transition direction between the lower layer direction and the upper layer direction can be arbitrarily performed simultaneously with the speed setting in the transmission transition mode. Therefore, the user can arbitrarily move between the layers by the simple operation.

(End of Transmission Transition Mode)

Next, end of the transmission transition mode (transmission transition display) is described.

When the touch panel unit 12 accepts the predetermined finishing operation, the panel control unit 10 controls the display unit 11 to finish the transmission transition mode (transmission transition display toward a lower layer or an upper layer).

Here, the finishing operation can be appropriately determined. In the operation panel 1 of this embodiment, the operation of taking all fingers off the touch panel unit 12 (all touch release) is regarded as the finishing operation. The touch panel unit 12 recognizes the all touch release. The panel control unit 10 recognizes that every positions becomes untouched based on the output of the touch panel unit 12 (recognizes that the finishing operation is made). Further, the finishing operation is not limited to the example described above and can be appropriately determined as an operation of moving the touch position in a specific direction, a three-point touch operation, or the like.

When the finishing operation is made, the panel control unit 10 controls the display unit 11 to finish the transmission transition display. In other words, the operation panel 1 (the display unit 11 and the touch panel unit 12) returns to the normal mode. Further, the display unit 11 returns to a state where the screen is not switched unless any button is operated.

Further, when the finishing operation is made (when the transmission transition mode is finished), the panel control unit 10 may control to display the screen in which the transmission start operation is made first (the screen in which the transmission transition display is started). In this way, it is possible to promptly display the original screen (initial screen) during the transition display over a plurality of layers.

In addition, when the finishing operation is made (when the transmission transition mode is finished), the panel control unit 10 may control the display unit 11 to display the current transition source screen (the reverse transition destination screen or the upper layer screen) or the current transition destination screen (the reverse transition source screen or the lower layer screen), before finishing the transmission transition display. In other words, the transmission transition display can be finished in the screen that is currently displayed, and it is possible to jump from the start screen of the transmission transition display to the screen in which the transmission transition display is finished. In this way, it is possible to jump from the screen in which the transmission start operation is made first to a screen in a different layer. Note that it is sufficient to display a screen having a larger ratio of display when the finishing operation is made between the transition source screen and the transition destination screen (the reverse transition source screen and the reverse transition source screen).

Here, as shown in FIG. 15, it is possible to adopt a structure in which the screen to be displayed when the finishing operation is made (when the transmission transition display is finished) can be set on the transmission transition setting screen 59. For this setting, in the transmission transition setting screen 59, there are disposed a fifth button B23 (bearing a character string "return to original screen") and a sixth button B24 (bearing a character string "maintain transition screen"). The fifth button B23 is operated for displaying the screen in which the transmission transition display is started, when the finishing operation is made. The sixth button B24 is operated for controlling the display unit 11 to display the current transition source screen or the current transition destination screen, when the finishing operation is made.

(Set Value Setting when Reaching Lowermost Layer)

Next, setting of a set value when reaching the set value setting screen is described with reference to FIG. 21.

The screen of the lowermost part of FIG. 21 is a lowest layer screen (there is no layer below). Further, the screen of the lowermost part of FIG. 21 is a guest permission/inhibition setting screen 58 for setting whether or not to permit a guest to use the multifunction peripheral 100 as a set value.

Here, the touch panel unit 12 accepts a predetermined set value setting operation for setting a set value in a lowest screen when the transmission transition display is continued, which is displayed in the state of reaching the set value setting screen. In this way, when the lowest screen reached by repetition of the transmission transition is a desired screen for setting a set value, the set value can be set also in the transmission transition mode similarly to the normal mode.

The touch panel unit 12 accepts an operation of additionally touching a display area of a button (the permission button B17 or the non-permission button B18 in the example of FIG. 21) disposed in the screen for setting the set value (the lowest screen) in the state where one of points is touched in the lowest screen (in the state where the transmission transition mode is continued), and afterward touching a display area of the OK button B12 disposed in the screen, as the set value setting operation. Further, the panel control unit 10 recognizes that the set value setting operation is made based on the output of the touch panel unit 12 during the transmission transition mode (recognizes that the set value setting is made). Further, the panel control unit 10 controls the memory 18 or the storage unit 42 to store the set value so as to update the setting.

Next, variations of the embodiment described above are described.

(Variation 1)

In the embodiment described above, there is described the example in which the transmission transition display is promptly started by regarding the transition destination screen in which the transition is completed as the new transition source screen, and by regarding the next lower layer screen of the new transition source screen as the new transition destination screen, in the case where the touching one of positions on the touch panel unit 12 is continued when the transition from the transition source screen to the transition destination screen is completed (when transmittance of the transition source screen becomes 100%).

However, it is possible to set a wait time between the completion of the transition and the start of the transmission transition display from the new transition source screen to the new transition destination screen. The wait time may be an approximate time (1 to 10 seconds) such that content of the screen in which the transition is completed can be checked. Further, when the wait time passes from the screen transition completion, the panel control unit 10 controls the display unit 11 to restart the transmission transition display. When the temporary halt operation, the selection operation, or the transition destination setting operation is made during the wait time, the screen corresponding to the operated button becomes the new transition destination screen of the transmission transition display that is started after the wait time passes.

When the reverse transition operation is made during the wait time, the panel control unit 10 may control to perform the transmission transition display toward an upper layer by regarding the currently displayed screen as the reverse transition source screen and by regarding the next upper layer screen of the currently displayed screen as the reverse transition destination screen. In addition, in the case of setting the wait time, when the finishing operation is made during the wait time, the panel control unit 10 may control the display unit 11 to display the current screen (that is displayed during the wait time) as the screen that is displayed first after the transmission transition mode is finished. In this way, by setting the wait time, the user can sufficiently check the screen after the transition. In addition, it is easy to understand the path in which the screen switching by the transmission transition display is performed.

(Variation 2)

In the embodiment described above, there is described the example of successively staring the transmission transition display to an upper layer based on the reverse transition operation in the case where the reverse transition operation is continued when the transition toward an upper layer from the reverse transition source screen to the reverse transition destination screen is completed (when transmittance of the reverse transition source screen becomes 100%), by regarding the reverse transition destination screen in which the transition is completed as the new reverse transition source screen, and by regarding the next upper layer screen of the new reverse transition source screen as the reverse transition destination screen.

However, it is possible to set a wait time between completion of the reverse transition and start of the transmission transition display from the new reverse transition source screen to the new reverse transition destination screen, in the state where the reverse transition operation is continued. The wait time may be an approximate time (1 to 10 seconds) such that content of the screen in which the transition in the opposite direction (to an upper layer) is completed can be checked. Further, after the wait time elapses, the panel control unit 10 may control the display unit 11 to restart the transmission transition display to an upper layer.

In addition, when the wait time is set in the transmission transition display to an upper layer, it is considered that the finishing operation is made during the wait time. When the finishing operation is made during the wait time, the panel control unit 10 may control the display unit 11 to display the current screen (that is displayed during the wait time) as the screen that is display first after the transmission transition mode is finished.

In this way, by setting the wait time, in the state where the transmission transition display to an upper layer is performed by the reverse transition operation, the user can sufficiently check the screen that was displayed. In addition, because the wait time is set in the transmission transition display to an upper layer, the user can easily understand the path in which the screen switching by the transmission transition display is performed.

In this way, the image forming apparatus (the multifunction peripheral 100) includes the operation panel 1 (display input device) described above. With this structure, the user can easily determine the path (process) for tracing layers in the automatic screen transition toward a lower layer. Therefore, it is possible to provide the image forming apparatus (the multifunction peripheral 100) in which the user can check contents of screens over a plurality of layers by the simple operation. In addition, it is also possible to provide the image forming apparatus (the multifunction peripheral 100) in which the user can check which screen belong to which layer.

The embodiment of the present disclosure is described above, but the scope of the present disclosure is not limited to this embodiment, and various modifications can be made without deviating from the spirit of the disclosure.

What is claimed is:

1. A display input device comprising:
a display unit configured to display a button in a screen, and to switch a screen to be displayed from a screen that is currently displayed to one of a lower layer screen and an upper layer screen in accordance with the button that is operated in a normal mode; and
a touch panel unit for accepting an operation on the screen of the display unit including an operation on the button, wherein
when the touch panel unit accepts a transmission start operation, which is an operation of, in the normal mode, long pressing a given button on the screen by keeping touching inside a display area of the given button continuously for a predetermined long press period, the display unit performs a transmission transition display in which the screen on which the transmission start operation was performed is taken as a first transition source screen and the transition source screen gradually disappears while a screen that belongs to a next lower layer of the transition source screen and that is displayed by operating the given button that was long pressed by a normal operation is taken as a first transition destination screen and a ratio of display of the transition destination screen to display of the transition source screen is increased as time passes in such a way that the transition destination is increasingly overlaid on, so as to emerge stepwise from, the transition source screen, so that the screen to be displayed is changed, and while the transmission start operation is continued, the display unit repeats the transmission transition display toward a lower layer, in which the transition destination screen after the transition is completed with total transmission of the transition source screen is regarded as a new transition source screen, and a screen that belongs to a next lower layer of the new transition source screen is regarded as a new transition destination screen.

2. The display input device according to claim 1, wherein when continuing the transmission transition display, the display unit performs one of the transmission transition display over a plurality of screens so as to trace a predetermined screen transition path, the transmission transition display over a plurality of screens by operating a button at a predetermined position among buttons disposed in the screen that is being displayed, and the transmission transition display over a plurality of screens so as to trace a path that is leadable to a deepest layer screen.

3. The display input device according to claim 1, wherein
when the touch panel unit accepts a predetermined temporary halt operation during the transmission transition display to a first transition destination screen, or when the touch panel unit accepts a temporary halt operation during the transmission transition display to the new transition destination screen in the case where the transmission transition display is continued from the new transition source screen to the new transition destination screen, the display unit stops the transmission transition display, and when the touch panel unit accepts a selection operation for selecting a button in the transition source screen following the temporary halt operation and a predetermined confirmation operation following the selection operation, the display unit restarts the transmission transition display by regarding a screen corresponding to the button selected in the confirmation operation as the transition destination screen.

4. The display input device according to claim 3, wherein the touch panel unit accepts an operation of newly touching the touch panel unit while continuing to touch the touch panel unit from the transmission start operation as the temporary halt operation, accepts an operation of moving at least one of a plurality of touches by the temporary halt operation as the selection operation, and accepts an operation of decreasing the number of touches of the touch panel unit as the confirmation operation.

5. The display input device according to claim 3, wherein the display unit performs an emphasized display of the selected button from start of the selection operation to end of the confirmation operation, and moves a position of the button to be in the emphasized display in a predetermined order or in accordance with a moving direction of a finger in the selection operation, and restarts the transmission transition display by regarding a screen corresponding to the button in the emphasized display when the confirmation operation was made as the transition destination screen.

6. The display input device according to claim 5, wherein the display unit performs the emphasized display by displaying the selected button in a color different from other unselected buttons or by adding an image to the selected button.

7. The display input device according to claim 1, wherein when a predetermined transition destination setting operation is made on a button in the transition destination screen being appears during the transition, the display unit continues the transmission transition display following transition completion with total transmission of the transition source screen, by regarding the transition destination screen as the new transition source screen and by regarding a screen corresponding to the button on which the transition destination setting operation is made as the new transition destination screen.

8. The display input device according to claim 7, wherein the touch panel unit accepts an operation of moving a touch position continued from the transmission start operation to a display position of one of buttons in the transition destination screen, or an operation of additionally touching a display position of one of buttons in the transition destination screen in the state where the touching based on the transmission start operation is continued, as the transition destination setting operation.

9. The display input device according to claim 1, further comprising a calculation unit for determining a first calculation value, which is an operation speed of an operation of moving a touch position in a forward direction while touching the touch panel unit based on an output of the touch panel unit, or an operation amount when an operation of moving the touch position in the forward direction while touching the touch panel unit based on the output of the touch panel unit, wherein
the touch panel unit accepts a predetermined speed setting mode change operation for changing to the speed setting mode, and in the speed setting mode,
the calculation unit determines the first calculation value for the lowering speed setting operation of moving the touch position in a predetermined forward direction in the state where two-point touch is performed on the touch panel unit, and
the display unit performs a transmission transition display to a lower layer so that a transition speed from the transition source screen to the transition destination screen becomes higher as the determined first calculation value is larger, while the display unit performs a transmission transition display toward a lower layer so that a transition speed from the transition source screen to the transition destination screen becomes lower as the determined first calculation value is smaller.

10. The display input device according to claim 9, wherein the touch panel unit accepts at least one of an one-point moving operation of moving one of two touch positions in a predetermined forward direction and an operation of rotating the touch position in the predetermined forward direction as the lowering speed setting operation in the speed setting mode.

11. The display input device according to claim 9, wherein
when accepting a heightening speed setting operation of moving the touch position in the direction opposite to the forward direction of the lowering speed setting operation in the state of the speed setting mode by the speed setting mode change operation, the calculation unit determines an operation speed of an operation of moving the touch position in the heightening speed setting operation or an operation amount of the touch position in the heightening speed setting operation as the second calculation value based on the output of the touch panel unit, and the display unit performs a transmission transition display toward an upper layer so as to rewind and play a switching process of the screen in the transmission transition display toward a lower layer, performs the transmission transition display toward an upper layer at a higher speed of the rewind and play as the determined second calculation value is larger, and performs the transmission transition display toward an upper layer at lower speed of the rewind and play as the determined second calculation value is smaller.

12. The display input device according to claim 11, wherein
the touch panel unit accepts at least one of an operation of rotating the touch position in the direction opposite to the forward direction and a one-point moving operation in the direction opposite to the forward direction as the heightening speed setting operation.

13. The display input device according to claim 11, wherein when the lowering speed setting operation is made after the heightening speed setting operation is made, the display unit stops the transmission transition display for transition to an upper layer and restarts the transmission transition display toward a lower layer.

14. The display input device according to claim 1, wherein when the touch panel unit accepts a predetermined reverse transition operation as an instruction to return to an upper layer, the display unit stops the transmission transition display for transition to a lower layer and performs the transmission transition display to an upper layer so as to rewind and play a switching process of the screen in the transmission transition display toward a lower layer.

15. The display input device according to claim 14, wherein when the touch panel unit accepts a predetermined restart operation, the display unit restarts the transmission transition display toward a lower layer.

16. The display input device according to claim 1, wherein the touch panel unit accepts a predetermined set value setting operation for setting a set value in a displayed screen that is the lowest screen reaching the set value setting screen when the transmission transition display is continued.

17. The display input device according to claim 1, wherein when the touch panel unit accepts a predetermined finishing operation, the display unit finishes the transmission transition display and returns to the normal mode, so as to display one of a screen in which the transmission start operation is started, a current transition source screen, and a current transition destination screen.

18. An image forming apparatus comprising the display input device according to claim 1.

19. A control method of a display input device, comprising the steps of:
    displaying a button in a screen of a display unit;
    switching a screen to be displayed from a screen that is currently displayed to one of a lower layer screen and an upper layer screen in accordance with the button that is operated in a normal mode;
    accepting an operation on the screen of the display unit including an operation on the displayed button;
    performing a transmission transition display in which the screen on which the transmission start operation was performed is taken as a first transition source screen and the transition source screen gradually disappears while a screen that belongs to a next lower layer of the transition source screen and that is displayed by operating the given button that was long pressed by a normal operation is taken as a first transition destination screen and a ratio of a display of the transition destination screen to display of the transition source screen is increased as time passes in such a way that the transition destination is increasingly overlaid on, so as to emerge stepwise from, the transition source screen, so as to change the screen to be displayed, when a transmission start operation, which is an operation of, in the normal mode, long pressing a given button on the screen by keeping touching inside a display area of the given button continuously for a predetermined long press period, is accepted; and
    while the transmission start operation is continued, repeating a transmission transition display toward a lower layer, by regarding the transition destination screen after completion of the transition with total transmission of the transition source screen as a new transition source screen, and by regarding a screen belonging to a next lower layer of the new transition source screen as a new transition destination screen.

* * * * *